(12) United States Patent
Pringle, IV et al.

(10) Patent No.: US 11,279,073 B2
(45) Date of Patent: *Mar. 22, 2022

(54) METHODS FOR DEPOSITING AN EXTRUDABLE SUBSTANCE ONTO A SURFACE

(71) Applicant: The Boeing Company, Chicago, IL (US)

(72) Inventors: John W. Pringle, IV, Gardena, CA (US); Raul Tomuta, Stanton, CA (US); Chris J. Erickson, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,279

(22) Filed: Aug. 21, 2020

(65) Prior Publication Data

US 2020/0376734 A1 Dec. 3, 2020

Related U.S. Application Data

(62) Division of application No. 15/849,724, filed on Dec. 21, 2017, now Pat. No. 10,786,939.

(51) Int. Cl.
*B05D 1/26* (2006.01)
*B29C 48/92* (2019.01)
(Continued)

(52) U.S. Cl.
CPC .......... *B29C 48/92* (2019.02); *B05B 13/0431* (2013.01); *B05C 5/0216* (2013.01);
(Continued)

(58) Field of Classification Search
CPC ..... B05C 5/0215; B05C 5/0225; B05D 1/265; B05D 1/28
See application file for complete search history.

(56) References Cited

U.S. PATENT DOCUMENTS 3,977,083 A * 8/1976 Leslie ................. A61C 17/005
433/82
4,932,094 A * 6/1990 McCowin .......... A46B 11/0017
15/29

(Continued)

FOREIGN PATENT DOCUMENTS

DE           298 12 213      10/1998
DE         20 2013005169    10/2013

(Continued)

*Primary Examiner* — Nathan H Empie
(74) *Attorney, Agent, or Firm* — Walters & Wasylyna LLC

(57) ABSTRACT

A method of depositing an extrudable substance onto a surface comprises (1) with a cartridge positioned inside a sleeve between an inner tubular sleeve wall and an outer tubular sleeve wall, circumscribing the inner tubular sleeve wall, and also positioned between a push-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the extrudable substance from the cartridge, through the valve, and out of a nozzle that is communicatively coupled with the valve; and (2) controlling flow of the extrudable substance from the valve to the nozzle.

20 Claims, 30 Drawing Sheets

(51) Int. Cl.
    *B33Y 10/00*           (2015.01)
    *B05C 5/02*            (2006.01)
    *B29C 64/118*         (2017.01)
    *B29C 48/02*          (2019.01)
    *B29C 64/209*        (2017.01)
    *B29C 64/00*          (2017.01)
    *B33Y 30/00*          (2015.01)
    *B65D 83/00*          (2006.01)
    *B25J 11/00*          (2006.01)
    *B05B 13/04*          (2006.01)
    *B25J 15/00*          (2006.01)
    *B29C 48/255*        (2019.01)
    *B29C 64/106*        (2017.01)

(52) U.S. Cl.
    CPC ............ *B05C 5/0225* (2013.01); *B05D 1/265* (2013.01); *B25J 11/0075* (2013.01); *B25J 15/0019* (2013.01); *B29C 48/02* (2019.02); *B29C 48/2556* (2019.02); *B29C 64/00* (2017.08); *B29C 64/118* (2017.08); *B29C 64/209* (2017.08); *B33Y 10/00* (2014.12); *B33Y 30/00* (2014.12); *B65D 83/0022* (2013.01); *B29C 64/106* (2017.08); *B29C 2948/926* (2019.02); *B29C 2948/92076* (2019.02)

(56) References Cited

U.S. PATENT DOCUMENTS

| | | | |
|---|---|---|---|
| 6,589,209 B1 * | 7/2003 | Dysarz | A61M 5/3232 604/110 |
| 2002/0071772 A1 * | 6/2002 | Isogai | B05C 11/1021 417/292 |
| 2006/0225293 A1 * | 10/2006 | Godwin | B60D 1/36 33/264 |
| 2007/0226926 A1 | 10/2007 | Hiraoka | |
| 2007/0228076 A1 * | 10/2007 | Horner | B05C 17/00559 222/135 |
| 2011/0289717 A1 | 12/2011 | Dhanvanthari | |
| 2016/0361734 A1 | 12/2016 | Routen et al. | |
| 2017/0105516 A1 | 4/2017 | Pringle, IV et al. | |
| 2017/0106401 A1 | 4/2017 | Pringle, IV et al. | |
| 2017/0106402 A1 | 4/2017 | Pringle, IV et al. | |
| 2018/0271484 A1 | 9/2018 | Whisler | |
| 2018/0272372 A1 | 9/2018 | Pringle, IV et al. | |
| 2018/0272373 A1 | 9/2018 | Pringle, IV et al. | |

FOREIGN PATENT DOCUMENTS

| | | | |
|---|---|---|---|
| EP | 1 941 823 | 7/2008 | |
| EP | 3 257 419 | 12/2017 | |
| FR | 2501080 A1 * | 9/1982 | ............ B01F 5/0672 |
| WO | WO 2017/106900 | 6/2017 | |

\* cited by examiner (CONTINUED TO FIG.1B)

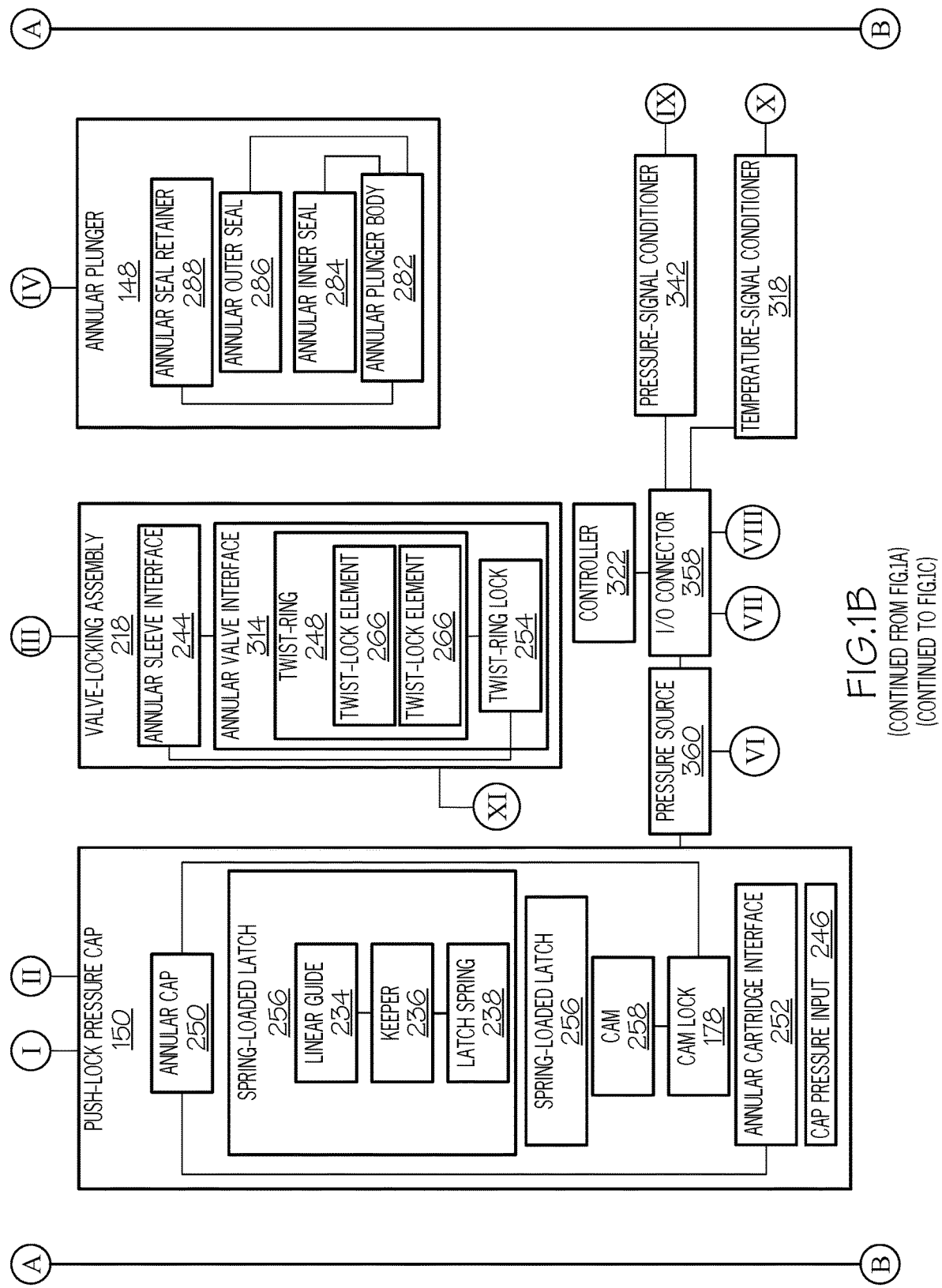

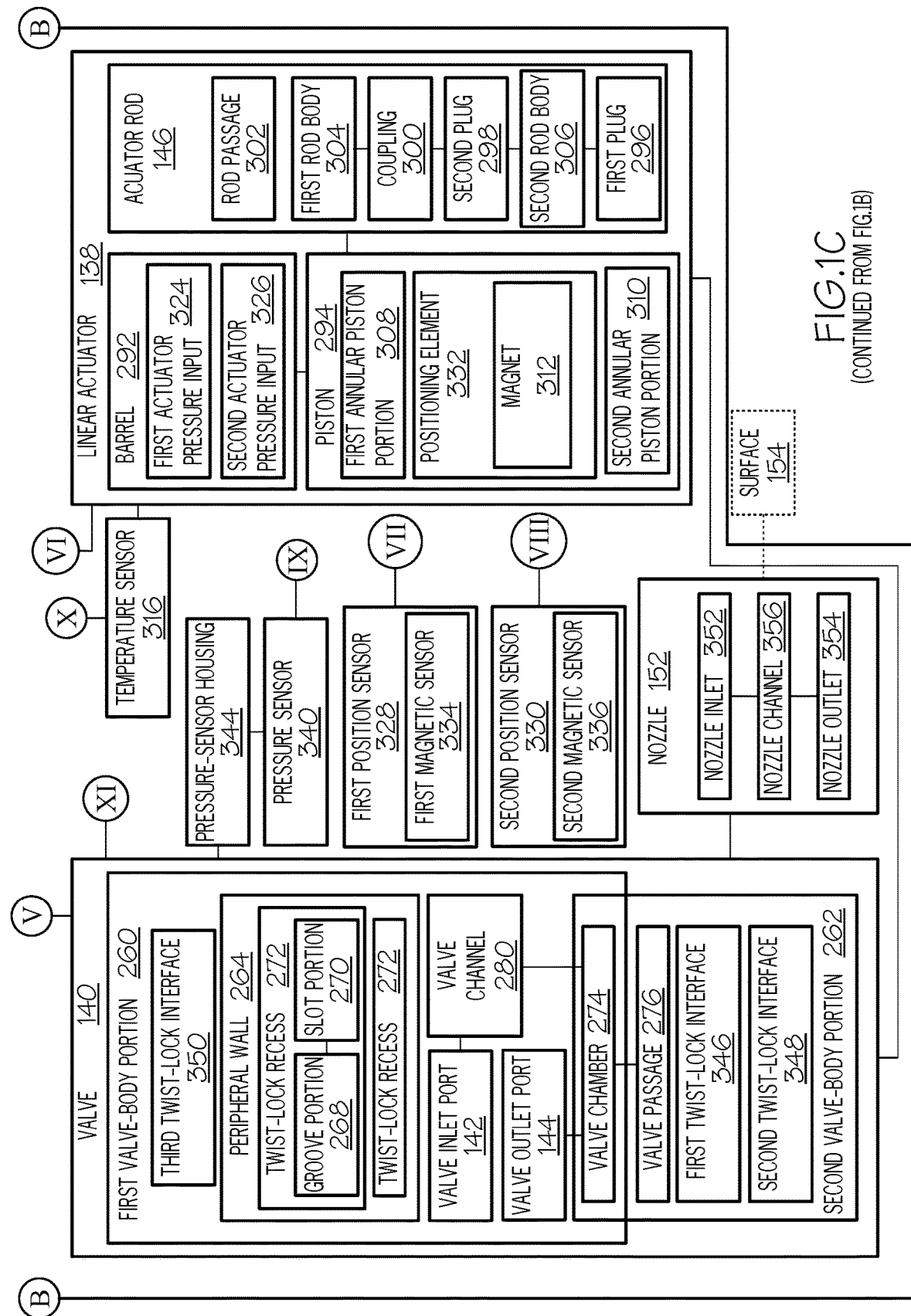
FIG.1C
(CONTINUED FROM FIG.1B)

(CONTINUED TO FIG.30B)

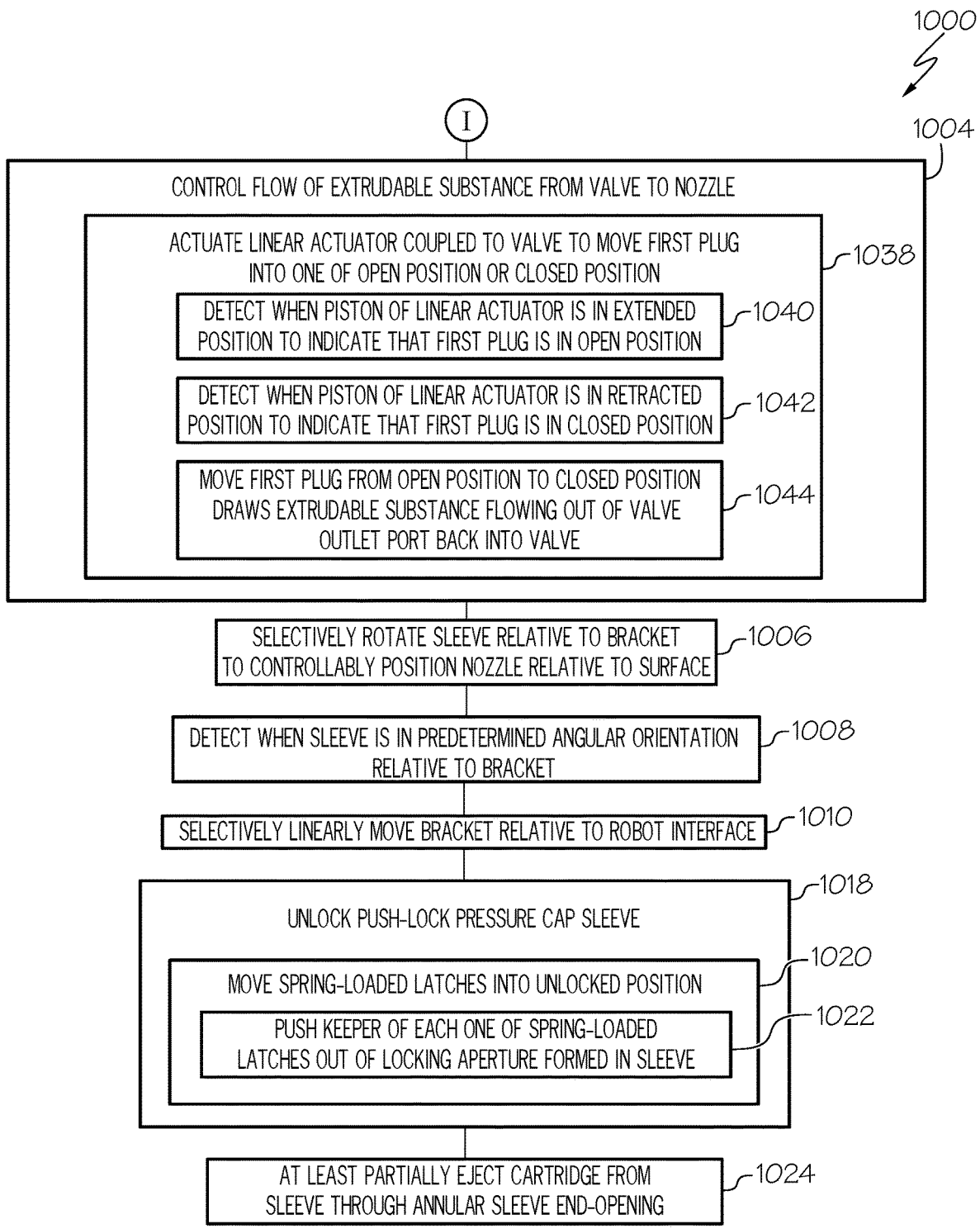
FIG. 30B
(CONTINUED FROM FIG.30A)

METHODS FOR DEPOSITING AN EXTRUDABLE SUBSTANCE ONTO A SURFACE

PRIORITY

This application is a divisional of U.S. Ser. No. 15/849,724 filed on Dec. 21, 2017.

TECHNICAL FIELD

The present disclosure relates to apparatuses and methods for depositing an extrudable substance onto a surface.

BACKGROUND

During assembly of a structure, such as an aircraft or a component thereof, an extrudable substance must often be deposited onto a surface of the structure. It is desirable to fully automate such deposition of the extrudable substance to reduce cost and manufacturing lead time. However, space constraints, in many instances imposed by the geometry of the structure, make automating the deposition of extrudable substances difficult. For example, a robot may need to deposit the extrudable substance onto a surface, located in a confined space within the structure, such as inside an airplane wing box that, at the tip, is only several inches high. Automated deposition of extrudable substances is further complicated by the fact that the robot must often enter the confined space through a small access port and must navigate around obstacles while manipulating an end effector to deposit the extrudable substance onto desired locations along the surface of the structure.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for depositing an extrudable substance onto a surface. The apparatus comprises a bracket, configured to be removably coupled to a robot. The apparatus further comprises a sleeve, comprising an inner tubular sleeve wall and an outer tubular sleeve wall, circumscribing the inner tubular sleeve wall. The sleeve is coupled to the bracket and is rotatable relative to the bracket about a first axis. The apparatus also comprises a cartridge, comprising an inner tubular cartridge wall and an outer tubular cartridge wall, circumscribing the inner tubular cartridge wall. The cartridge is configured to be positioned between the inner tubular sleeve wall and the outer tubular sleeve wall. The apparatus additionally comprises a valve, configured to be communicatively coupled with the cartridge. The apparatus further comprises a nozzle, configured to be communicatively coupled with the valve. The apparatus also comprises a linear actuator to control flow of the extrudable substance from the valve to the nozzle. The apparatus additionally comprises an annular plunger, positioned between the inner tubular cartridge wall and the outer tubular cartridge wall and movable along the first axis. The apparatus further comprises a push-lock pressure cap, configured to be hermetically coupled with the cartridge. The cartridge is configured to be positioned between the push-lock pressure cap and the valve.

The apparatus provides for depositing the extrudable substance, from the cartridge, through the nozzle, to the surface of a workpiece, for example, located in a confined space. The configuration of the sleeve and the cartridge reduces the size requirements for storage of the extrudable substance and allows the linear actuator and a portion of the valve to be located, or housed, within the sleeve. The push-lock pressure cap enables pressurization of an interior volume located within the cartridge, which drives the annular plunger. Rotation of the sleeve controls a position of the nozzle relative to the bracket and the surface during deposition of the extrudable substance. The valve being communicatively coupled directly to the cartridge reduces wasted amounts of the extrudable substance, for example, during replacement of the cartridge and/or a purging operation.

Another example of the subject matter according to the invention relates to a method of depositing an extrudable substance onto a surface. The method comprises (1) with a cartridge positioned inside a sleeve between an inner tubular sleeve wall and an outer tubular sleeve wall, circumscribing the inner tubular sleeve wall, and also positioned between a push-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the extrudable substance from the cartridge, through the valve, and out of a nozzle that is communicatively coupled with the valve and (2) controlling flow of the extrudable substance from the valve to the nozzle.

The method provides for depositing the extrudable substance, from the cartridge, through the nozzle, to the surface of a workpiece, for example, located in confined space. The configuration of the sleeve and the cartridge reduces the size requirements for storage of the extrudable substance and allows the linear actuator and a portion of the valve to be located within the sleeve. The push-lock pressure cap enables pressurization of an internal volume located within the cartridge, which drives the annular plunger. Rotation of the sleeve controls a position of the nozzle relative to the bracket and the surface. The valve being communicatively coupled directly to the cartridge reduces wasted amounts of the extrudable substance, for example, during replacement of the cartridge and/or a purging operation.

BRIEF DESCRIPTION OF THE DRAWINGS

Figure 1A:
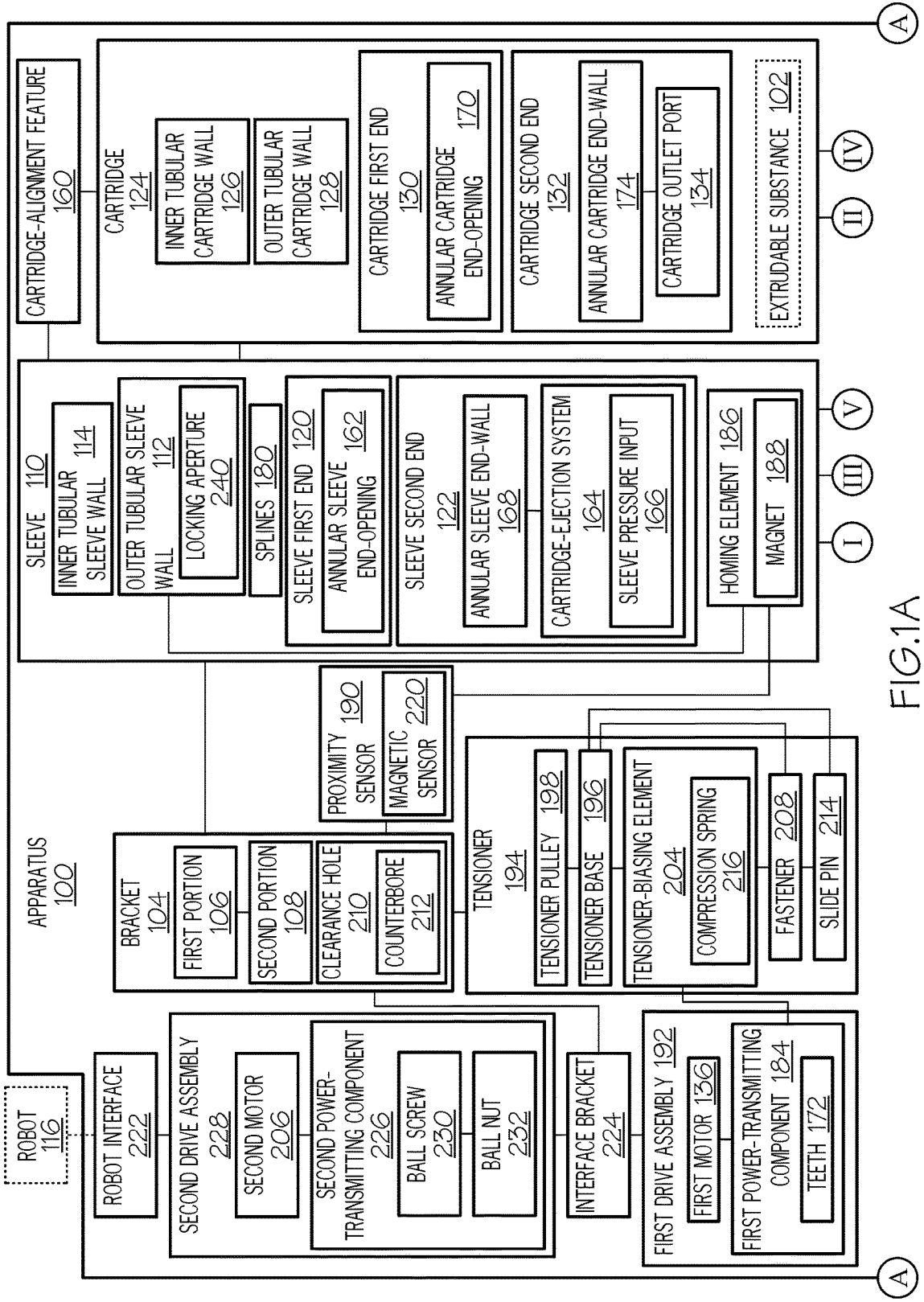
Figure 2:
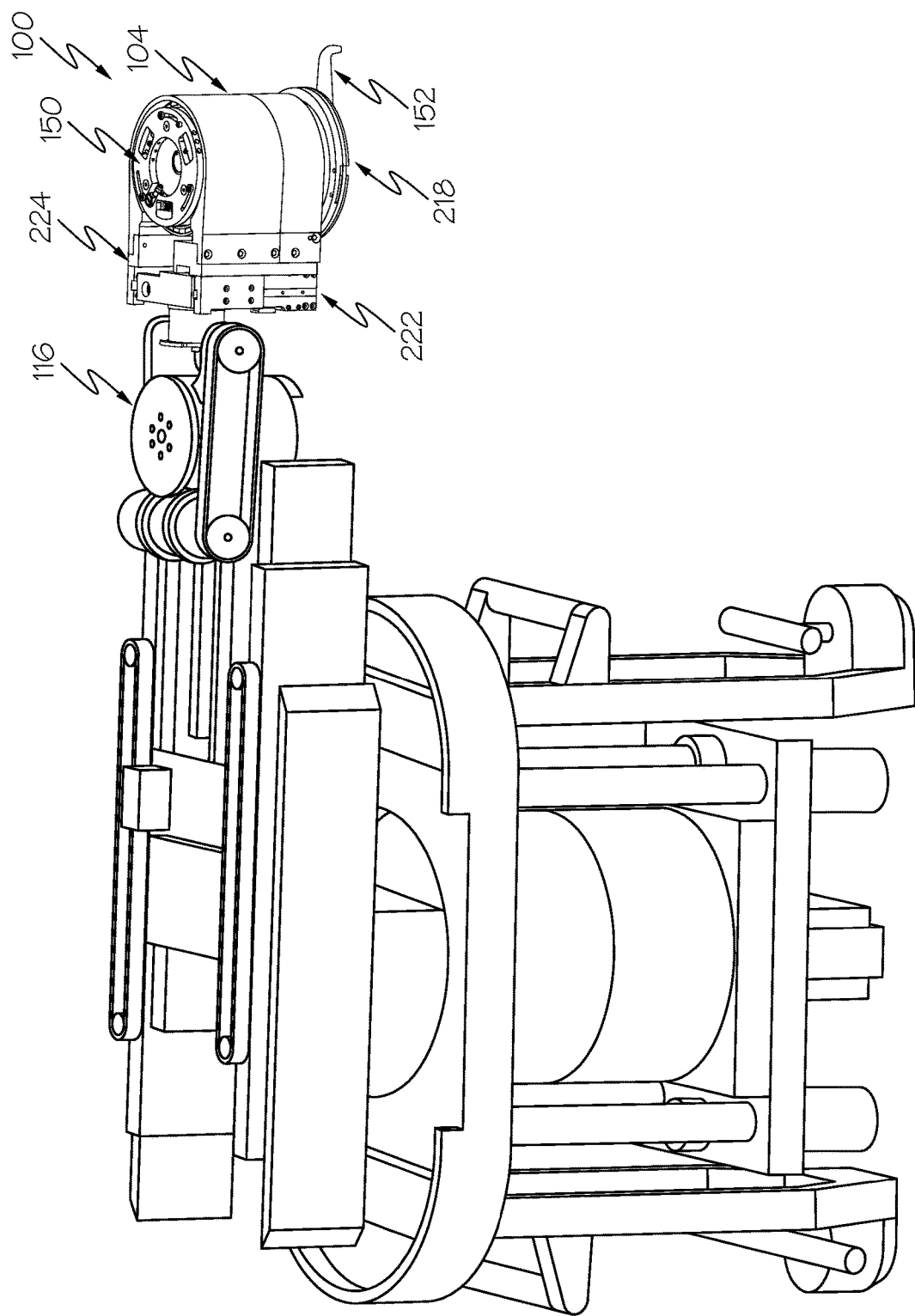
Figure 3:
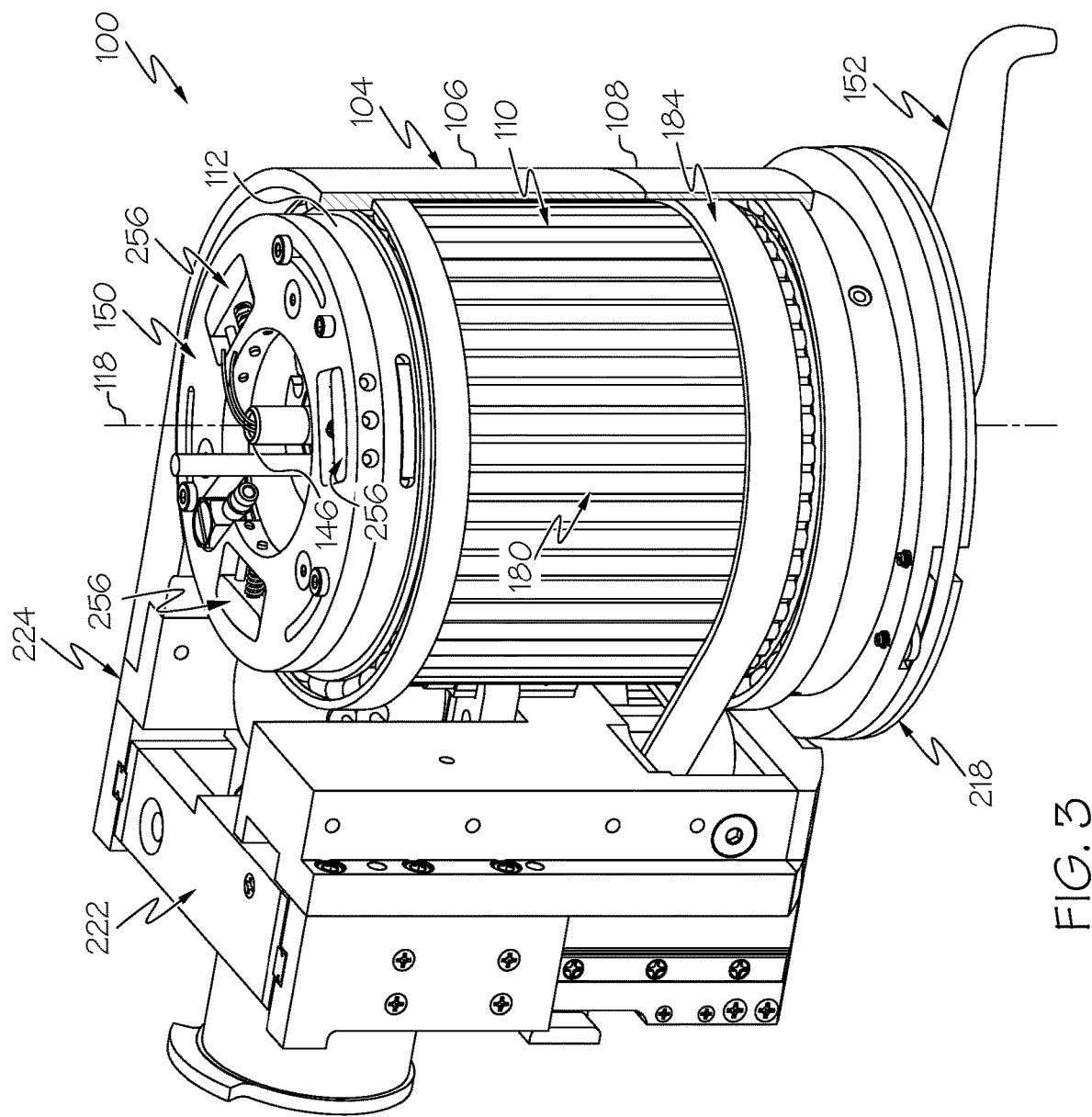
Figure 4:
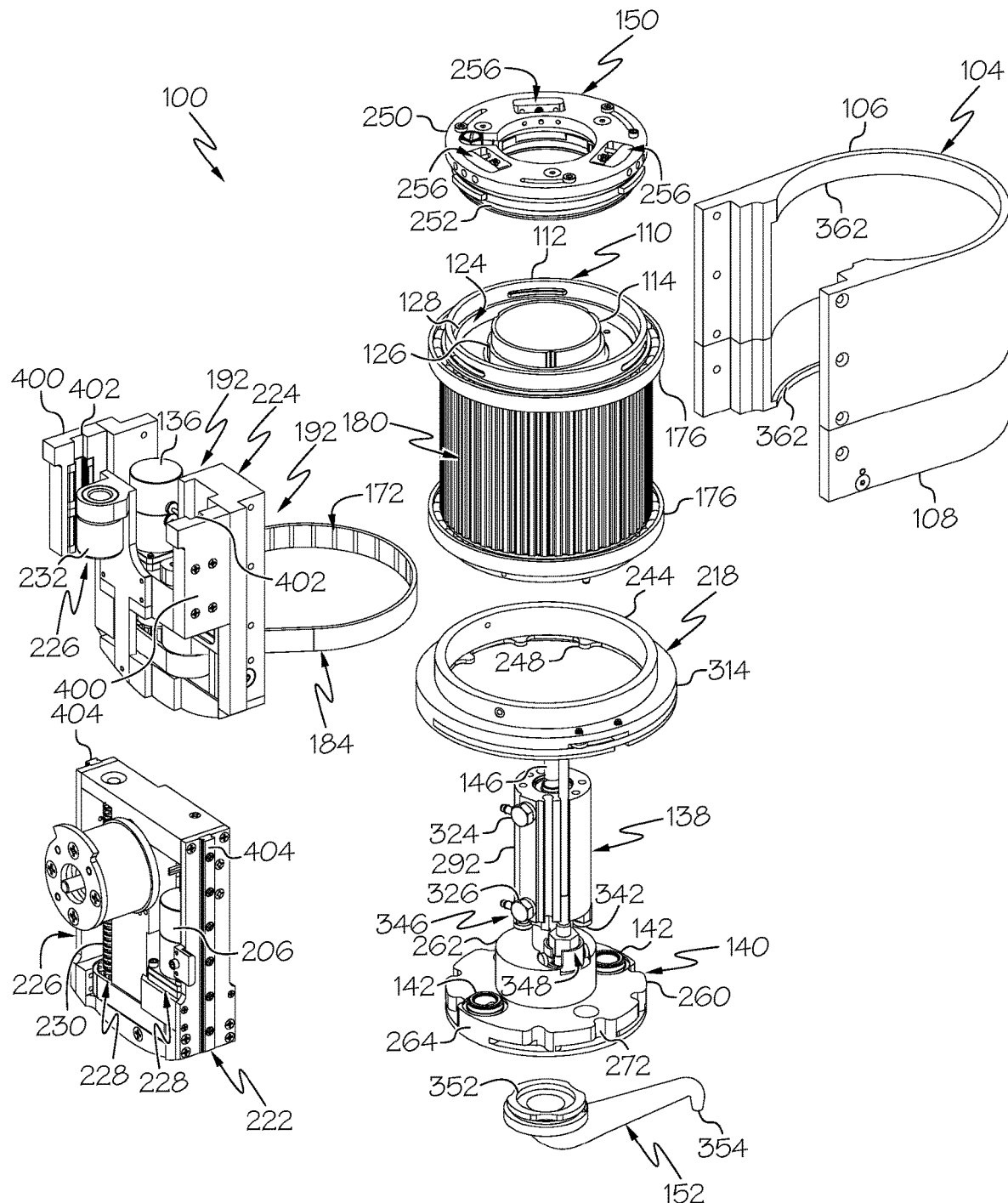
Figure 5:
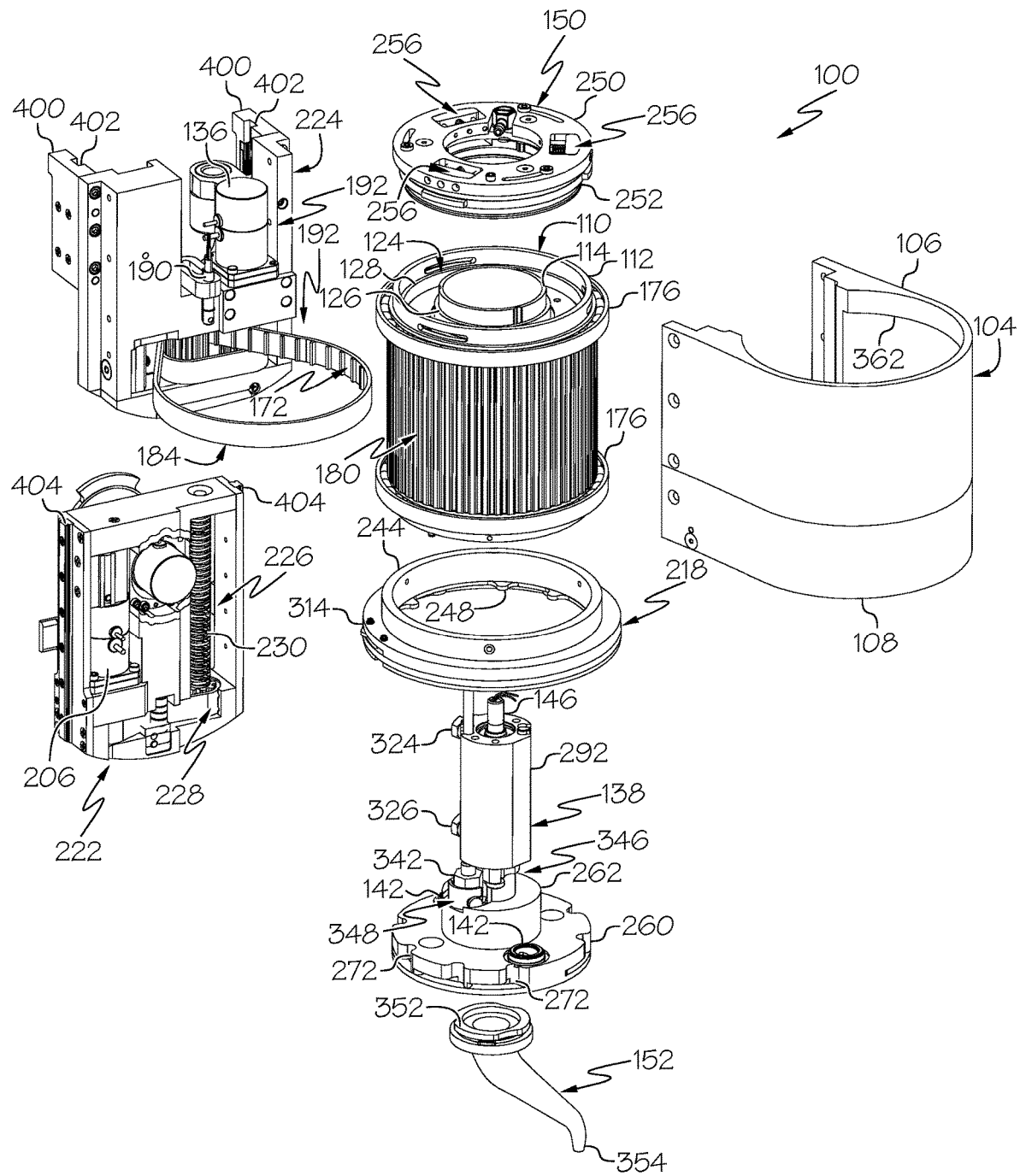
Figure 6:
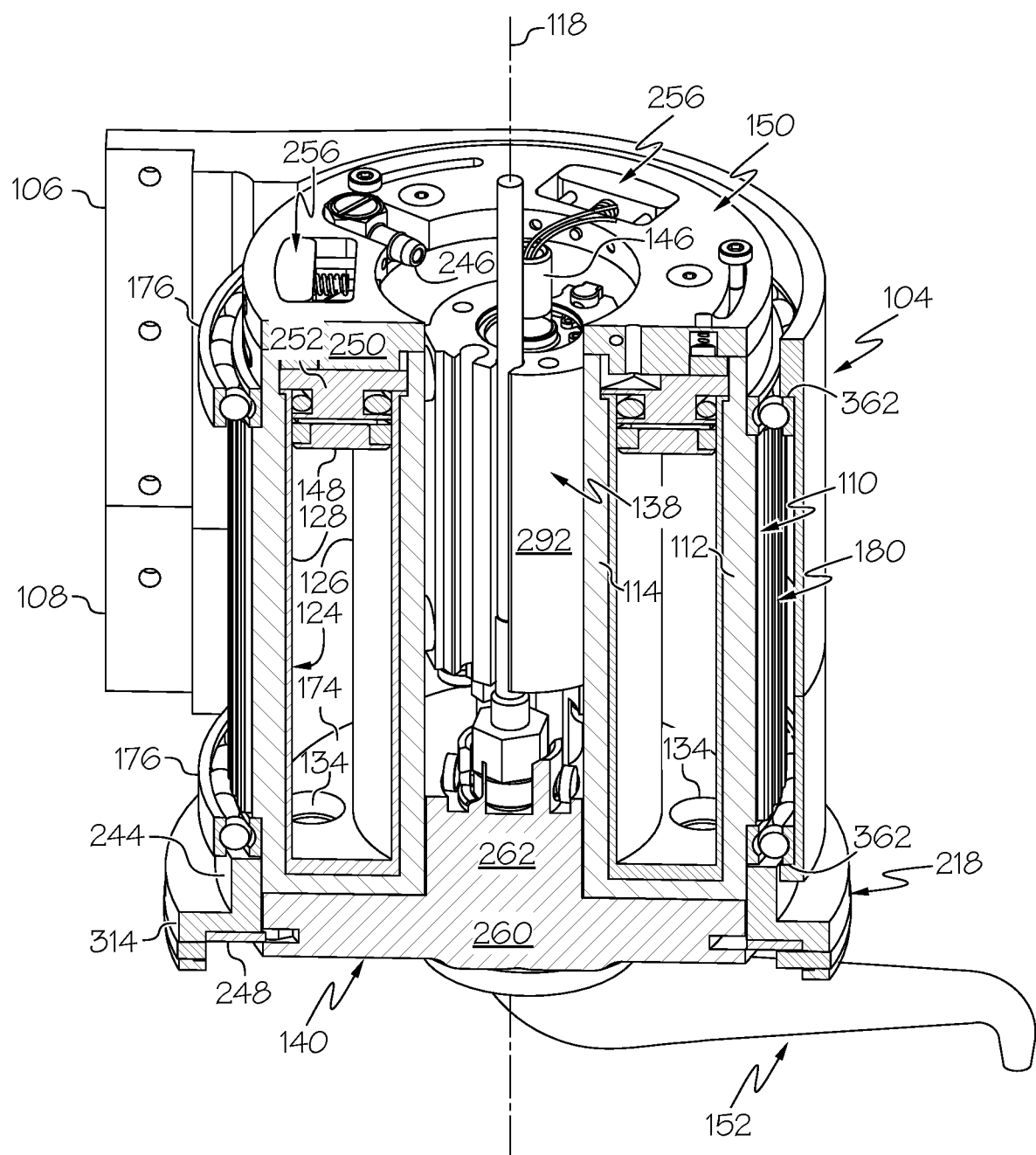
Figure 7:
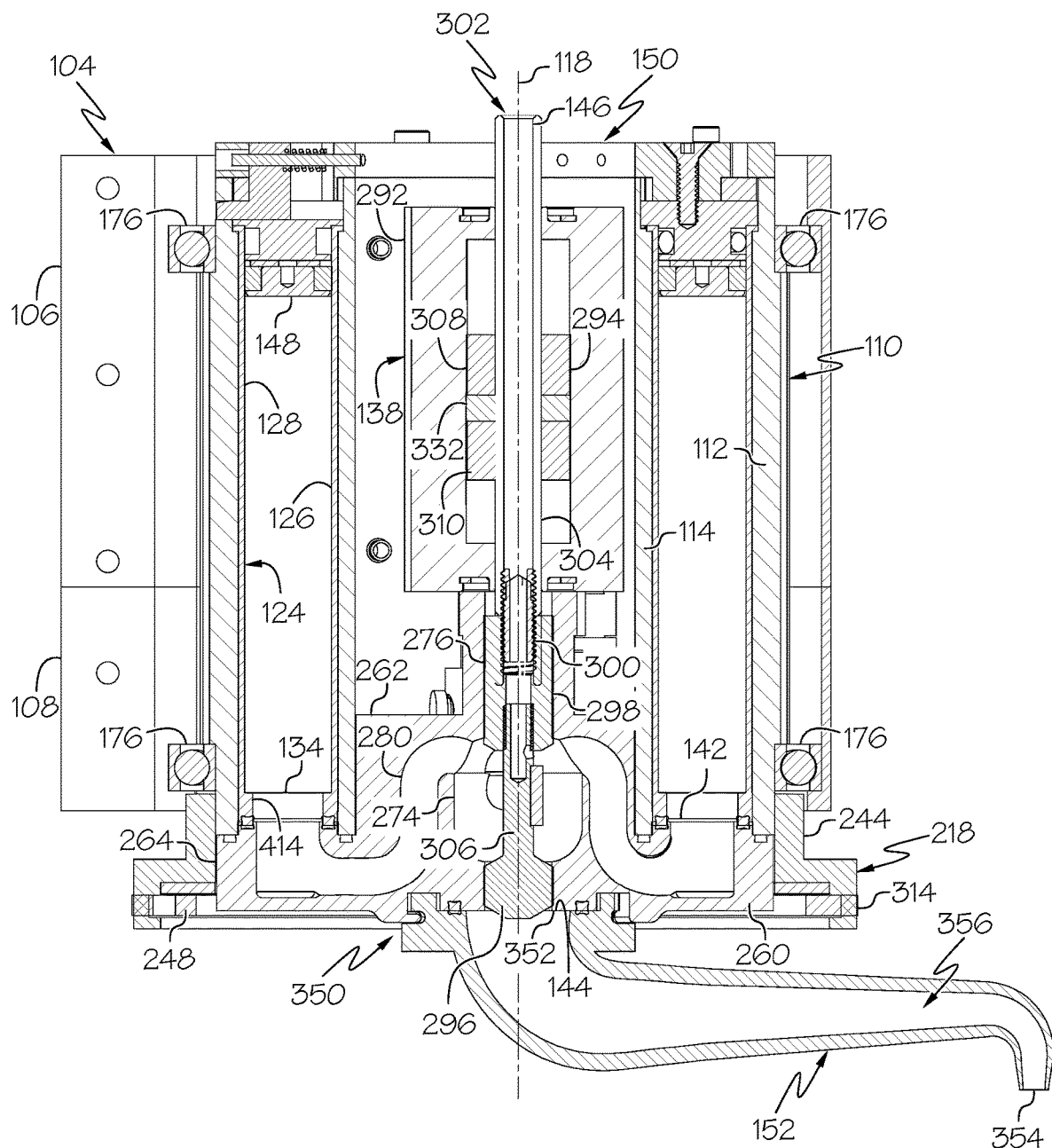
Figure 8:
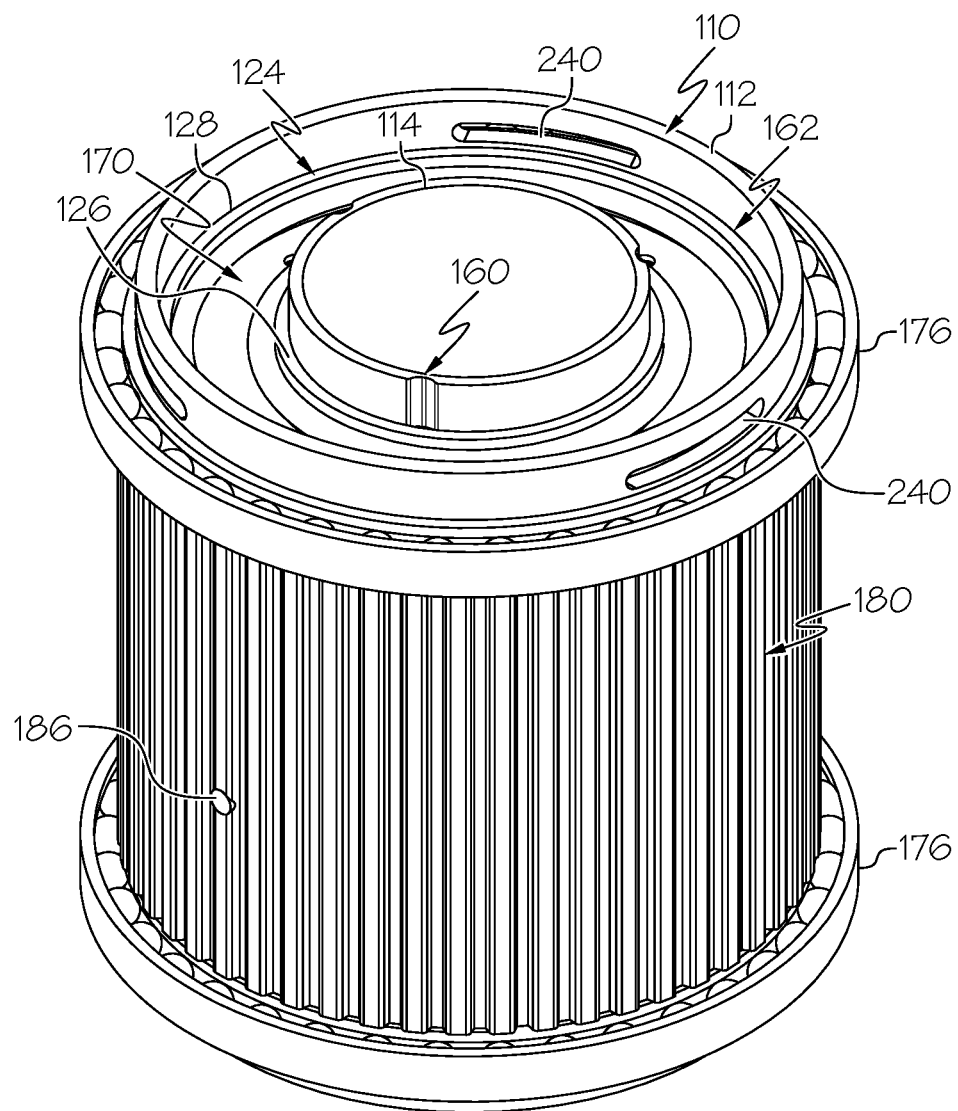
Figure 9:
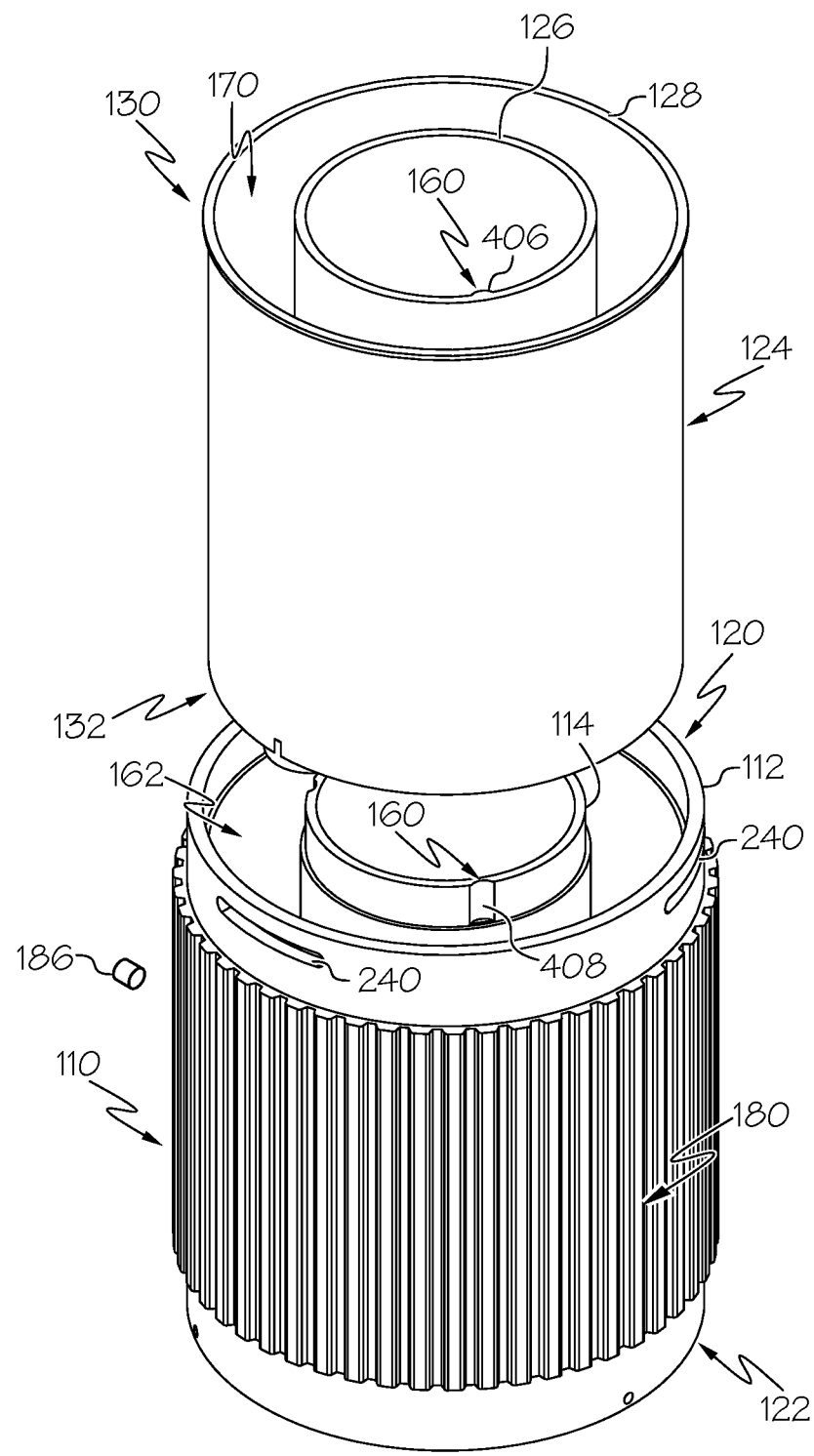
Figure 10:
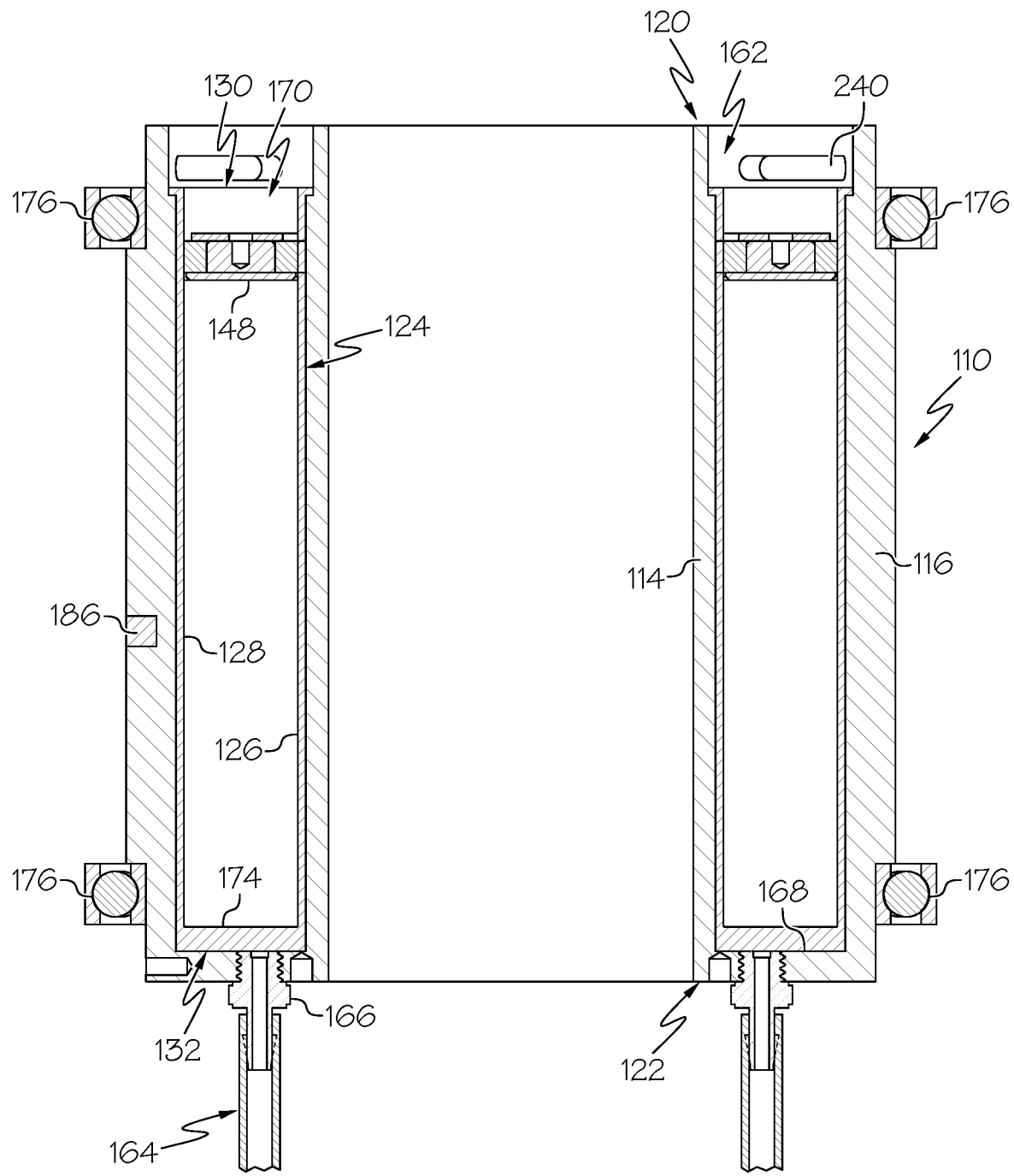
Figure 11:
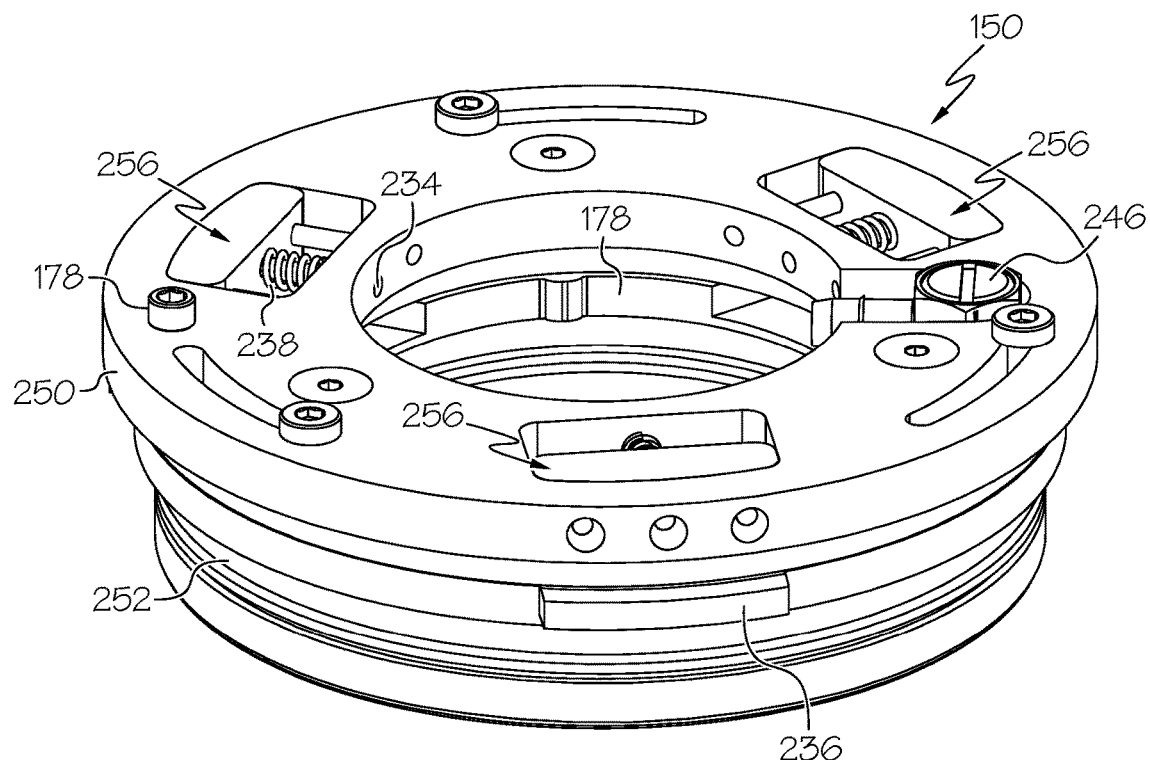
Figure 12:
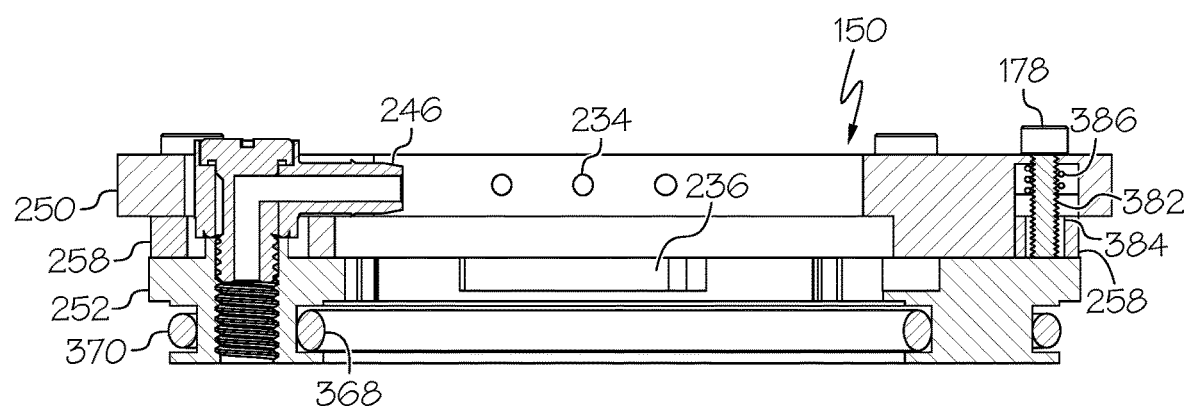
Figure 13:
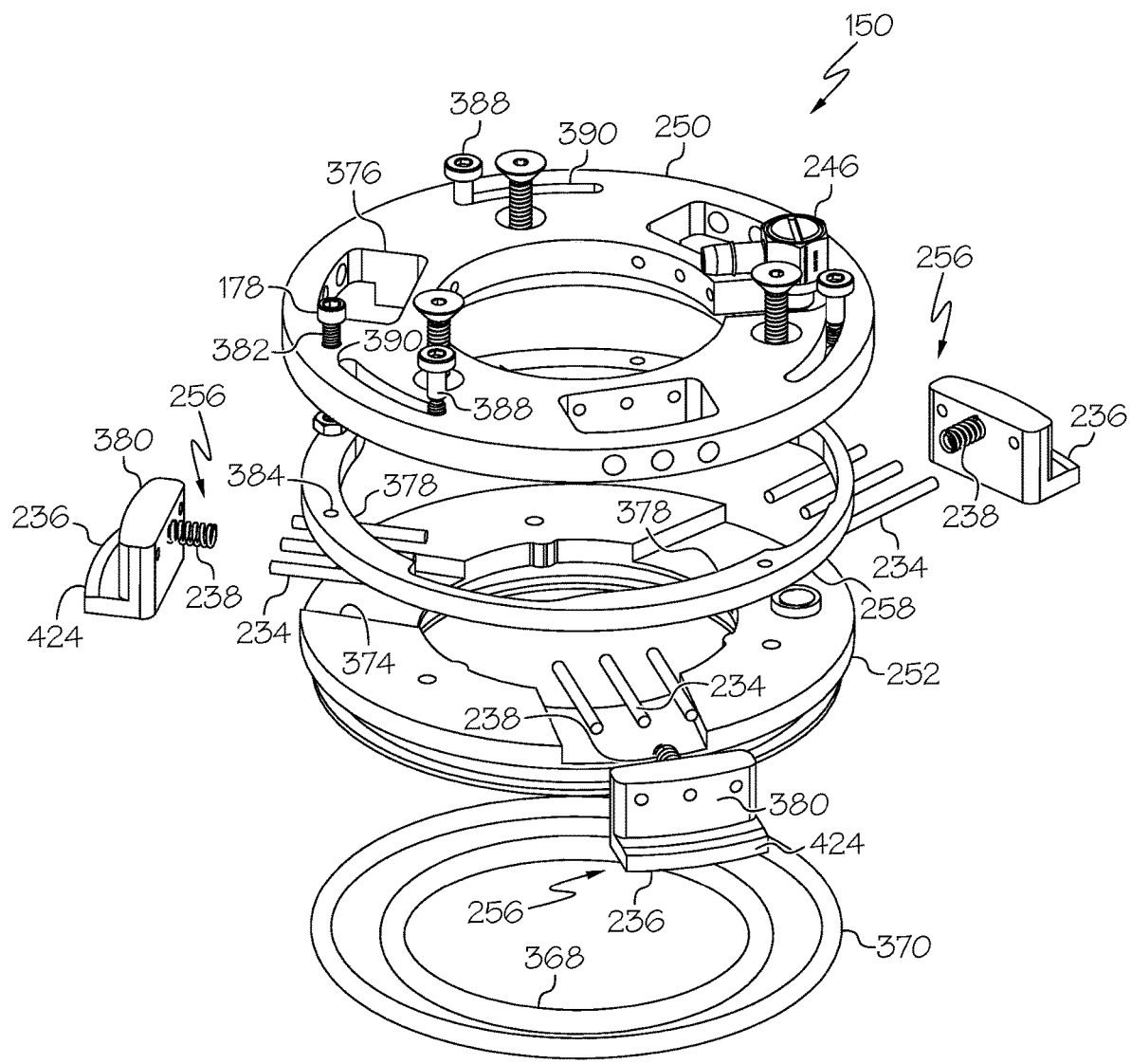
Figure 14:
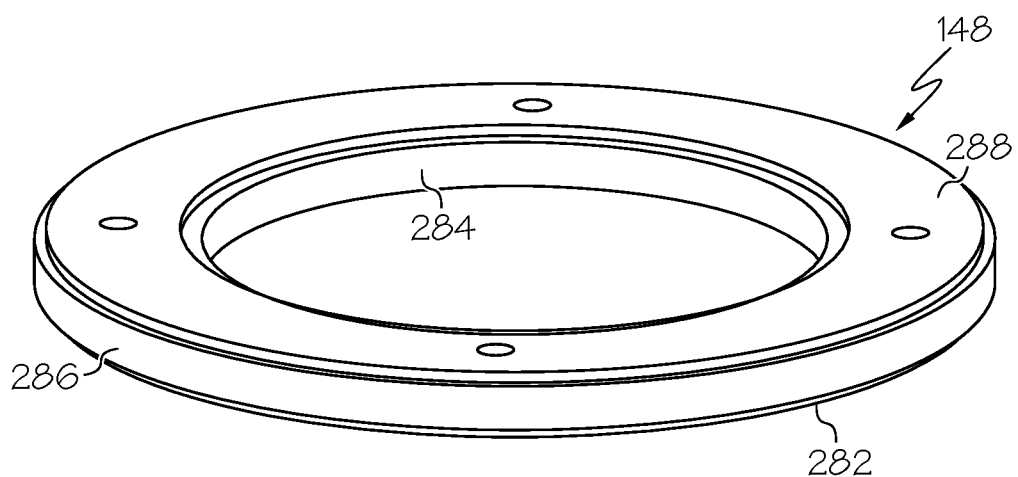
Figure 15:
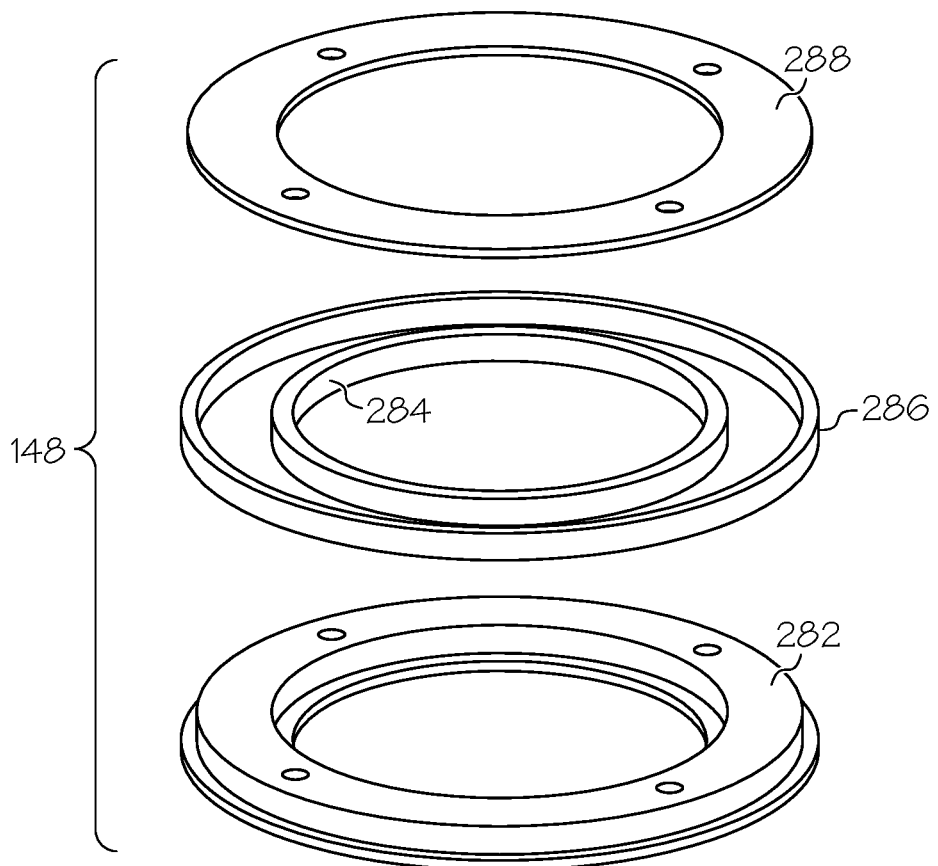
Figure 16:
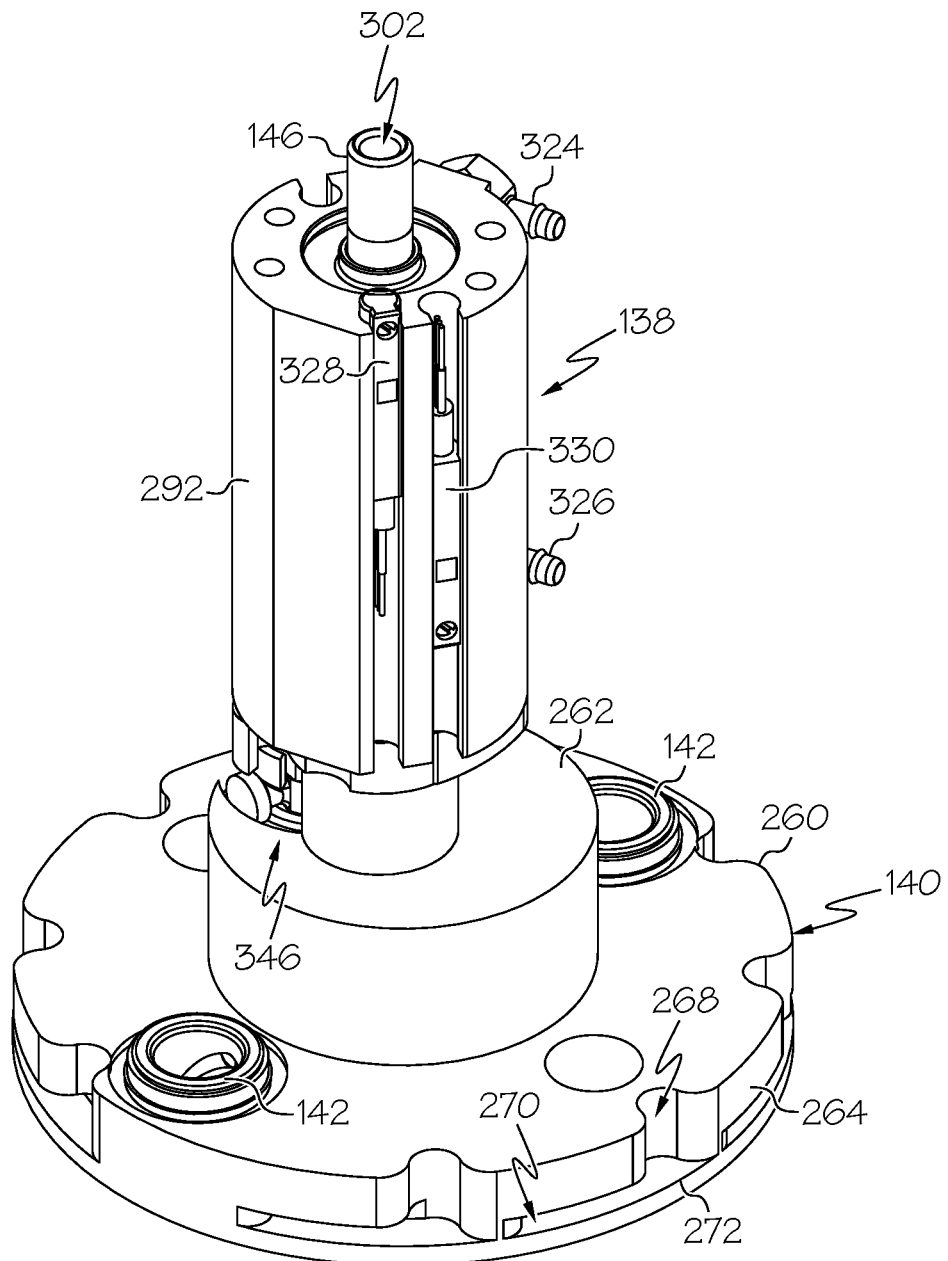
Figure 17:
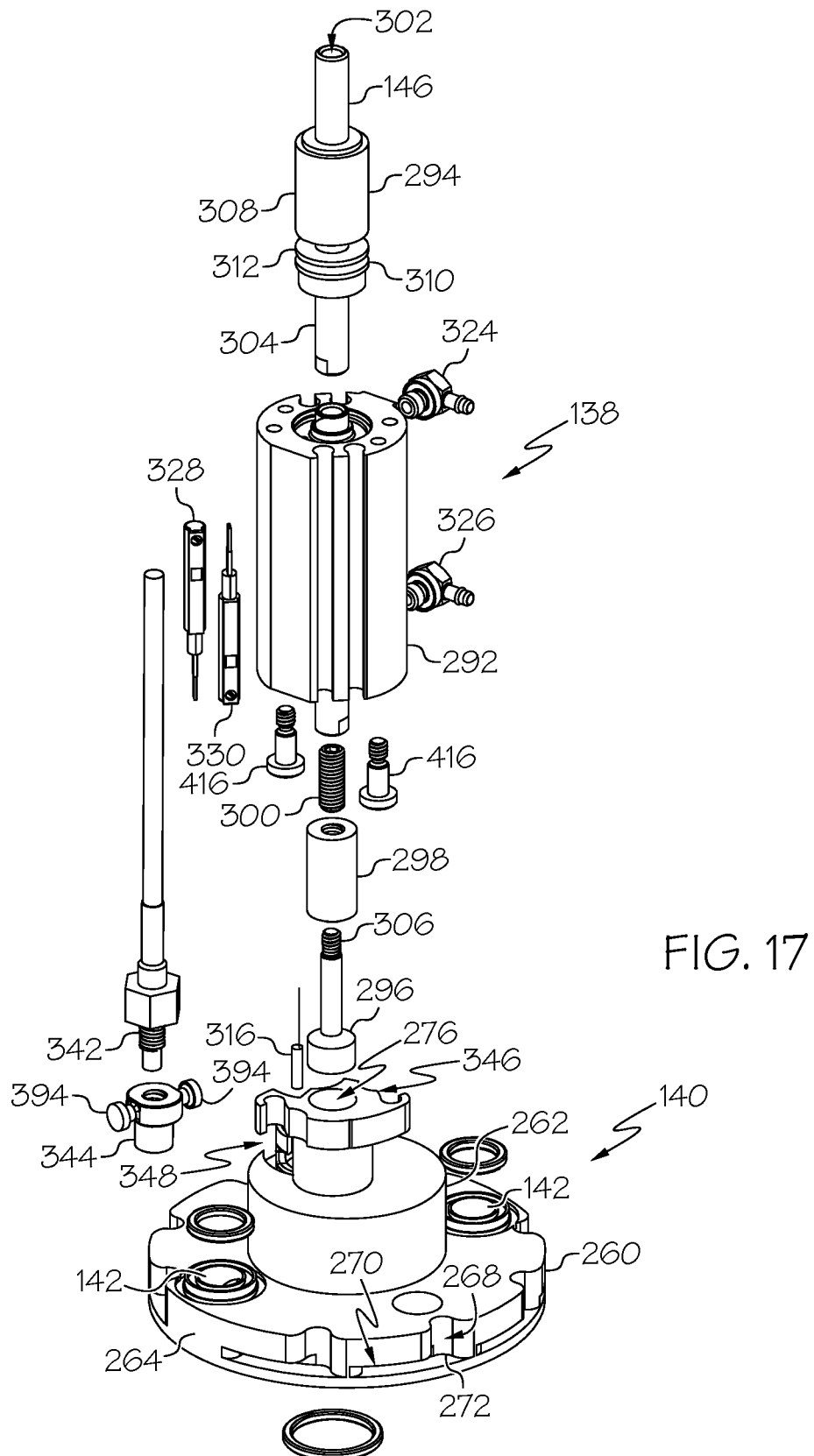
Figure 18:
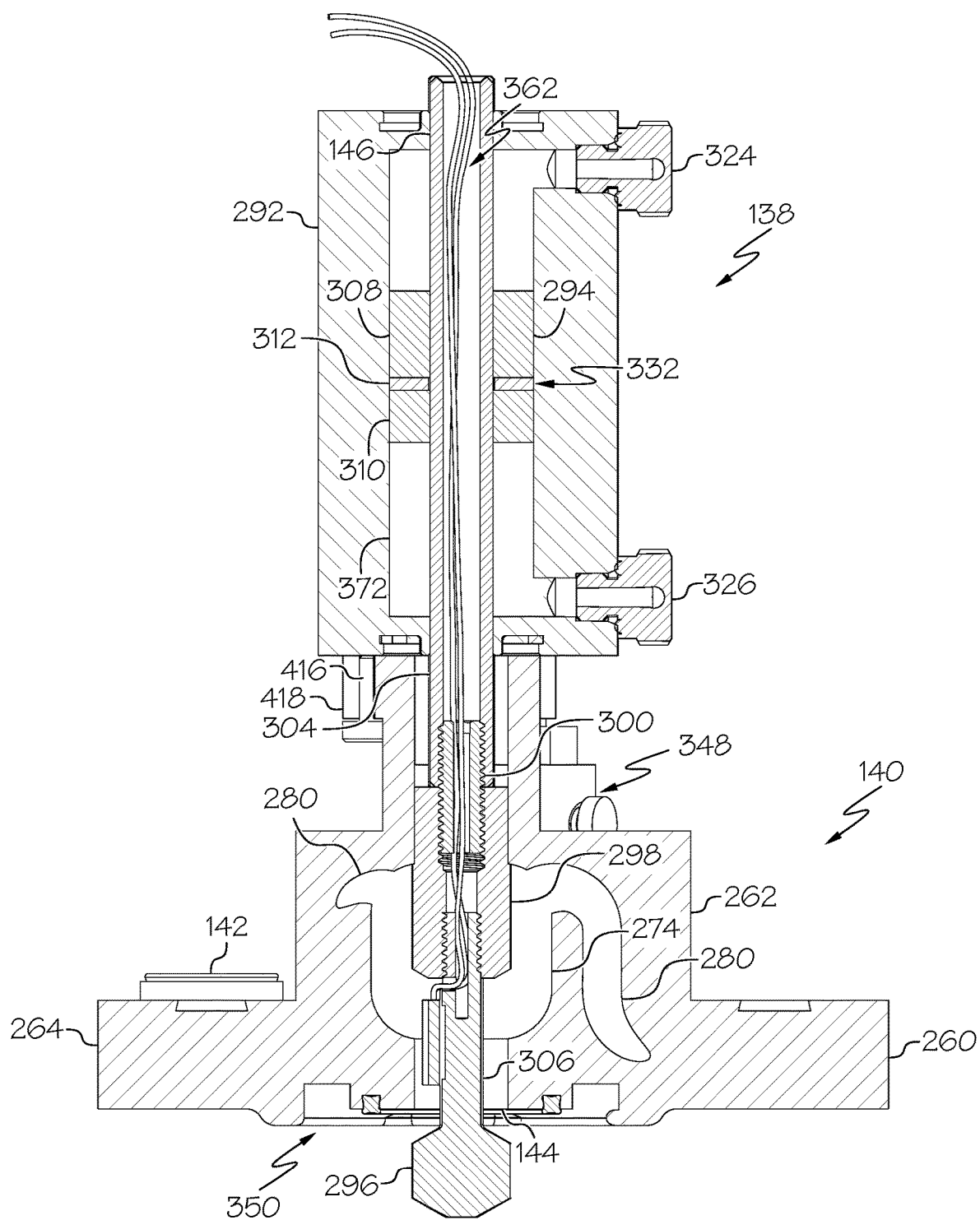
Figure 19:
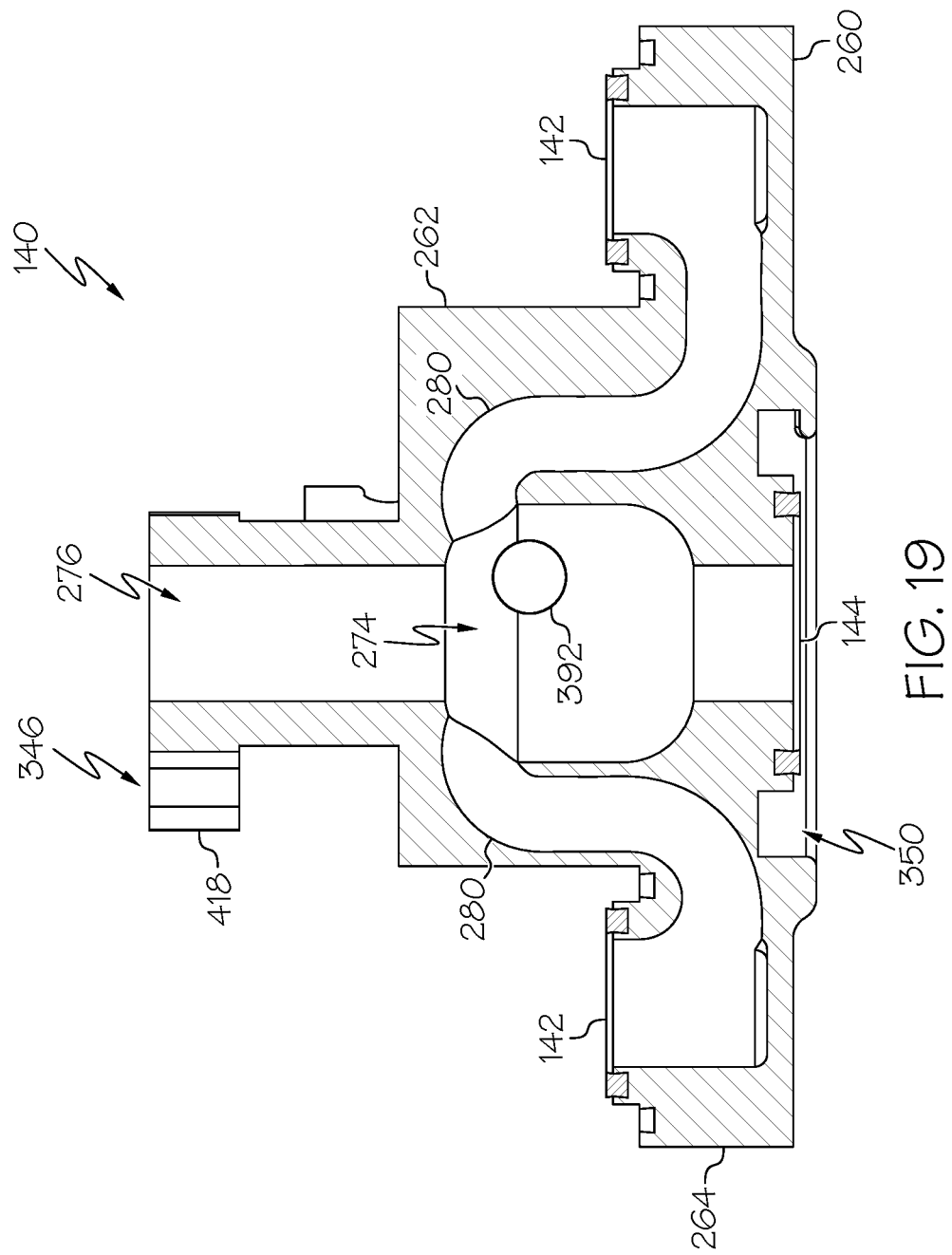
Figure 20:
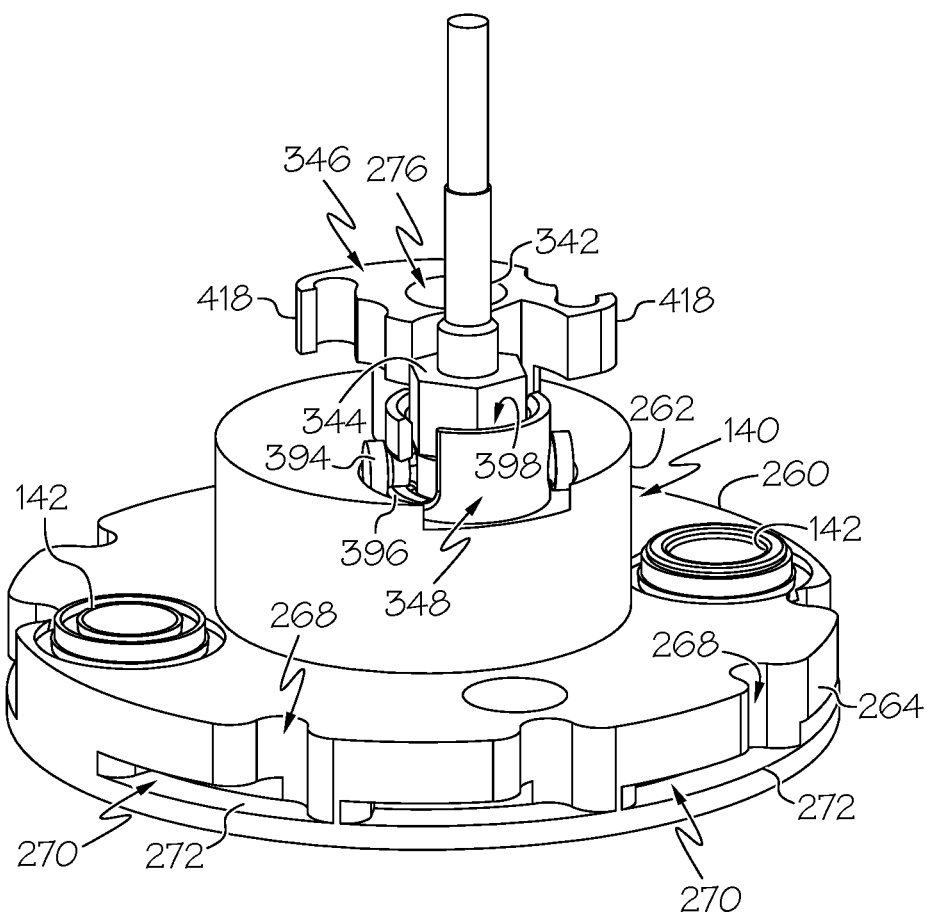
Figure 21:
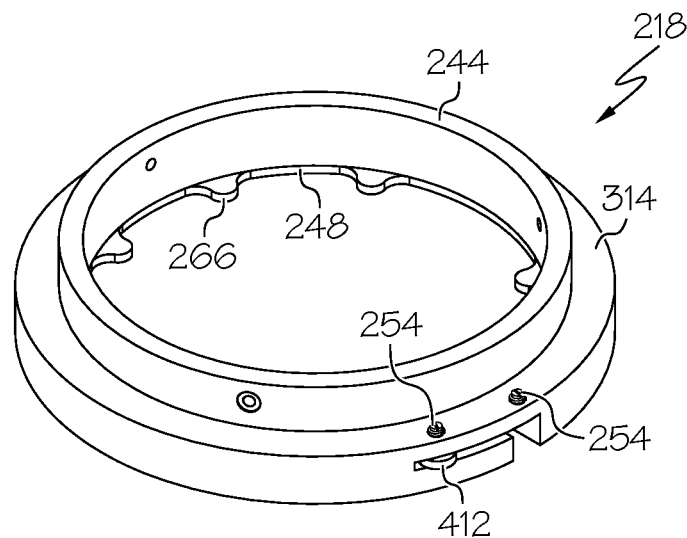
Figure 22:
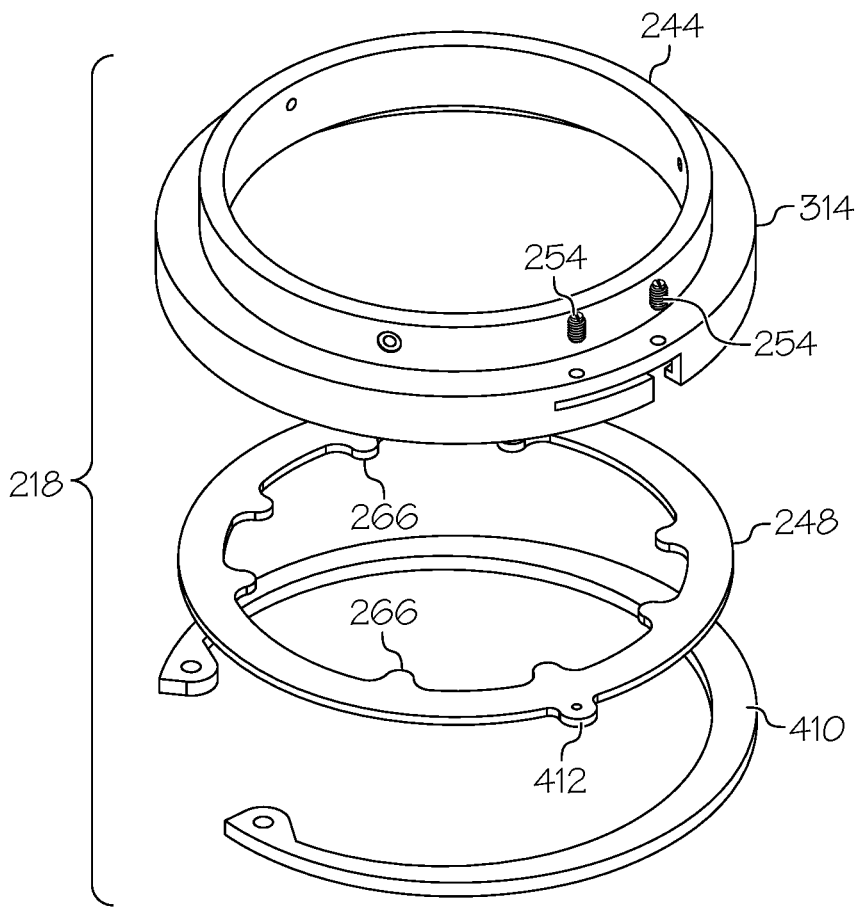
Figure 23:
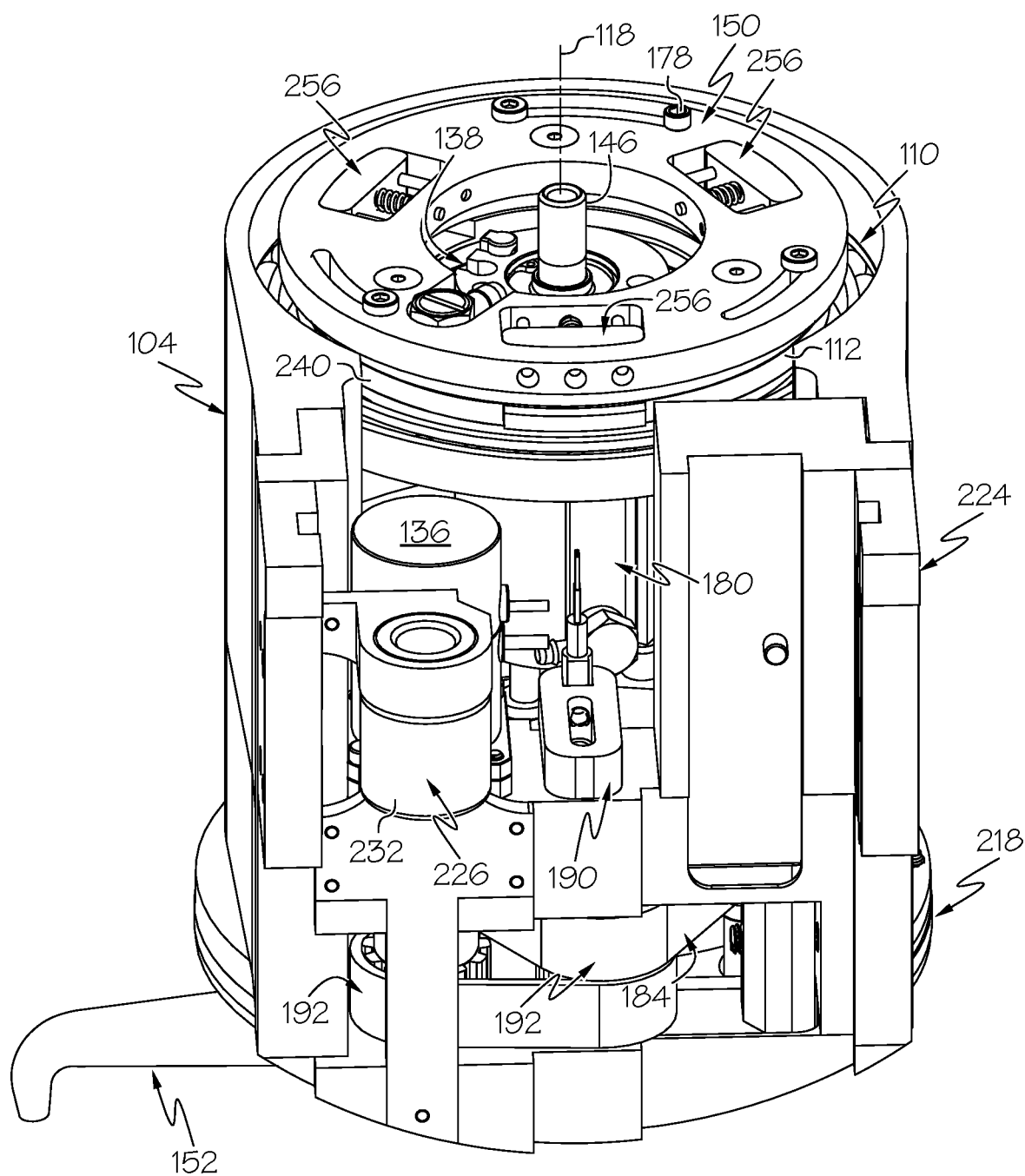
Figure 24:
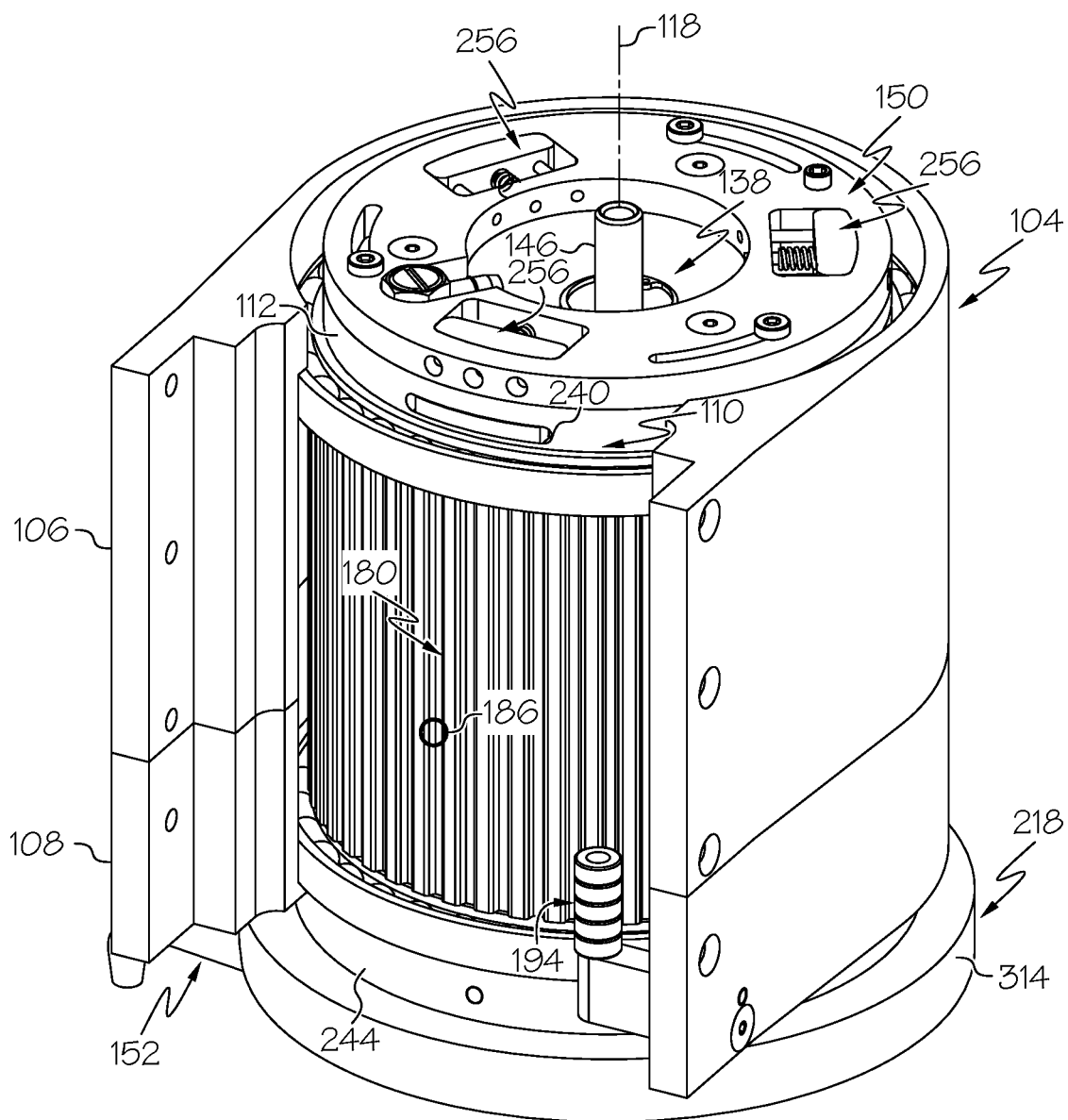
Figure 25:
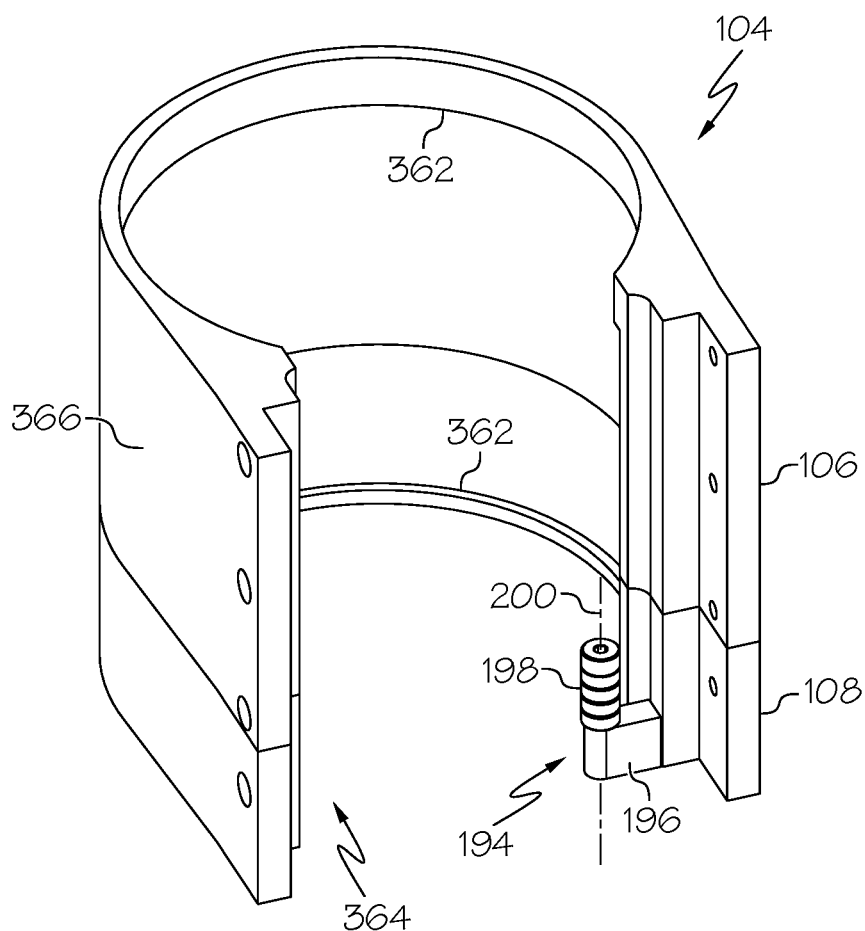
Figure 26:
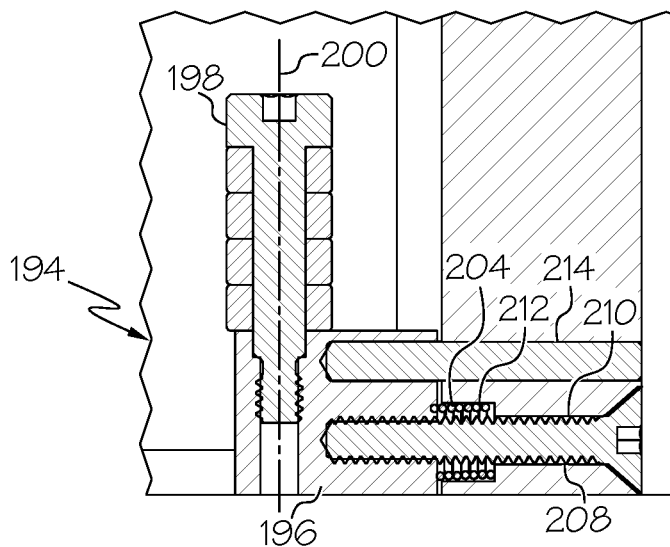
Figure 27:
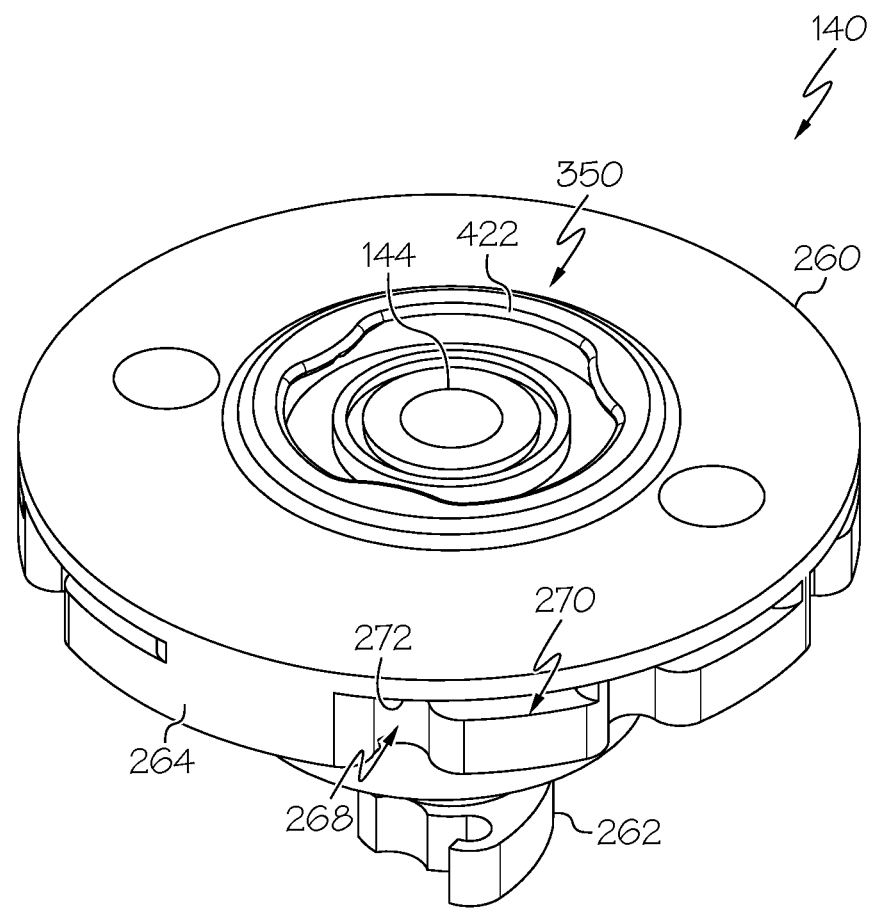
Figure 28:
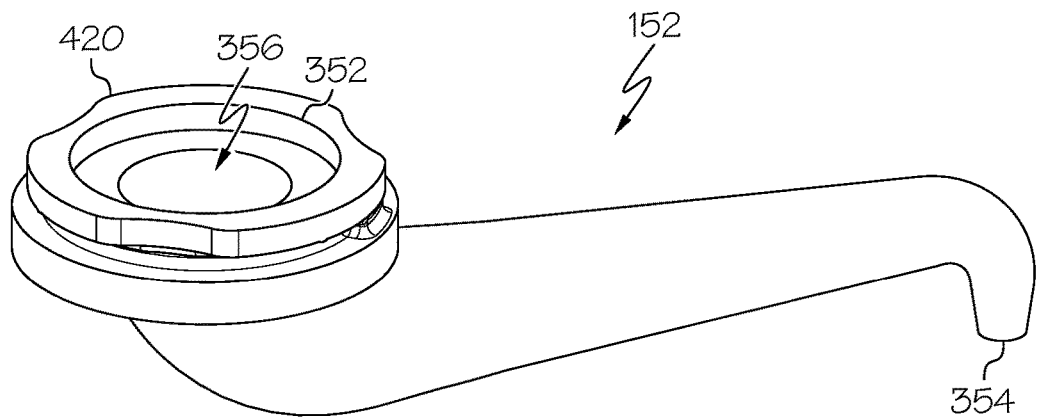
Figure 29:
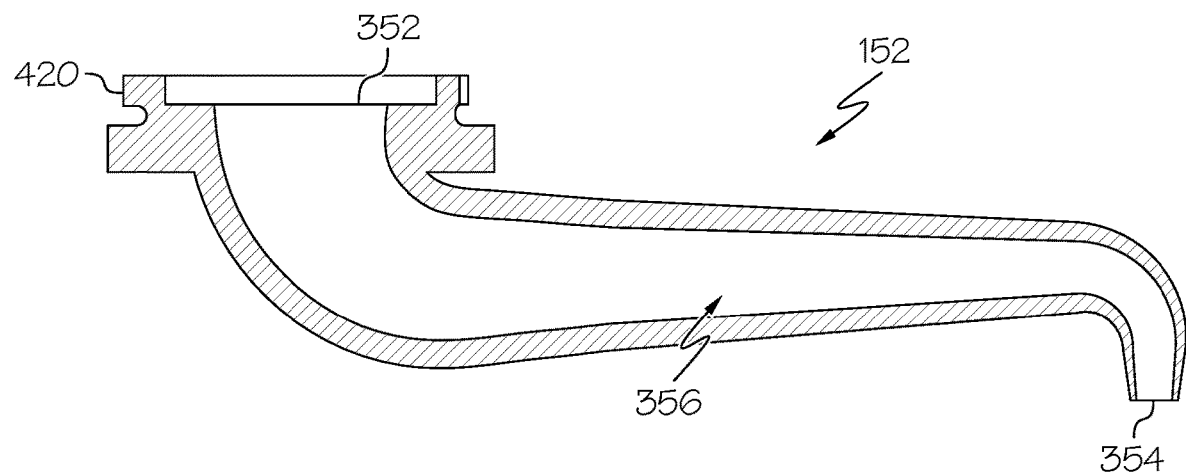
Figure 30A:
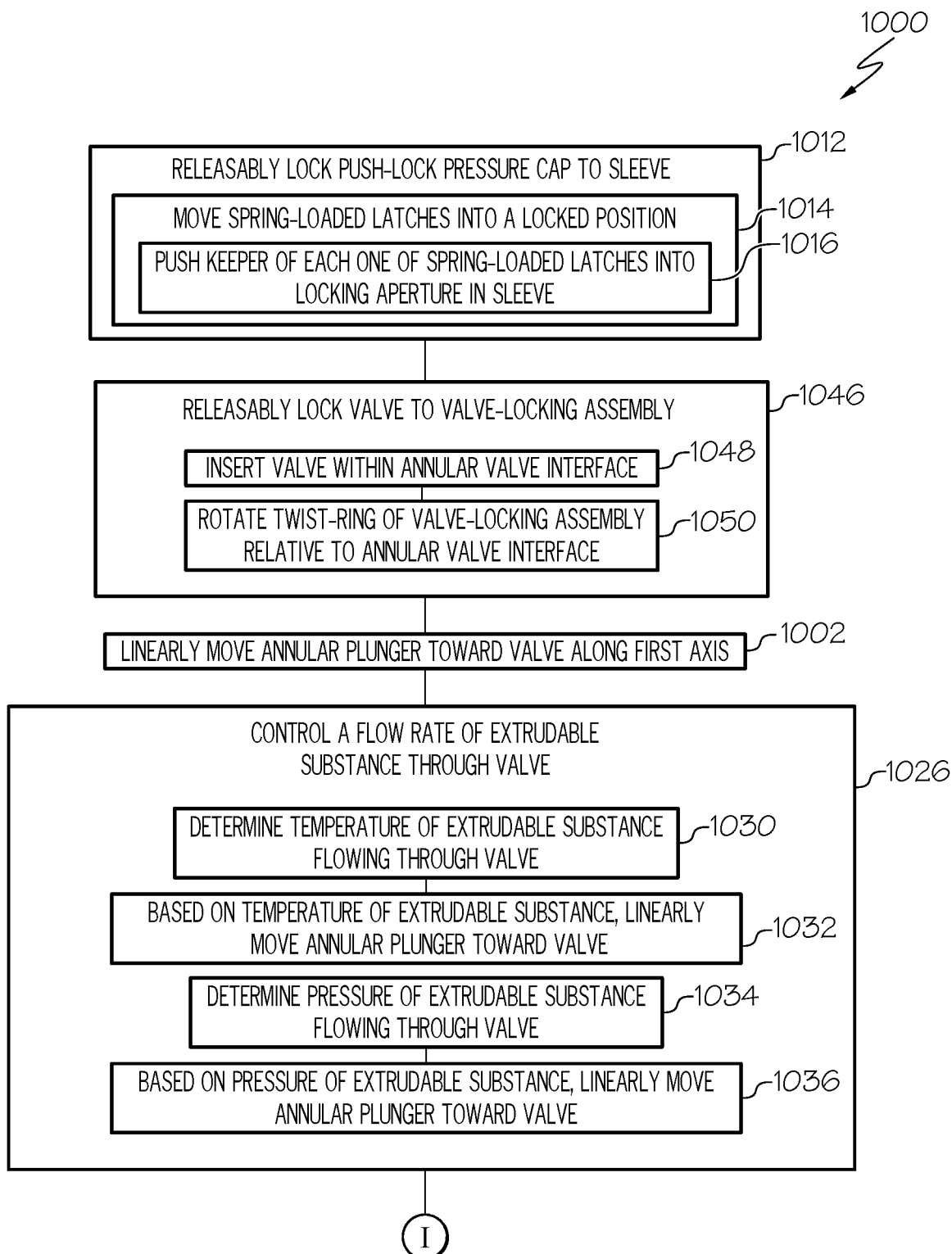
Figure 31:
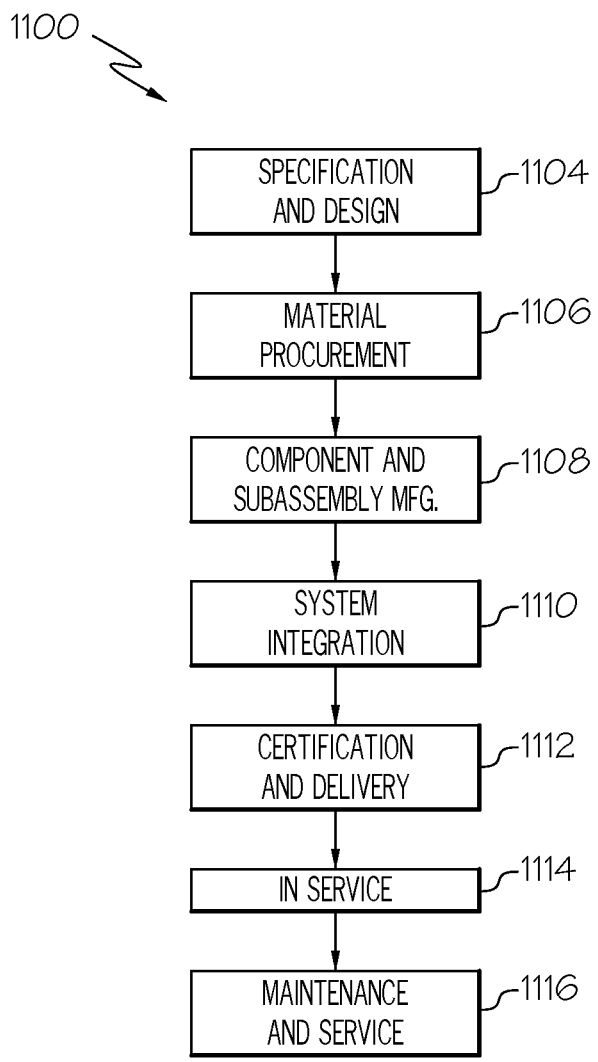

Having thus described one or more examples of the invention in general terms, reference will now be made to the accompanying drawings, which are not necessarily drawn to scale, and wherein like reference characters designate the same or similar parts throughout the several views, and wherein:

FIGS. 1A, 1B, and 1C, collectively, are a block diagram of an apparatus for depositing an extrudable substance, according to one or more examples of the present disclosure;

FIG. 2 is a schematic, perspective view of the apparatus of FIGS. 1A, 1B, and 1C, attached to a robot, according to one or more examples of the present disclosure;

FIG. 3 is a schematic, perspective, partial cut-away view of the apparatus of FIGS. 1A, 1B, and 1C, according to one or more examples of the present disclosure;

FIG. 4 is a schematic, perspective, exploded view of the apparatus of FIGS. 1A, 1B, and 1C, according to one or more examples of the present disclosure;

FIG. 5 is a schematic, perspective, exploded view of the apparatus of FIGS. 1A, 1B, and 1C, according to one or more examples of the present disclosure;

FIG. 6 is a schematic, perspective, sectional view of a sub-assembly of the apparatus of FIGS. 1A, 1B, and 1C, according to one or more examples of the present disclosure;

FIG. 7 is a schematic, elevation, sectional view of a sub-assembly of the apparatus of FIGS. 1A, 1B, and 1C, according to one or more examples of the present disclosure;

FIG. 8 is a schematic, perspective view of a sleeve and a cartridge of the apparatus of FIGS. 1A, 1B, and 1C, according to one or more examples of the present disclosure;

FIG. 9 is a schematic, perspective, exploded view of the sleeve and the cartridge of FIG. 8, according to one or more examples of the present disclosure;

FIG. 10 is a schematic, elevation, sectional view of a sleeve, a cartridge, and an annular plunger of the apparatus of FIGS. 1A, 1B, and 1C, according to one or more examples of the present disclosure;

FIG. 11 is a schematic, perspective view of a push-lock pressure cap of the apparatus of FIGS. 1A, 1B, and 1C, according to one or more examples of the present disclosure;

FIG. 12 is a schematic, elevation, sectional view of the push-lock pressure cap of FIG. 11, according to one or more examples of the present disclosure;

FIG. 13 is a schematic, perspective, exploded view of the push-lock pressure cap of FIG. 11, according to one or more examples of the present disclosure;

FIG. 14 is a schematic, perspective view of an annular plunger of the apparatus of FIGS. 1A, 1B, and 1C, according to one or more examples of the present disclosure;

FIG. 15 is a schematic, perspective, exploded view of the annular plunger of FIG. 14, according to one or more examples of the present disclosure;

FIG. 16 is a schematic, perspective view of a valve and a linear actuator of the apparatus of FIGS. 1A, 1B, and 1C, according to one or more examples of the present disclosure;

FIG. 17 is a schematic, perspective, exploded view of the valve and the linear actuator of FIG. 16, according to one or more examples of the present disclosure;

FIG. 18 is a schematic, elevation, sectional view of a valve and a linear actuator of the apparatus of FIGS. 1A, 1B, and 1C, according to one or more examples of the present disclosure;

FIG. 19 is a schematic, elevation, sectional view of a valve of the apparatus of FIGS. 1A, 1B, and 1C, according to one or more examples of the present disclosure;

FIG. 20 is a schematic, perspective view of a valve of the apparatus of FIGS. 1A, 1B, and 1C, according to one or more examples of the present disclosure;

FIG. 21 is a schematic, perspective view of a valve-locking assembly of the apparatus of FIGS. 1A, 1B, and 1C, according to one or more examples of the present disclosure;

FIG. 22 is a schematic, perspective, exploded view of the valve-locking assembly of FIG. 21, according to one or more examples of the present disclosure;

FIG. 23 is a schematic, perspective view of a sub-assembly of the apparatus of FIGS. 1A, 1B, and 1C, according to one or more examples of the present disclosure;

FIG. 24 is a schematic, perspective view of a sub-assembly of the apparatus of FIGS. 1A, 1B, and 1C, according to one or more examples of the present disclosure;

FIG. 25 is a schematic, perspective view of a bracket of the apparatus of FIGS. 1A, 1B, and 1C, according to one or more examples of the present disclosure;

FIG. 26 is a schematic, elevation, sectional view of a tensioner of the apparatus of FIGS. 1A, 1B, and 1C, according to one or more examples of the present disclosure;

FIG. 27 is a schematic, bottom view of a valve of the apparatus of FIGS. 1A, 1B, and 1C, according to one or more examples of the present disclosure;

FIG. 28 is a schematic, perspective view of a nozzle of the apparatus of FIGS. 1A, 1B, and 1C, according to one or more examples of the present disclosure;

FIG. 29 is a schematic, elevation, sectional view of the nozzle of FIG. 28, according to one or more examples of the present disclosure;

FIGS. 30A and 30B, collectively, are a block diagram of a method of depositing an extrudable substance onto a surface utilizing the apparatus of FIGS. 1A, 1B, and 1C, according to one or more examples of the present disclosure;

FIG. 31 is a block diagram of aircraft production and service methodology; and

Figure 32:
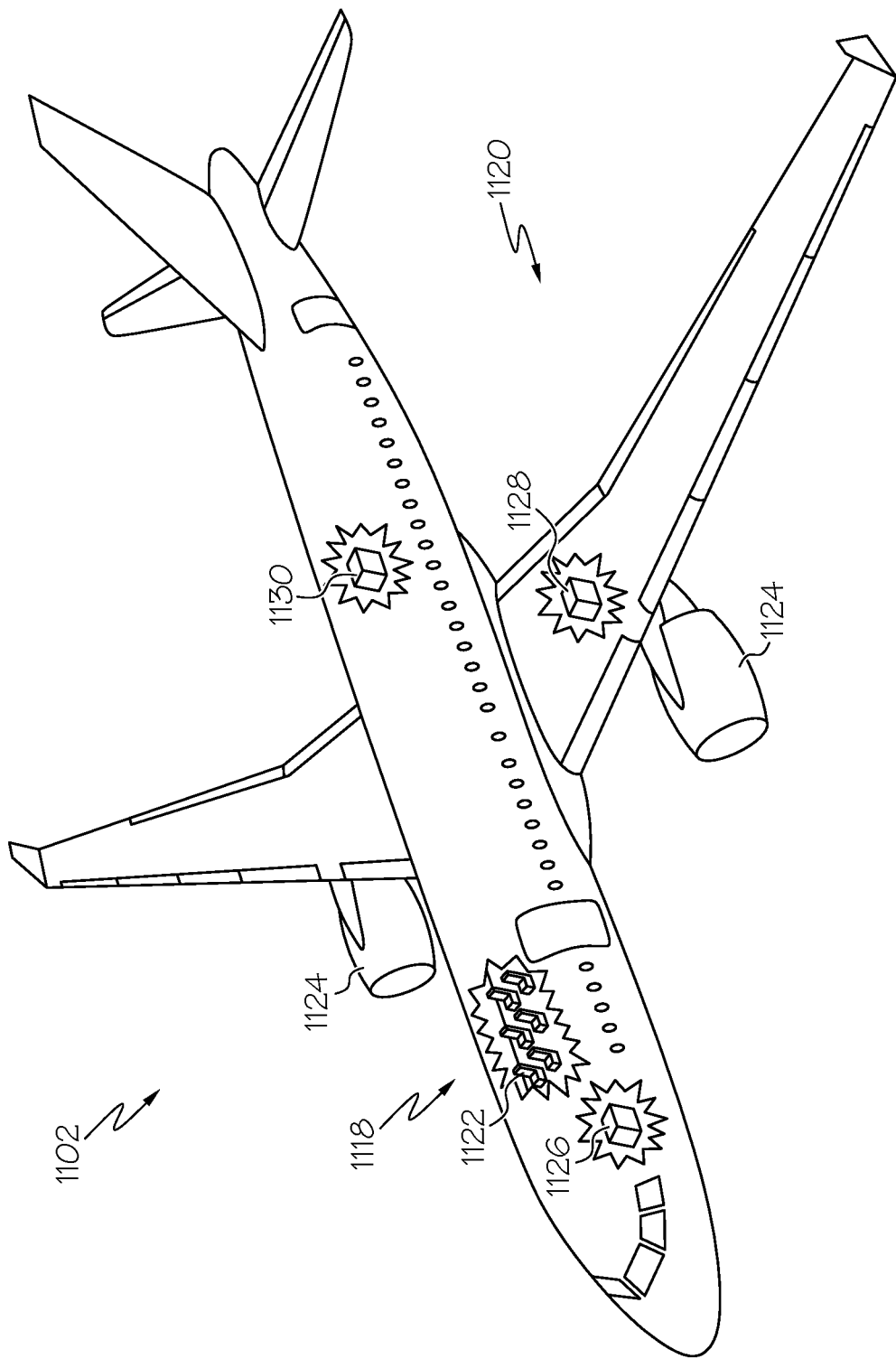

FIG. 32 is a schematic illustration of an aircraft.

DETAILED DESCRIPTION

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

In FIGS. 30A, 30B, and 31, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 30A, 30B, and 31 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A, 1B, and 1C and particularly to, e.g., FIGS. 2-7, apparatus 100 for depositing extrudable substance 102 onto surface 154 is disclosed. Apparatus 100 comprises bracket 104, configured to be removably coupled to robot 116. Apparatus 100 also comprises sleeve 110, comprising inner tubular sleeve wall 114 and outer tubular sleeve wall 112, circumscribing inner tubular sleeve wall 114. Sleeve 110 is coupled to bracket 104 and is rotatable relative to bracket 104 about first axis 118. Apparatus 100 further comprises cartridge 124, comprising inner tubular cartridge wall 126 and outer tubular cartridge wall 128, circumscribing inner tubular cartridge wall 126. Cartridge 124 is configured to be positioned between inner tubular sleeve wall 114 and outer tubular sleeve wall 112. Apparatus 100 additionally comprises valve 140, configured to be communicatively coupled with cartridge 124. Apparatus 100 further comprises nozzle 152, configured to be communicatively coupled with valve 140. Apparatus 100 also comprises linear actuator 138 to control flow of extrudable substance 102 from valve 140 to nozzle 152. Apparatus 100 additionally comprises annular plunger 148, positioned between inner tubular cartridge wall 126 and outer tubular cartridge wall 128 and movable along first axis 118. Apparatus 100 also comprises push-lock pressure cap 150, configured to be hermetically coupled with cartridge 124. Cartridge 124 is configured to be positioned between push-lock pressure cap 150 and valve 140. The preceding subject matter of this paragraph characterizes example 1 of the present disclosure.

Apparatus 100 provides for depositing extrudable substance, from cartridge, though nozzle 152, to surface 154 (FIG. 1C) of a workpiece (not shown), for example, located in a confined space. A configuration of sleeve 110 and cartridge 124 reduces the size requirement for storage of extrudable substance 102 and allows linear actuator 138 and portion of valve 140 to be located, or housed, within sleeve 110. Push-lock pressure cap 150 enables pressurization of an interior volume, located within cartridge 124, which drives annular plunger 148. Rotation of sleeve 110 controls position of nozzle 152 relative to bracket 104 and surface 154. Valve 140 being communicatively coupled directly to cartridge 124 reduces wasted amounts of extrudable substance 102, for example, during replacement of cartridge 124 and/or a purging operation.

Apparatus 100 is configured to facilitate a reduction in the labor, time, and inaccuracies associated with the application of extrudable substance 102 onto surface 154 (and/or other surfaces) of the workpiece. Apparatus 100 is further configured to facilitate the automated application of extrudable substance 102 within a confined space, such as within a wing box of an aircraft.

As used herein, extrudable substance 102 refers to any substance or material that is capable of being pressed, pushed, or otherwise forced out of an orifice while maintaining a cross-sectional shape approximately matching a cross-sectional shape of the orifice. Examples of extrudable substance 102 include, but are not limited to, sealants, adhesives, and fillers. Extrudable substance 102 may be used for purposes of sealing, corrosion resistance, and/or fixation, among other purposes.

Generally, apparatus 100 functions as an automated end effector that is operably coupled with an end of robot 116 (FIG. 2) or other robotic arm mechanism and that is designed to interact with the environment by depositing extrudable substance 102 onto surface 154. Cartridge 124 of apparatus 100 provides for the containment of extrudable substance 102. Sleeve 110 of apparatus 100 enables a secure coupling of cartridge 124 to apparatus 100. Push-lock pressure cap 150 enables access to sleeve 110 for insertion of cartridge 124 into sleeve 110 and removal of cartridge 124 from within sleeve 110. Push-lock pressure cap 150 also enables the application of pressure to (e.g., within) cartridge 124 for moving annular plunger 148 along first axis 118. Movement of annular plunger 148 urges extrudable substance 102 out of cartridge 124 and into valve 140. With cartridge 124 received within sleeve 110 and push-lock pressure cap 150 in a closed and locked position, cartridge 124 is sealed with valve 140 to enable sealed flow of extrudable substance 102 from cartridge 124 to valve 140 via the application of pressure to annular plunger 148. Nozzle 152 is sealed to valve 140 to direct flow of extrudable substance 102 from valve 140 to surface 154. Linear actuator 138 facilitates control of flow of extrudable substance 102 from valve 140 to nozzle 152 by selectively opening and closing valve 140. In one example, linear actuator 138 is any of various linear actuators powered in any of various ways, such as pneumatically, electrically, hydraulically, and the like.

With sleeve 110 coupled to bracket 104, inner tubular sleeve wall 114 of sleeve 110 circumscribes first axis 118. In one example, each of inner tubular sleeve wall 114 and outer tubular sleeve wall 112 of sleeve 110 has any tubular shape, suitable to receive cartridge 124 and rotate relative to bracket 104. In an example, inner tubular sleeve wall 114 and outer tubular sleeve wall 112 of sleeve 110 each has a circular cross-sectional shape. In another example, inner tubular sleeve wall 114 and outer tubular sleeve wall 112 of sleeve 110 each have an elliptical cross-sectional shape. Similarly, with cartridge 124 received within sleeve 110, inner tubular cartridge wall 126 of cartridge 124 circumscribes first axis 118 and inner tubular sleeve wall 114 and outer tubular sleeve wall 112 circumscribes outer tubular cartridge wall 128. In some examples, each of inner tubular cartridge wall 126 and outer tubular cartridge wall 128 of cartridge 124 has any tubular shape, suitable to contain extrudable substance 102 and fit between inner tubular sleeve wall 114 outer tubular sleeve wall 112. In an example, each of inner tubular cartridge wall 126 and outer tubular cartridge wall 128 of cartridge 124 has a circular cross-sectional shape. In another example, each of inner tubular cartridge wall 126 and outer tubular cartridge wall 128 of cartridge 124 has an elliptical cross-sectional shape. In one example, first axis 118 is a central longitudinal axis of apparatus 100.

In one example, sleeve 110 is coupled to bracket 104 in any manner suitable to enable rotation of sleeve 110 about first axis 118 relative to bracket 104. In an example, apparatus 100 also includes one or more annular bearings 176 coupled to an exterior of outer tubular sleeve wall 112 of sleeve 110. In an example, a first one of annular bearings 176 is located at one end of sleeve 110 and a second one of annular bearings 176 is located at the other end of sleeve 110.

In an example, apparatus 100 has an overall longitudinal dimension (e.g., a height) of between approximately 5 inches (12.7 cm) and 6 inches (15.2 cm), such as approximately 5.2 inches (13.2 cm). The overall longitudinal dimension of apparatus 100 is measured from push-lock pressure cap 150 to nozzle 152. In an example, a longitudinal dimension of apparatus 100 measured from push-lock pressure cap 150 to valve 140 is approximately 4.4 inches (11.2 cm). In an example, cartridge 124 is configured to contain approximately 4.8 oz. of extrudable substance 102.

Referring generally to FIGS. 1A, 1B, and 1C and particularly to, e.g., FIGS. 8 and 9, sleeve 110 further comprises sleeve first end 120, comprising annular sleeve end-opening 162 that separates inner tubular sleeve wall 114 and outer tubular sleeve wall 112. Sleeve 110 is configured to receive cartridge 124 through annular sleeve end-opening 162. The preceding subject matter of this paragraph characterizes example 2 of the present disclosure, wherein example 2 also includes the subject matter according to example 1, above.

Annular sleeve end-opening 162 provides an access opening into sleeve 110 and facilitates insertion of cartridge 124 into sleeve 110 and for removal of cartridge 124 from within sleeve 110. Moreover, with push-lock pressure cap 150 coupled to sleeve 110, at least portion of push-lock pressure cap 150 is positioned within annular sleeve end-opening 162 to enable locking of push-lock pressure cap 150 to sleeve 110.

Referring generally to FIGS. 1A, 1B, and 1C and particularly to, e.g., FIG. 10, sleeve 110 further comprises at least portion of cartridge-ejection system 164, selectively operable to at least partially eject cartridge 124 from sleeve 110 through annular sleeve end-opening 162. The preceding subject matter of this paragraph characterizes example 3 of the present disclosure, wherein example 3 also includes the subject matter according to example 2, above.

Cartridge-ejection system 164 enables application of an ejection force sufficient to at least partially move cartridge 124 along first axis 118 through annular sleeve end-opening 162 for removal of cartridge 124 from within sleeve 110.

In examples, cartridge-ejection system 164 is configured to apply the ejection force directly to cartridge 124 to at least partially eject cartridge 124 from sleeve 110 through annular sleeve end-opening 162. In some examples, cartridge-ejection system 164 is any one of a mechanical system, a pneumatic system, an electro-mechanical system, and the like.

Referring generally to FIGS. 1A, 1B, and 1C and particularly to, e.g., FIGS. 8-10, sleeve 110 further comprises sleeve second end 122, opposite sleeve first end 120, and annular sleeve end-wall 168, interconnecting inner tubular sleeve wall 114 and outer tubular sleeve wall 112 at sleeve second end 122. Cartridge-ejection system 164 comprises sleeve pressure input 166, configured to communicate pneumatic pressure through annular sleeve end-wall 168 to at least partially push cartridge 124 out of annular sleeve end-opening 162. The preceding subject matter of this paragraph characterizes example 4 of the present disclosure, wherein example 4 also includes the subject matter according to example 3, above.

Selective pneumatic operation of sleeve pressure input 166 enables application of pneumatic pressure between annular sleeve end-wall 168 and cartridge 124 to push cartridge 124 out of sleeve 110 through annular sleeve end-opening 162. Moreover, selective pneumatic operation of sleeve pressure input 166 facilitates use of automated pneumatic controls to control pneumatic operation of sleeve pressure input 166 of sleeve 110.

In an example, sleeve pressure input 166 of cartridge-ejection system 164 includes (or is) a pneumatic fitting, coupled to annular sleeve end-wall 168 and configured to communicate pneumatic pressure through annular sleeve end-wall 168. Cartridge-ejection system 164 enables application of pneumatic pressure to cartridge 124 to create the ejection force for moving cartridge 124 along first axis 118. Pneumatic pressure is applied between annular sleeve end-wall 168 and cartridge 124 to at least partially eject cartridge 124 from sleeve 110. Cartridge-ejection system 164 also includes a pressure tube (e.g., an air hose) to facilitate communication of pressure to sleeve pressure input 166. In one example, the pressure tube communicates pressure from a source of pneumatic pressure to sleeve pressure input 166. In some examples, remaining portions of cartridge-ejection system 164 (e.g., source of pneumatic pressure, controller, pressure actuator, etc.) are located, for example, on an exterior of apparatus 100, on robot 116, etc.

Referring generally to FIGS. 1A, 1B, and 1C and particularly to, e.g., FIGS. 4, 5, and 23, apparatus 100 further comprises first drive assembly 192, configured to selectively controllably rotate sleeve 110 about first axis 118 relative to bracket 104. The preceding subject matter of this paragraph characterizes example 5 of the present disclosure, wherein example 5 also includes the subject matter according to any one of examples 1 to 4, above.

First drive assembly 192 facilitates automated, precise rotation of sleeve 110 about first axis 118 relative to bracket 104. Controlled selective rotary motion of sleeve 110 relative to bracket 104 enables selective adjustment of a rotational orientation of sleeve 110 about first axis 118 relative to bracket 104 and selective adjustment of an angular orientation of nozzle 152 relative to bracket 104 and relative to surface 154. Selective adjustability of the angular orientation of nozzle 152 relative to bracket 104 enables nozzle 152 to be positioned in any of numerous positions relative to first axis 118, bracket 104, and surface 154. Rotational movement of nozzle 152 relative to surface 154 facilitates deposition of extrudable substance 102 onto various areas of surface 154 without having to change the position of apparatus 100, for example, via robot 116.

Referring generally to FIGS. 1A, 1B, and 1C and particularly to, e.g., FIGS. 4, 5, and 23, first drive assembly 192 comprises first motor 136 and first power-transmitting component 184, operatively coupled with first motor 136 and sleeve 110. Sleeve 110 further comprises splines 180, projecting outwardly from outer tubular sleeve wall 112. First power-transmitting component 184 comprises teeth 172, configured to mate with splines 180 of sleeve 110. The preceding subject matter of this paragraph characterizes example 6 of the present disclosure, wherein example 6 also includes the subject matter according to example 5, above.

First motor 136 being operatively coupled with first power-transmitting component 184 and sleeve 110 being operatively coupleable with first power-transmitting component 184 enables first motor 136 to controllably selectively rotate sleeve 110. Teeth 172 of first power-transmitting component 184 and splines 180 of sleeve 110 enable an interference fit between first power-transmitting component 184 and sleeve 110. Mating engagement of teeth 172 of first power-transmitting component 184 with splines 180 of sleeve 110 enables co-rotation of first power-transmitting component 184 and sleeve 110. Controlled selective rotation of first power-transmitting component 184 by first motor 136 enables rotational tracking of sleeve 110 relative to bracket 104.

Generally, in various examples, first motor 136 includes an output shaft that is rotatable by first motor 136 to produce a rotary force or torque when first motor 136 is operated. In various examples, first motor 136 is any one of various rotational motors, such as an electric motor, a hydraulic motor, a pneumatic motor, an electromagnetic motor, and the like. In various examples, first motor 136 is coupled to interface bracket 224.

First power-transmitting component 184 facilitates the transmission of power and provides an efficient and reliable mechanism to transmit power from first motor 136 to sleeve 110, such as when first axis 118 is not co-axial with a rotational axis of first motor 136. In an example, first power-transmitting component 184 is a belt, operatively coupled with the output shaft of first motor 136. In other examples, first power-transmitting component 184 is any one of a chain, a gear, a gear train, and the like. Advantageously, the belt is lighter and cleaner than other implementations of first power-transmitting component 184, for example, the belt does not require lubrication for effective operation.

In one example, first drive assembly 192 includes one or more other transmission components, configured to operatively couple first motor 136 with first power-transmitting component 184 including, but not limited to, gears, belts, sprockets, and the like.

In an example, splines 180 project radially outwardly from the exterior of outer tubular sleeve wall 112 and are located circumferentially around outer tubular sleeve wall 112. With sleeve 110 coupled to bracket 104, splines 180 are oriented parallel with first axis 118. In an example, splines 180 extend from proximate to sleeve first end 120 of sleeve 110 to proximate to sleeve second end 122 of sleeve 110. In one example, splines 180 extend between annular bearings 176, coupled to outer tubular sleeve wall 112. In an example, splines 180 are located on only a circumferential portion of outer tubular sleeve wall 112 that is engaged by first power-transmitting component 184. Throughout the present disclosure, the term parallel refers to an orientation between items extending in approximately the same direction.

Referring generally to FIGS. 1A, 1B, and 1C and particularly to, e.g., FIGS. 24-26, bracket 104 comprises tensioner 194, configured to tension first power-transmitting component 184 with respect to first motor 136 and sleeve 110. The preceding subject matter of this paragraph characterizes example 7 of the present disclosure, wherein example 7 also includes the subject matter according to example 6, above.

Tensioner 194 facilitates application of adjustable tension to first power-transmitting component 184. With tensioner 194 engaged with and applying tension to first power-transmitting component 184, first power-transmitting component 184 maintains contact with a portion of outer tubular sleeve wall 112 so that teeth 172 of first power-transmitting component 184 remain are mated with splines 180 of sleeve 110.

Referring generally to FIGS. 1A, 1B, and 1C and particularly to, e.g., FIGS. 24-26, tensioner 194 comprises tensioner base 196, coupled to bracket 104, and tensioner pulley 198, coupled to tensioner base 196 and rotatable relative to tensioner base 196 about second axis 200, parallel to first axis 118. Tensioner pulley 198 is configured to engage first power-transmitting component 184. The preceding subject matter of this paragraph characterizes example 8 of the present disclosure, wherein example 8 also includes the subject matter according to example 7, above.

Tensioner base 196 sets a position of tensioner pulley 198 relative to bracket 104 and in tension with first power-transmitting component 184. Rotation of tensioner pulley 198 about second axis 200 enables free rotational movement of first power-transmitting component 184.

Referring generally to FIGS. 1A, 1B, and 1C and particularly to, e.g., FIGS. 24-26, tensioner base 196 is linearly moveable relative to bracket 104. The preceding subject matter of this paragraph characterizes example 9 of the present disclosure, wherein example 9 also includes the subject matter according to example 8, above.

Linear movement of tensioner base 196 enables adjustment of a position of tensioner base 196 relative to bracket 104 and adjustment of a tension applied to first power-transmitting component 184 by tensioner pulley 198.

In an example, tensioner base 196 is configured to move linearly away from bracket 104 and toward bracket 104. In an example, bracket 104 includes bracket wall 366. Tensioner base 196 is coupled to an interior of bracket wall 366 and is linearly movable relative to bracket wall 366. In an example, bracket wall 366 defines bracket opening 364. Bracket opening 364 provides access to sleeve 110 for first power-transmitting component 184, which passes through bracket opening 364. In an example, tensioner 194 is located within bracket opening 364.

Referring generally to FIGS. 1A, 1B, and 1C and particularly to, e.g., FIGS. 24-26, tensioner base 196 is not rotatable relative to bracket 104. The preceding subject matter of this paragraph characterizes example 10 of the present disclosure, wherein example 10 also includes the subject matter according to example 9, above.

Fixing a rotational orientation of tensioner base 196 relative to bracket 104 fixes second axis 200 of tensioner pulley 198 parallel to first axis 118 and enables tensioner pulley 198 to maintain positive contact with first power-transmitting component 184.

Referring generally to FIGS. 1A, 1B, and 1C and particularly to, e.g., FIG. 26, tensioner 194 further comprises tensioner-biasing element 204, configured to bias tensioner pulley 198 against first power-transmitting component 184. The preceding subject matter of this paragraph characterizes example 11 of the present disclosure, wherein example 11 also includes the subject matter according to example 10, above.

Tensioner-biasing element 204 enables tensioner pulley 198 to remain engaged with first power-transmitting component 184. Engagement of tensioner pulley 198 with first power-transmitting component 184 facilitates constant application of tension on first power-transmitting component 184 during rotation of first power-transmitting component 184.

Referring generally to FIGS. 1A, 1B, and 1C and particularly to, e.g., FIG. 26, bracket 104 further comprises clearance hole 210 and counterbore 212, coaxial with clearance hole 210. Tensioner 194 further comprises fastener 208, passing through clearance hole 210 and through counterbore 212. Fastener 208 is threaded into tensioner base 196. The preceding subject matter of this paragraph characterizes example 12 of the present disclosure, wherein example 12 also includes the subject matter according to example 11, above.

Fastener 208 couples tensioner 194 to bracket 104. Fastener 208 also enables linear movement of tensioner base 196 relative to bracket 104. In an example, fastener 208 is configured to control a position of tensioner base 196 relative to bracket 104. Linear movement of tensioner base 196 relative to bracket 104 facilitates adjustment of the position of tensioner pulley 198 relative to first power-transmitting component 184, for example, to reduce or increase the tension applied to first power-transmitting component 184 by tensioner pulley 198.

Referring generally to FIGS. 1A, 1B, and 1C and particularly to, e.g., FIG. 26, tensioner 194 further comprises slide pin 214, fixed relative to one of bracket 104 or tensioner base 196 and movable relative to other one of bracket 104 or tensioner base 196. The preceding subject matter of this paragraph characterizes example 13 of the present disclosure, wherein example 13 also includes the subject matter according to example 12, above.

Slide pin 214 enables linear movement of tensioner base 196 relative to bracket 104 and prohibits rotational movement of tensioner base 196 about fastener 208 relative to bracket 104. Linear movement of tensioner base 196 facilitates adjustment of the position of tensioner pulley 198 relative to first power-transmitting component 184. Non-rotation of tensioner pulley 198 maintains an orientation of first power-transmitting component 184 during co-rotation of first power-transmitting component 184 and sleeve 110.

Referring generally to FIGS. 1A, 1B, and 1C and particularly to, e.g., FIG. 26, tensioner-biasing element 204 comprises compression spring 216, positioned between bracket 104 and tensioner base 196. Compression spring 216 is located in counterbore 212. The preceding subject matter of this paragraph characterizes example 14 of the present disclosure, wherein example 14 also includes the subject matter according to example 12 or 13, above.

Compression spring 216 enables tensioner base 196 to be pushed, or biased, away from bracket 104 to position tensioner pulley 198 in tension with first power-transmitting component 184. In an example, compression spring 216 is a helical, or coil, compression spring located around fastener 208 with one end engaged with tensioner base 196 and the other end engaged with an interior surface of counterbore 212.

Referring generally to FIGS. 1A, 1B, and 1C and particularly to, e.g., FIGS. 5, 8, and 23, apparatus 100 further comprises robot interface 222, configured to be coupled to robot 116, and interface bracket 224, configured to be coupled to robot interface 222 and linearly moveable relative to robot interface 222. Apparatus 100 also comprises proximity sensor 190, coupled to interface bracket 224 and configured to detect when sleeve 110 is in predetermined rotational orientation relative to bracket 104, and homing element 186, coupled to sleeve 110 and configured to actuate proximity sensor 190 when sleeve 110 is rotated about first axis 118 to a predetermined rotational orientation. The preceding subject matter of this paragraph characterizes example 15 of the present disclosure, wherein example 15 also includes the subject matter according to any one of examples 5 to 14, above.

Robot interface 222 enables quick coupling of apparatus 100 with robot 116 and quick releasing of apparatus 100 from robot 116. Interface bracket 224 enables movable coupling of bracket 104 to robot interface 222. Linear movement of interface bracket 224 relative to robot interface 222 enables linear movement of bracket 104 relative to robot 116. Homing element 186 enables actuation of proximity sensor 190 when sleeve 110 is rotated to the predetermined rotational orientation relative to bracket 104 to indicate that sleeve 110 is in a home position.

Use of homing element 186 and proximity sensor 190 to indicate the home position also enables use of an incremental position encoder, which is capable of determining the rotational orientation of sleeve 110 relative to bracket 104 following a power interruption, rather than an absolute position encoder, which would be unable to determine the rotational orientation of sleeve 110 relative to bracket 104 in case of a power interruption.

Referring generally to FIGS. 1A, 1B, and 1C, homing element 186 comprises magnet 188 on outer tubular sleeve wall 112. Proximity sensor 190 comprises magnetic sensor 220. The preceding subject matter of this paragraph characterizes example 16 of the present disclosure, wherein example 16 also includes the subject matter according to example 15, above.

Magnet 188 enables non-contact actuation of magnetic sensor 220 when sleeve 110 is rotated to the predetermined rotational orientation relative to bracket 104 to indicate that sleeve 110 is in the home position.

Referring generally to FIGS. 1A, 1B, and 1C and particularly to, e.g., FIGS. 2 and 3, bracket 104 is linearly moveable along first axis 118 relative to robot 116. The preceding subject matter of this paragraph characterizes example 17 of the present disclosure, wherein example 17 also includes the subject matter according to any one of examples 1 to 16, above.

Linear movement of bracket 104 relative to robot 116 enables linear movement of nozzle 152 relative to robot 116 and to surface 154. Linear movement of nozzle 152 relative to surface 154 facilitates deposition of extrudable substance 102 on surface 154, having an irregular shape, or on multiple other surfaces of the workpiece, for example, without having to change the position of apparatus 100 via robot 116.

Referring generally to FIGS. 1A, 1B, and 1C and particularly to, e.g., FIGS. 3-5, apparatus 100 further comprises robot interface 222, configured to be coupled to robot 116, and interface bracket 224, configured to be coupled to robot interface 222 and linearly moveable relative to robot interface 222. Bracket 104 is coupled to interface bracket 224. The preceding subject matter of this paragraph characterizes example 18 of the present disclosure, wherein example 18 also includes the subject matter according to example 17, above.

Robot interface 222 enables quick coupling of apparatus 100 with robot 116 and quick releasing of apparatus 100 from robot 116. Interface bracket 224 enables movable coupling of bracket 104 to robot interface 222. Linear movement of interface bracket 224 relative to robot interface 222 facilitates linear movement of bracket 104 relative to robot 116.

In some examples, robot interface 222 also facilitates quick coupling of communication lines between apparatus 100 and robot 116. In one example, robot interface 222 enables automated coupling of apparatus 100 with robot 116 and automated releasing of apparatus 100 from robot 116. In various examples, robot interface 222 is a tool-side portion of a pneumatic quick-change mechanism and robot 116 includes a tool interface of the pneumatic quick-change mechanism.

In an example, interface bracket 224 includes a pair of bracket arms 400. Bracket arms 400 facilitate engagement of interface bracket 224 with robot interface 222 and guide linear motion of interface bracket 224 relative to robot interface 222. In an example, each one of bracket arms 400 includes guide channel 402 and robot interface 222 includes a pair of guide rails 404. Guide channel 402 of bracket arms 400 is configured to receive and move along an associated one of guide rails 404.

Referring generally to FIGS. 1A, 1B, and 1C and particularly to, e.g., FIGS. 3-5, interface bracket 224 is selectively linearly movable along first axis 118 relative to robot interface 222. The preceding subject matter of this paragraph characterizes example 19 of the present disclosure, wherein example 19 also includes the subject matter according to example 18, above.

Selective linear movement of interface bracket 224 along first axis 118 relative to robot interface 222 enables controlled, selective adjustment of the linear position of bracket 104 relative to robot 116 and controlled, selective adjustment of the linear position of nozzle 152 relative to surface 154. Controlled, selective linear movement of nozzle 152 relative to surface 154 facilitates deposition of extrudable substance 102 on surface 154, having an irregular shape, or on multiple other surfaces of the workpiece.

Referring generally to FIGS. 1A, 1B, and 1C and particularly to, e.g., FIGS. 2-7, apparatus 100 further comprises second drive assembly 228, configured to selectively controllably translate interface bracket 224 along first axis 118 relative to robot interface 222. The preceding subject matter of this paragraph characterizes example 20 of the present disclosure, wherein example 20 also includes the subject matter according to example 19, above.

Second drive assembly 228 facilitates automated, precise linear translation of interface bracket 224 along first axis 118 relative to robot interface 222. Controlled selective linear movement of interface bracket 224 relative to robot interface 222 facilitates controlled selective adjustment of a linear position of bracket 104 along first axis 118 relative to robot interface 222 and controlled selective adjustment of a linear position of nozzle 152 relative to surface 154.

Referring generally to FIGS. 1A, 1B, and 1C and particularly to, e.g., FIGS. 4 and 5, second drive assembly 228 comprises second motor 206 and second power-transmitting component 226, operatively coupled with second motor 206 and interface bracket 224. The preceding subject matter of this paragraph characterizes example 21 of the present disclosure, wherein example 21 also includes the subject matter according to example 20, above.

Second motor 206 being operatively coupled with second power-transmitting component 226 and interface bracket 224 being operatively coupled with second power-transmitting component 226 enables second motor 206 to controllably translate interface bracket 224 relative to robot interface. Second power-transmitting component 226 enables selective linear movement of interface bracket 224 along an axis parallel to first axis 118 relative to robot interface 222. With second power-transmitting component 226 operatively coupled with interface bracket 224, operation of second power-transmitting component 226 enables selective linear movement of interface bracket 224 relative to robot interface 222. Additionally, controlled selective translation of interface bracket 224 relative to robot interface 222 enables automated linear tracking of interface bracket 224 relative to robot interface 222.

Generally, in various examples, second motor 206 includes an output shaft that is rotatable by second motor 206 to produce a rotary force or torque when second motor 206 is operated. In various examples, second motor 206 is any one of various rotational motors, such as an electric motor, a hydraulic motor, a pneumatic motor, an electromagnetic motor, and the like. In various examples, second motor 206 is coupled to robot interface 222.

Second power-transmitting component 226 facilitates the transmission of power and provides an efficient and reliable mechanism to transmit power from second motor 206 to interface bracket 224. In examples, second power-transmitting component 226 is any one of a translation screw drive, a chain, a belt, a gear, a gear train, and the like.

In one example, second drive assembly 228 also includes one or more other transmission components, configured to operatively couple second motor 206 with second power-transmitting component 226 including, but not limited to, gears, belts, sprockets, and the like.

Referring generally to FIGS. 1A, 1B, and 1C and particularly to, e.g., FIGS. 4 and 5, second power-transmitting component 226 of second drive assembly 228 comprises ball screw 230, rotationally coupled with robot interface 222, and ball nut 232, coupled to interface bracket 224 and operatively coupled with ball screw 230. The preceding subject matter of this paragraph characterizes example 22 of the present disclosure, wherein example 22 also includes the subject matter according to example 21, above.

Ball screw 230 and ball nut 232 enable translation of rotational motion of second motor 206, via second power-transmitting component 226, to linear motion of interface bracket 224 relative to robot interface 222. Advantageously, selection of ball screw 230 and ball nut 232 enables apparatus 100 to withstand high thrust loads and enables precise control of linear movement of interface bracket 224 relative to robot interface 222.

Referring generally to FIGS. 1A, 1B, and 1C and particularly to, e.g., FIGS. 8-10, cartridge 124 further comprises cartridge first end 130, comprising annular cartridge end-opening 170 that separates inner tubular cartridge wall 126 and outer tubular cartridge wall 128. Cartridge 124 is configured to receive extrudable substance 102 through annular cartridge end-opening 170. The preceding subject matter of this paragraph characterizes example 23 of the present disclosure, wherein example 23 also includes the subject matter according to any one of examples 1 to 22, above.

Annular cartridge end-opening 170 enables access for deposition of extrudable substance 102 into cartridge 124. Moreover, when push-lock pressure cap 150 is coupled to sleeve 110, at least portion of push-lock pressure cap 150 is positioned within annular cartridge end-opening 170 to form hermetic seal between push-lock pressure cap 150 and cartridge 124.

Referring generally to FIGS. 1A, 1B, and 1C and particularly to, e.g., FIGS. 7 and 10, cartridge 124 further comprises cartridge second end 132, opposite cartridge first end 130, and annular cartridge end-wall 174, interconnecting inner tubular sleeve wall 114 and outer tubular sleeve wall 112 at cartridge second end 132. Cartridge 124 also comprises cartridge outlet port 134, passing through annular cartridge end-wall 174 and configured to be communicatively coupled with valve 140. The preceding subject matter of this paragraph characterizes example 24 of the present disclosure, wherein example 24 also includes the subject matter according to example 23, above.

Cartridge outlet port 134 of cartridge 124 enables transfer of extrudable substance 102 from cartridge 124 to valve 140.

In various examples, cartridge 124 includes more than one cartridge outlet port 134. In these examples, each cartridge outlet port 134 is configured to be communicatively coupled with valve 140. In one example, cartridge outlet port 134 includes a gasket, configured to form a seal between cartridge outlet port 134 and valve 140.

Sleeve 110 also includes at least one pass-through port 414 passing through annular sleeve end-wall 168. The pass-through port of sleeve 110 is configured to enable cartridge outlet port 134 to be communicatively coupled with valve 140 such that extrudable substance 102 can flow from cartridge 124 into valve 140.

In various examples, cartridge-ejection system 164 enables application of pneumatic pressure between annular sleeve end-wall 168 and annular cartridge end-wall 174 to at least partially eject cartridge 124 from sleeve 110.

Referring generally to FIGS. 1A, 1B, and 1C and particularly to, e.g., FIG. 9, apparatus 100 further comprises cartridge-alignment feature 160, configured to set rotational orientation of cartridge 124 about first axis 118 relative to sleeve 110 and valve 140. The preceding subject matter of this paragraph characterizes example 25 of the present disclosure, wherein example 25 also includes the subject matter according to any one of examples 1 to 24, above.

Cartridge-alignment feature 160 enables proper alignment of cartridge 124 relative to valve 140 such that cartridge 124 is in communication with valve 140 upon cartridge 124 being received by sleeve 110. Setting the rotational orientation of cartridge 124 relative to sleeve 110 and, thus, relative to valve 140 facilitates cartridge 124 being in fluid communication with valve 140. In one example, cartridge-alignment feature 160 ensures that cartridge 124 is in a proper rotational orientation relative to valve 140 in order to align and communicatively couple cartridge outlet port 134 with valve 140.

In an example, cartridge-alignment feature 160 includes alignment protrusion 406 and alignment groove 408. Alignment and engagement of alignment protrusion 406 with alignment groove 408 facilitates proper rotational orientation of cartridge 124 relative to valve 140 with cartridge 124 in fluid communication with valve 140. In one example, alignment protrusion 406 is located on and projects outwardly from an interior surface of inner tubular cartridge wall 126 and alignment groove 408 is located on and is recessed inwardly from an exterior surface of inner tubular sleeve wall 114. In other examples, alignment protrusion 406 and alignment groove 408 are located on outer tubular cartridge wall 128 and outer tubular sleeve wall 112, respectively. In various other examples, locations of alignment protrusion 406 and alignment groove 408 on respective ones of inner tubular cartridge wall 126, outer tubular cartridge wall 128, inner tubular sleeve wall 114, and/or outer tubular sleeve wall 112 vary. In some examples, configurations of alignment protrusion 406 and alignment groove 408 relative to the interior surface and/or exterior surface of inner tubular cartridge wall 126, outer tubular cartridge wall 128, inner tubular sleeve wall 114, and/or outer tubular sleeve wall 112 vary.

Referring generally to FIGS. 1A, 1B, and 1C and particularly to, e.g., FIGS. 2-6 and 11-13, push-lock pressure cap 150 comprises spring-loaded latches 256, moveable relative to sleeve 110 between locked position, in which spring-loaded latches 256 are engaged with sleeve 110, and unlocked position, in which spring-loaded latches 256 are disengaged from sleeve 110. The preceding subject matter of this paragraph characterizes example 26 of the present disclosure, wherein example 26 also includes the subject matter according to any one of examples 1 to 25, above.

Spring-loaded latches 256 enable push-lock pressure cap 150 to be releasably locked to sleeve 110 and sealed with cartridge 124. With spring-loaded latches 256 engaged with sleeve 110, push-lock pressure cap 150 is releasably locked to sleeve 110. With spring-loaded latches 256 disengaged from sleeve 110, push-lock pressure cap 150 is unlocked from sleeve 110.

Using spring-loaded latches 256 to releasably lock push-lock pressure cap 150 in the closed position coupled to sleeve 110 prevents disengagement between push-lock pressure cap 150 and sleeve 110 and between push-lock pressure cap 150 and cartridge 124 upon communication of pressure to cartridge 124 to move annular plunger 148 along first axis 118 toward valve 140.

Referring generally to FIGS. 1A, 1B, and 1C and particularly to, e.g., FIGS. 2-6 and 11-13, spring-loaded latches 256 of one pair of spring-loaded latches 256, adjacent to each other, and spring-loaded latches 256 of any other pair of spring-loaded latches 256, adjacent to each other, have equal angular separations, as observed from first axis 118. The preceding subject matter of this paragraph characterizes example 27 of the present disclosure, wherein example 27 also includes the subject matter according to example 26, above.

Equal angular separations, as observed from first axis 118, of spring-loaded latches 256 of one pair of spring-loaded latches 256 and spring-loaded latches 256 of any other pair of spring-loaded latches 256 enables equal distribution of force on push-lock pressure cap 150 when pneumatic pressure is applied within cartridge 124 between push-lock pressure cap 150 and annular plunger 148.

In various examples, each one of spring-loaded latches 256 is disposed at equally angular spaced apart location about push-lock pressure cap 150 relative to adjacent one of spring-loaded latches 256. In some examples, push-lock pressure cap 150 includes two spring-loaded latches 256 that are equally spaced apart, three spring-loaded latches 256 that are equally spaced apart, etc.

Referring generally to FIGS. 1A, 1B, and 1C and particularly to, e.g., FIGS. 2-6 and 11, spring-loaded latches 256 are intrinsically biased in locked position. The preceding subject matter of this paragraph characterizes example 28 of the present disclosure, wherein example 28 also includes the subject matter according to example 26 or 27, above.

Spring-loaded latches 256 being intrinsically biased into the locked position enables spring-loaded latches 256 to lock push-lock pressure cap 150 to sleeve 110 until spring-loaded latches 256 are moved into the unlocked position. In other words, biasing spring-loaded latches 256 requires active engagement of spring-loaded latches 256 to unlock push-lock pressure cap 150 from sleeve 110.

Referring generally to FIGS. 1A, 1B, and 1C and particularly to, e.g., FIGS. 4-6 and 11-13, push-lock pressure cap 150 further comprises annular cap 250, configured to be at least partially received within sleeve 110 between inner tubular sleeve wall 114 and outer tubular sleeve wall 112. Push-lock pressure cap 150 also comprises annular cartridge interface 252, coupled to annular cap 250 and configured to be at least partially received within cartridge 124 between inner tubular cartridge wall 126 and outer tubular cartridge wall 128. The preceding subject matter of this paragraph characterizes example 29 of the present disclosure, wherein example 29 also includes the subject matter according to example 28, above.

Annular cap 250 provides a coupling interface between push-lock pressure cap 150 and sleeve 110. Annular cartridge interface 252 provides a sealing interface between push-lock pressure cap 150 and cartridge 124 to hermetically couple push-lock pressure cap 150 and cartridge 124.

In an example, push-lock pressure cap 150 also includes inner cap gasket 368 and outer cap gasket 370. Inner cap gasket 368 is configured to form a seal between push-lock pressure cap 150 and inner tubular cartridge wall 126 when push-lock pressure cap 150 is coupled to sleeve 110. Outer cap gasket 370 is configured to form a seal between push-lock pressure cap 150 and outer tubular cartridge wall 128 when push-lock pressure cap 150 is coupled to sleeve 110. In an example, inner cap gasket 368 is coupled to annular cartridge interface 252 to form a seal between annular cartridge interface 252 and inner tubular cartridge wall 126 when push-lock pressure cap 150 is coupled to sleeve 110. Outer cap gasket 370 is coupled to annular cartridge interface 252 to form a seal between annular cartridge interface 252 and outer tubular cartridge wall 128 when push-lock pressure cap 150 is coupled to sleeve 110. By forming a seal between push-lock pressure cap 150 and cartridge 124, inner cap gasket 368 and outer cap gasket 370 facilitate the containment of pressure within cartridge 124 to move annular plunger 148. In various examples, each of inner cap gasket 368 and outer cap gasket 370 is an O-ring, made of a pliable or compressible material, such as rubber silicone, and plastic polymers.

Referring generally to FIGS. 1A, 1B, and 1C and particularly to, e.g., FIGS. 11-13, push-lock pressure cap 150 further comprises cam 258, rotatable about first axis 118 relative to annular cap 250. Rotation of cam 258 transitions spring-loaded latches 256 between locked position and unlocked position. The preceding subject matter of this paragraph characterizes example 30 of the present disclosure, wherein example 30 also includes the subject matter according to example 29, above.

Cam 258, being rotatable about first axis 118, enables transition (e.g., movement) of spring-loaded latches 256 between the locked position, to couple push-lock pressure cap 150 to sleeve 110, and the unlocked position, to uncouple push-lock pressure cap 150 from sleeve 110. Cam 258 is configured to enable spring-loaded latches 256 to remain biased in the locked position until selective operation of cam 258. Spring-loaded latches 256, in the locked position relative to sleeve 110, will lock push-lock pressure cap 150 to sleeve 110. Selective operation of cam 258, via rotation of cam 258 about first axis 118 relative to annular cap 250, moves spring-loaded latches 256 into the unlocked position relative to sleeve 110 to unlock push-lock pressure cap 150 and sleeve 110.

In an example, when rotated in a first rotational direction (e.g., counterclockwise) about first axis 118, cam 258 is configured to simultaneously disengage spring-loaded latches 256 such that each one of spring-loaded latches 256 concurrently transitions from the unlocked position to the locked position. When rotated in a second rotational direction (e.g., clockwise) about first axis 118, cam 258 is configured to simultaneously engage spring-loaded latches 256 such that each one of spring-loaded latches 256 concurrently transitions from the locked position to the unlocked position. Simultaneous transition between the locked and unlocked position of spring-loaded latches 256 ensures that all of spring-loaded latches 256 are in their proper respective positions when locking and unlocking push-lock pressure cap 150 to sleeve 110.

Referring generally to FIGS. 1A, 1B, and 1C and particularly to, e.g., FIGS. 11-13, each of spring-loaded latches 256 comprises linear guide 234, coupled to annular cap 250, keeper 236, reciprocally movable along linear guide 234, and latch spring 238, coupled to keeper 236. With cam 258 in first rotational orientation, latch spring 238 pushes keeper 236 into locking aperture 240, formed in sleeve 110. With cam 258 in second rotational orientation, cam 258 pushes keeper 236 out of locking aperture 240, formed in sleeve 110. The preceding subject matter of this paragraph characterizes example 31 of the present disclosure, wherein example 31 also includes the subject matter according to example 30, above.

Spring-loaded latches 256 and cam 258 enable quick, easy, and effective locking and unlocking of push-lock pressure cap 150 to sleeve 110. With cam 258 rotated into a first rotational orientation, cam 258 enables linear movement of keeper 236 along linear guide 234 into a push-locked position, in which keeper 236 is inserted within locking aperture 240 to lock push-lock pressure cap 150 to sleeve 110. With cam 258 rotated into a second rotational orientation, cam 258 enables linear movement of keeper 236 into a push-unlocked position, in which keeper 236 is withdrawn from locking aperture 240 to unlock push-lock pressure cap 150 from sleeve 110.

Each of spring-loaded latches 256 is a passive lock mechanism that is simply constructed, yet effective at preventing inadvertent unlocking of push-lock pressure cap 150 from sleeve 110. In an example, linear guide 234 includes one or more slide pins coupled to annular cap 250 of push-lock pressure cap 150. Keeper 236 is movably coupled to linear guide 234 and is configured to linearly move along linear guide 234. In some examples, latch spring 238 is a helical, or coil, compression spring, coupled to keeper 236.

Latch spring 238 is configured to bias keeper 236 in the push-locked position with keeper 236 located within locking aperture 240 of sleeve 110 to lock push-lock pressure cap 150 to sleeve 110. Latch spring 238 facilitates a passive and simple way to bias spring-loaded latches 256 into the locked position to lock push-lock pressure cap 150 to sleeve 110.

In an example, keeper 236 includes bar 424. Bar 424 is configured to be inserted within and withdrawn from locking aperture 240 of sleeve 110 upon movement of keeper 236 between the push-locked and push-unlocked positions. Locking aperture 240 of sleeve 110 is located proximate to sleeve first end 120 within a portion of sleeve 110, configured to receive at least a portion of annular cap 250 of push-lock pressure cap 150. In an example, locking aperture 240 of sleeve 110 is formed through outer tubular sleeve wall 112 of sleeve 110. With keeper 236 in the push-locked position, bar 424 projects radially outward from push-lock pressure cap 150 and into locking aperture 240 of sleeve 110. In an example (not illustrated), locking aperture 240 of sleeve 110 is formed through inner tubular sleeve wall 114 of sleeve 110. With keeper 236 in the push-locked position, bar 424 projects radially inward from push-lock pressure cap 150 and into locking aperture 240 of sleeve 110. In some examples, bar 424 and locking aperture 240 have complementary shapes or profiles, such that bar 424 fits snuggly within locking aperture 240.

In an example, cam 258 includes an annular or semi-annular cam body and cam surfaces 378 projecting from the cam body. Each one of cam surfaces 378 is configured to engage an associated one of spring-loaded latches 256 when cam 258 is rotated into the second rotational orientation. Keeper 236 includes follower surface 380. Rotation of cam 258 moves each one of cam surfaces 378 into one of engagement with or disengagement from follower surface 380 of keeper 236 of each associated one of spring-loaded latches 256. As cam 258 is rotated into the second rotational orientation, cam surfaces 378 move along follower surface 380 of keeper 236 of each associated one of spring-loaded latches 256 to overcome the biasing force applied by latch spring 238 and push keeper 236 away from sleeve 110 to remove bar 424 from within locking aperture 240. As cam 258 is rotated back into the first rotational orientation, cam surfaces 378 move away from follower surface 380 of keeper 236 of each associated one of spring-loaded latches 256 to enable latch spring 238 to push keeper 236 toward sleeve 110 to insert bar 424 within locking aperture 240.

Referring generally to FIGS. 1A, 1B, and 1C and particularly to, e.g., FIGS. 11-13, push-lock pressure cap 150 further comprises cam lock 178, configured to releasably lock cam 258 in at least first rotational orientation. The preceding subject matter of this paragraph characterizes example 32 of the present disclosure, wherein example 32 also includes the subject matter according to example 31, above.

Cam lock 178 enables quick, easy, and effective locking and unlocking of cam 258 relative to annular cap 250. Releasably locking cam 258 with cam lock 178 prevents inadvertent rotation of cam 258 relative to annular cap 250.

In an example, cam lock 178 is a spring-biased locking mechanism. In one example, cam lock 178 includes plunger 382 that is moveably coupled to annular cap 250. An end of plunger 382 is configured to be inserted within and withdrawn from locking aperture 384 formed in a body of cam 258. Cam lock 178 also includes lock spring 386 coupled to plunger 382 and configured to bias plunger 382 into engagement within locking aperture 384 of cam 258. With the end of plunger 382 of cam lock 178 inserted within locking aperture 384 of cam 258, cam lock 178 restricts rotational movement of cam 258. In one example, cam lock 178 also includes a grip element, located at the opposing end of plunger 382, for example, on an exterior of annular cap 250, to enable an operator to manually withdraw plunger 382 from locking aperture 384 of cam 258. Once plunger 382 of cam lock 178 is removed from locking aperture 384 of cam 258, cam 258 can be rotated. In an example, cam 258 includes one locking aperture 384 appropriately located to engage cam lock 178 when cam 258 in the first rotational orientation to prevent inadvertent rotation of cam 258 into the second rotation orientation and movement of spring-loaded latches 256 into the unlocked position. In an example, cam 258 also includes another locking aperture 384, appropriately located to engage cam lock 178 when cam 258 in the second rotational orientation to prevent inadvertent rotation of cam 258 into the first rotation orientation and movement of spring-loaded latches 256 into the locked position.

Referring generally to FIGS. 1A, 1B, and 1C and particularly to, e.g., FIGS. 11-13, spring-loaded latches 256 and cam 258 are sandwiched between annular cap 250 and annular cartridge interface 252. The preceding subject matter of this paragraph characterizes example 33 of the present disclosure, wherein example 33 also includes the subject matter according to example 31 or 32, above.

Annular cap 250 and annular cartridge interface 252 sandwich spring-loaded latches 256 and cam 258 such that cam 258 is rotatable about first axis 118 relative to annular cap 250 and spring-loaded latches 256 are moveable relative to sleeve 110 between the locked position and the unlocked position.

In example, annular cap 250 includes cap openings 376. Each one of cap openings 376 is configured to at least partially receive keeper 236 of an associated one of spring-loaded latches 256. In an example, linear guide 234 of each one of spring-loaded latches 256 is coupled to annular cap 250 within an associated one of cap openings 376. Latch spring 238 of each one of spring-loaded latches 256 is located within the associated one of cap openings 376 such that movement of keeper 236 into the push-unlocked position within the associated one of cap openings 376 compresses latch spring 238 against annular cap 250. In one example, latch spring 238 is located around linear guide 234 and is coupled at one end to keeper 236 and the other end to annular cap 250. Annular cartridge interface 252 includes cap recesses 374. Each one of cap recesses 374 is configured to at least partially receive keeper 236 of an associated one of spring-loaded latches 256. In combination, cap openings 376 and cap recesses 374 retain keeper 236 of the associated one of spring-loaded latches 256 and enable reciprocal movement of spring-loaded latches 256 relative to annular cap 250 and annular cartridge interface 252.

In an example, cam 258 is movably coupled with annular cap 250. In one example, fasteners 388 couple cam 258 to annular cap 250 in such a way that cam 258 is capable of rotational movement relative to annular cap 250. In one example, annular cap 250 includes guide slots 390. Fasteners 388 are located within and move along guide slots 390 as cam 258 rotates relative to annular cap 250. In some examples, each one of fasteners 388 also includes a grip element that enables an operator to manually rotate cam 258 by moving fasteners 388 along guide slots 390.

Referring generally to FIGS. 1A, 1B, and 1C and particularly to, e.g., FIGS. 11-13, push-lock pressure cap 150 further comprises cap pressure input 246, configured to communicate pneumatic pressure within cartridge 124 to push annular plunger 148 along first axis 118 toward valve 140. The preceding subject matter of this paragraph characterizes example 34 of the present disclosure, wherein example 34 also includes the subject matter according to any one of examples 30 to 33, above.

Cap pressure input 246 enables communication of pneumatic pressure through annular cap 250 and annular cartridge interface 252 for application of a driving force to move annular plunger 148 along first axis 118 within cartridge 124, which in turn urges extrudable substance 102 from cartridge 124 into valve 140.

In some examples, apparatus 100 also includes a pressure tube (not illustrated) to facilitate communication of pressure to push-lock pressure cap 150. In one example, the pressure tube communicates pressure to cap pressure input 246 to facilitate pressurization of cartridge 124 and to control operation of annular plunger 148, such as linearly moving annular plunger 148 along first axis 118 toward valve 140. In various examples, cap pressure input 246 is a pneumatic fitting.

Selective pneumatic operation of cap pressure input 246 of push-lock pressure cap 150 enables precise application of pneumatic pressure to extrudable substance 102 in cartridge 124 to precisely control the flow of extrudable substance 102 out of cartridge 124 and into valve 140. Additionally, selective pneumatic operation of cap pressure input 246 facilitates the use of automated pneumatic controls to control the pneumatic operation of cap pressure input 246.

Referring generally to FIGS. 1A, 1B, and 1C and particularly to, e.g., FIGS. 14 and 15, annular plunger 148 comprises annular plunger body 282. Annular plunger 148 further comprises annular inner seal 284, coupled to annular plunger body 282 and located between annular plunger body 282 and inner tubular cartridge wall 126. Annular plunger 148 also comprises annular outer seal 286, coupled to annular plunger body 282 and located between annular plunger body 282 and outer tubular cartridge wall 128. Annular plunger 148 additionally comprises annular seal retainer 288, coupled to annular plunger body 282. Annular inner seal 284 and annular outer seal 286 are sandwiched between annular plunger body 282 and annular seal retainer 288. The preceding subject matter of this paragraph characterizes example 35 of the present disclosure, wherein example 35 also includes the subject matter according to any one of examples 1 to 34, above.

A two-member seal of annular plunger 148 enables annular plunger 148 to react to pneumatic pressure applied within cartridge 124, between push-lock pressure cap 150 and annular plunger 148, to move annular plunger 148 along first axis 118 toward valve 140. Annular inner seal 284 forms an inner seal between annular plunger body 282 and inner tubular cartridge wall 126. Annular outer seal 286 forms an outer seal between annular plunger body 282 and outer tubular cartridge wall 128. Annular plunger body 282 facilitates containment of pressure between push-lock pressure cap 150 and annular plunger 148. Annular seal retainer 288 being coupled to annular plunger body 282 retains annular inner seal 284 and annular outer seal 286.

Referring generally to FIGS. 1A, 1B, and 1C and particularly to, e.g., FIGS. 24 and 25, bracket 104 comprises first portion 106 and second portion 108, removably coupled to first portion 106. Sleeve 110 is capable of being separated from bracket 104 along first axis 118 when second portion 108 is removed from first portion 106. The preceding subject matter of this paragraph characterizes example 36 of the present disclosure, wherein example 36 also includes the subject matter according to any one of examples 1 to 35, above.

Bracket 104 that has two portions enables removal of sleeve 110, and other components of apparatus 100 coupled to sleeve 110, without completely removing bracket 104 from interface bracket 224. In one example, upon removal of second portion 108 of bracket 104 from first portion 106 of bracket 104, sleeve 110 can be withdrawn from within first portion 106 of bracket 104 along first axis 118.

In various examples, at least one of first portion 106 and second portion 108 of bracket 104 is removably coupled with interface bracket 224 such that first power-transmitting component 184 is capable of entering bracket 104 through bracket opening 364. In an example, bracket 104 includes shoulders 362. Shoulders 362 project inward from bracket wall 366. Bracket 104 is configured to capture and retain sleeve 110 between shoulders 362 upon second portion 108 of bracket 104 being coupled to first portion 106 of bracket 104 and to interface bracket 224. In one example, a first one of shoulders 362 engages the first one of annular bearings 176 coupled to sleeve 110 and a second one of shoulders 362 engages the second one of annular bearings 176 coupled to sleeve 110.

Referring generally to FIGS. 1A, 1B, and 1C and particularly to, e.g., FIGS. 4-7, 21, and 22, apparatus 100 further comprises valve-locking assembly 218, configured to releasably couple valve 140 with sleeve 110. The preceding subject matter of this paragraph characterizes example 37 of the present disclosure, wherein example 37 also includes the subject matter according to any one of examples 1 to 36, above.

Valve-locking assembly 218 enables quick, easy, and effective locking and unlocking of valve 140 to sleeve 110. Locking valve 140 to sleeve 110 facilitates retention of valve 140 in fluid communication with cartridge 124. Unlocking valve 140 from sleeve 110 facilitates removal of valve 140, for example, for purposes of repair and/or replacement of valve 140 or other components of apparatus 100.

Referring generally to FIGS. 1A, 1B, and 1C and particularly to, e.g., FIGS. 6, 7, 21, and 22, valve-locking assembly 218 comprises annular sleeve interface 244, coupled to sleeve 110 and annular valve interface 314, coupled to annular sleeve interface 244 and configured to receive portion of valve 140. Valve-locking assembly 218 further comprises twist-ring 248, moveably coupled with annular valve interface 314 and rotatable about first axis 118 relative to annular valve interface 314. Rotation of twist-ring 248 releasably locks valve 140 to valve-locking assembly 218. The preceding subject matter of this paragraph characterizes example 38 of the present disclosure, wherein example 38 also includes the subject matter according to example 37, above.

Annular sleeve interface 244 and annular valve interface 314 facilitate valve 140 being releasably coupled to sleeve 110. Twist-ring 248 enables valve 140 to be locked to annular valve interface 314 and unlocked from annular valve interface 314 via rotation of twist-ring 248.

In an example, annular sleeve interface 244 circumscribes and partially receives sleeve second end 122 of sleeve 110. In some examples, annular sleeve interface 244 is coupled to outer tubular sleeve wall 112. Twist-ring 248 sits inside of annular valve interface 314. In an example, valve-locking assembly 218 also includes retaining ring 410, configured to retain twist-ring 248 within annular valve interface 314. In one example, retaining ring 410 is a snap ring that fits inside of annular valve interface 314. Twist-ring 248 is sandwiched between annular valve interface 314 and retaining ring 410 and is rotatable about first axis 118 relative to annular valve interface 314.

Referring generally to FIGS. 1A, 1B, and 1C and particularly to, e.g., FIGS. 6, 7, 21, and 22, with twist-ring 248 in first rotation orientation, valve 140 is linearly movable along first axis 118 relative to valve-locking assembly 218. With twist-ring 248 in second rotation orientation, valve 140 is fixed along first axis 118 relative to valve-locking assembly 218. The preceding subject matter of this paragraph characterizes example 39 of the present disclosure, wherein example 39 also includes the subject matter according to example 38, above.

Twist-ring 248 being rotatable about first axis 118 relative to annular valve interface 314 enables twist-ring 248 to be rotated into a locked position, to lock valve 140 to valve-locking assembly 218, and an unlocked position, to unlock valve 140 from valve-locking assembly 218. Valve-locking assembly 218 facilitates at least partial insertion of valve 140 within annular valve interface 314 and removal of valve 140 from annular valve interface 314 by twist-unlocking twist-ring 248, or rotation of twist-ring 248 into the first rotational orientation, and linear movement of valve 140 along first axis 118 relative to sleeve 110. With valve 140 at least partially received by annular valve interface 314, valve-locking assembly 218 facilitates locking valve 140 to valve-locking assembly 218 by twist-locking twist-ring 248, or counter-rotation of twist-ring 248 into the second rotational orientation.

In an example, twist-ring 248 includes grip element 412. Grip element 412 projects outwardly from twist-ring 248 and extends beyond (e.g., through) annular valve interface 314 to enable an operator to manually rotate twist-ring 248 about first axis 118 to lock valve 140 to and unlock valve 140 from valve-locking assembly 218.

Referring generally to FIGS. 1A, 1B, and 1C and particularly to, e.g., FIGS. 21 and 22, valve-locking assembly 218 further comprises twist-ring lock 254, configured to selectively releasably lock twist-ring 248 in first rotational orientation or second rotational orientation. The preceding subject matter of this paragraph characterizes example 40 of the present disclosure, wherein example 40 also includes the subject matter according to example 39, above.

Twist-ring lock 254 enables quick, easy, and effective locking and unlocking of twist-ring 248 relative to annular valve interface 314. Releasably locking twist-ring 248 with twist-ring lock 254 prevents inadvertent rotation of twist-ring 248.

In an example, twist-ring lock 254 is a spring-biased locking mechanism. In some examples, twist-ring lock 254 is movably coupled with annular sleeve interface 244. In one example, twist-ring lock 254 is configured to provide at least one retaining orientation of twist-ring 248 relative to annular valve interface 314. In one example, twist-ring lock 254 is configured to selectively releasably fix twist-ring 248 relative to annular valve interface 314 in one of the first rotational orientation, in which valve 140 is unlocked from valve-locking assembly 218, or the second rotational orientation, in which valve 140 is locked to valve-locking assembly 218. In this manner, an operator can quickly and easily switch the orientation of twist-ring 248 between the locked and unlocked position while ensuring twist-ring 248 will be releasably fixed in the selected orientation. In some examples, twist-ring lock 254 includes at least on detent, having a projection (e.g., ball or pin) biased, via a biasing element (e.g., spring), into engagement with at least one aperture formed in twist-ring 248.

Referring generally to FIGS. 1A, 1B, and 1C and particularly to, e.g., FIGS. 4-7 and 16-20, valve 140 comprises first valve-body portion 260 and second valve-body portion 262, coupled to first valve-body portion 260. With valve 140 releasably locked to valve-locking assembly 218, first valve-body portion 260 is positioned within annular valve interface 314 and second valve-body portion 262 is positioned within inner tubular sleeve wall 114. The preceding subject matter of this paragraph characterizes example 41 of the present disclosure, wherein example 41 also includes the subject matter according to example 39 or 40, above.

When valve 140 is locked to valve-locking assembly 218, the configuration of valve 140 facilitates a reduction in the overall size of apparatus 100 by positioning second valve-body portion 262 of valve 140 within sleeve 110 and first valve-body portion 260 of valve 140 within annular sleeve interface 244.

In an example, first valve-body portion 260 has a disk-like shape, configured to be received by and fit within annular valve interface 314 of valve-locking assembly 218. Second valve-body portion 262 has a cylindrical shape, configured to be received by and fit within inner tubular sleeve wall 114.

Referring generally to FIGS. 1A, 1B, and 1C and particularly to, e.g., FIGS. 7, 16, 17, and 20, first valve-body portion 260 comprises peripheral wall 264. Twist-ring 248 engages peripheral wall 264 when twist-ring 248 is rotated about first axis 118. The preceding subject matter of this paragraph characterizes example 42 of the present disclosure, wherein example 42 also includes the subject matter according to example 41, above.

Engagement of peripheral wall 264 of first valve-body portion 260 by twist-ring 248 enables precise and reliable interlock between valve 140 and valve-locking assembly 218. Engagement of twist-ring 248 with first valve-body portion 260 facilitates the positioning of second valve-body portion 262 within sleeve 110. Engagement of twist-ring 248 with peripheral wall 264 of first valve-body portion 260 facilitates the placement of valve 140 into direct fluid communication with cartridge outlet port 134 of cartridge 124. Direct communicative coupling of valve 140 and cartridge 124 reduces the amount of extrudable substance 102 wasted due to a purging operation, for example, when replacing cartridge 124.

Referring generally to FIGS. 1A, 1B, and 1C and particularly to, e.g., FIGS. 16, 17, 21, and 22, twist-ring 248 comprises twist-lock elements 266, extending radially inward from twist-ring 248. First valve-body portion 260 further comprises twist-lock recesses 272, formed in peripheral wall 264 and configured to mate with twist-lock elements 266. Rotation of twist-ring 248 into second rotational orientation releasably locks twist-lock elements 266 within twist-lock recesses 272. The preceding subject matter of this paragraph characterizes example 43 of the present disclosure, wherein example 43 also includes the subject matter according to example 42, above.

Mating engagement of twist-lock elements 266 of twist-ring 248 within twist-lock recesses 272 of peripheral wall 264 of first valve-body portion 260 enables simple and effecting interlocking of valve 140 to valve-locking assembly 218 with valve 140 in fluid communication with cartridge 124. With twist-ring 248 in the first rotational orientation, valve 140 is positioned within valve-locking assembly 218, in fluid communication with cartridge 124, such that twist-ring 248 is concentric with peripheral wall 264 of first valve-body portion 260 and twist-lock recesses 272 receive twist-lock elements 266. When twist-ring 248 is rotated to the second rotational orientation, twist-lock recesses 272 releasably retain twist-lock elements 266 such that valve 140 is releasably locked to valve-locking assembly 218 in fluid communication with cartridge 124. At least a portion of twist-lock elements 266 and at least a portion of twist-lock recesses 272 are geometrically complementary to ensure a precise fit between twist-lock elements 266 and twist-lock recesses 272, which properly aligns valve 140 relative to valve-locking assembly 218 and cartridge 124.

Referring generally to FIGS. 1A, 1B, and 1C and particularly to, e.g., FIGS. 16 and 17, each of twist-lock recesses 272 comprises groove portion 268, formed in peripheral wall 264 of first valve-body portion 260 parallel with first axis 118, and slot portion 270, formed in peripheral wall 264 of first valve-body portion 260 and extending from groove portion 268 perpendicular to first axis 118. The preceding subject matter of this paragraph characterizes example 44 of the present disclosure, wherein example 44 also includes the subject matter according to example 43, above.

Groove portion 268 and slot portion 270 of the twist-lock recesses 272 that are complementary guide valve 140 into proper position relative to valve-locking assembly 218 and cartridge 124 for releasably interlocking twist-ring 248 with valve 140. With twist-ring 248 rotated into first rotational orientation, groove portion 268 of each of twist-lock recesses 272 is configured to receive one of twist-lock elements 266 upon movement of valve 140 along first axis 118. With valve 140 properly positioned within valve-locking assembly 218 relative to cartridge 124 and twist-ring 248 rotated into the second rotational orientation, slot portion 270 of each of twist-lock recesses 272 is configured to releasably retain one of twist-lock elements 266. In combination, groove portion 268 and slot portion 270 of each one of twist-lock recesses 272 enable interlocking of valve 140 with valve-locking assembly 218 in response to rotation of twist-ring 248 and unlocking of valve 140 from valve-locking assembly 218 in response to counter-rotation of twist-ring 248.

Referring generally to FIGS. 1A, 1B, and 1C and particularly to, e.g., FIGS. 16, 17, and 20-22, with twist-ring 248 in the first rotational orientation, groove portion 268 is configured to receive one of twist-lock elements 266 when valve 140 is received within annular valve interface 314. With valve 140 received within annular valve interface 314, slot portion 270 is configured to releasably retain one of twist-lock elements 266 when twist-ring 248 is rotated into the second rotational orientation. The preceding subject matter of this paragraph characterizes example 45 of the present disclosure, wherein example 45 also includes the subject matter according to example 44, above.

Receiving twist-lock elements 266 within groove portion 268 of twist-lock recesses 272 enables alignment of valve 140 and cartridge 124. Receiving twist-lock elements 266 within slot portion 270 of twist-lock recesses 272 enables releasable locking of valve 140 to sleeve 110.

Referring generally to FIGS. 1A, 1B, and 1C and particularly to, e.g., FIG. 16, slot portion 270 is tapered. The preceding subject matter of this paragraph characterizes example 46 of the present disclosure, wherein example 46 also includes the subject matter according to example 45, above.

Slot portion 270 of twist-lock recesses 272 being tapered facilitates a pulling-action of valve 140 into valve-locking assembly 218 as twist-lock elements 266 traverse along slot portion 270 of twist-lock recesses 272, which urges valve 140 toward cartridge 124.

Referring generally to FIGS. 1A, 1B, and 1C and particularly to, e.g., FIGS. 2-7, valve 140 further comprises valve chamber 274 and valve inlet port 142, located radially outward of valve chamber 274. Valve inlet port 142 is communicatively coupled with valve chamber 274 and is configured to be communicatively coupled with cartridge 124. Valve 140 also comprises valve outlet port 144, coaxial with valve chamber 274. Valve outlet port 144 is communicatively coupled with valve chamber 274 and is configured to be communicatively coupled with nozzle 152. Valve 140 additionally comprises valve passage 276, coaxial with valve chamber 274 and located opposite valve outlet port 144, wherein valve passage 276 opens into valve chamber 274. The preceding subject matter of this paragraph characterizes example 47 of the present disclosure, wherein example 47 also includes the subject matter according to any one of examples 41 to 46, above.

Valve inlet port 142, valve chamber 274, and valve outlet port 144 define a flow path for extrudable substance 102 through valve 140. Valve inlet port 142 being formed in first valve-body portion 260 at a location radially outward of valve chamber 274 facilitates alignment and sealing engagement of valve inlet port 142 with cartridge outlet port 134 of cartridge 124. Valve outlet port 144 being formed in first valve-body portion 260 facilitates sealing engagement with nozzle 152. Valve passage 276 being formed in second valve-body portion 262 facilitates access of linear actuator 138 to valve outlet port 144 through valve chamber 274.

In various examples, valve 140 includes more than one valve inlet port 142. In these examples, each valve inlet port 142 is configured to be communicatively coupled with one cartridge outlet port 134 of cartridge 124. In one example, valve inlet port 142 includes a gasket, configured to form a seal between valve inlet port 142 and cartridge outlet port 134.

Referring generally to FIGS. 1A, 1B, and 1C and particularly to, e.g., FIGS. 7, 18, and 19, valve 140 further comprises valve channel 280, interconnecting valve inlet port 142 and valve chamber 274. Valve channel 280 comprises elliptical cross-section. The preceding subject matter of this paragraph characterizes example 48 of the present disclosure, wherein example 48 also includes the subject matter according to example 47, above.

Valve channel 280 enables fluid interconnection of valve inlet port 142, which has a flow direction parallel with first axis 118, with valve chamber 274, which also has a flow direction parallel with first axis 118 but is laterally offset relative to the flow direction of valve inlet port 142. The elliptical cross-sectional shape of valve channel 280 provides valve channel 280 with a suitable cross-sectional flow area, while reducing the size (e.g., a cross-sectional dimension) of valve channel 280.

Referring generally to FIGS. 1A, 1B, and 1C and particularly to, e.g., FIGS. 7 and 16-18, linear actuator 138 comprises barrel 292, removably coupled with second valve-body portion 262, and piston 294, movable along first axis 118 within to barrel 292 between extended position and retracted position. Linear actuator 138 further comprises actuator rod 146, coupled to piston 294 and extending through valve passage 276 into valve chamber 274, and first plug 296, coupled to actuator rod 146 opposite piston 294. With piston 294 in extended position, first plug 296 is positioned beyond valve outlet port 144. With piston 294 in retracted position, first plug 296 is positioned within valve outlet port 144. The preceding subject matter of this paragraph characterizes example 49 of the present disclosure, wherein example 49 also includes the subject matter according to example 47 or 48, above.

Linear actuator 138 enables precise control of the flow rate of extrudable substance 102 out of valve 140 and into nozzle 152. Linear actuator 138 facilitates flow of extrudable substance 102 from valve outlet port 144 by positioning first plug 296 in an open position, in which first plug 296 is positioned beyond valve outlet port 144, when piston 294 moves to the extended position. Linear actuator 138 facilitates restriction of flow of extrudable substance 102 from valve outlet port 144 by positioning first plug 296 in a closed position, in which first plug 296 is positioned within valve outlet port 144, when piston 294 moves to the retracted position. When in the closed position, first plug 296 is positioned entirely within valve outlet port 144 and sealingly engages valve outlet port 144. When in the open position, first plug 296 is positioned outside of valve outlet port 144 and does not sealingly engage valve outlet port 144.

Referring generally to FIGS. 1A, 1B, and 1C and particularly to, e.g., FIGS. 7, 17, and 18, actuator rod 146 comprises second plug 298, positioned within valve passage 276. The preceding subject matter of this paragraph characterizes example 50 of the present disclosure, wherein example 50 also includes the subject matter according to example 49, above.

Second plug 298 enables restriction of a flow of extrudable substance 102 from valve chamber 274 into valve passage 276. In other words, second plug 298 being positioned within valve passage 276 facilitates prevention of a backflow of extrudable substance 102 from valve chamber 274 into valve passage 276 as extrudable substance 102 flows through valve 140.

Referring generally to FIGS. 1A, 1B, and 1C and particularly to, e.g., FIGS. 7, 17, and 18, actuator rod 146 further comprises first rod body 304, coupled to piston 294, and coupling 300, coupled to first rod body 304, opposite piston 294. Second plug 298 is coupled to coupling 300, opposite first rod body 304. Actuator rod 146 also comprises second rod body 306, coupled to second plug 298, opposite coupling 300. First plug 296 is coupled to second rod body 306, opposite second plug 298. The preceding subject matter of this paragraph characterizes example 51 of the present disclosure, wherein example 51 also includes the subject matter according to example 50, above.

Actuator rod 146 being multi-sectional, or a multi-component assembly, enables actuator rod 146 to be constructed in accordance with the particular application and configuration of valve 140. Actuator rod 146 facilitates second rod body 306 with first plug 296 and/or second plug 298 to be moved relative to first rod body 304 or each other. In various examples, coupling 300 is a threaded coupling, configured to interconnect the second plug 298 with first rod body 304. In some examples, second rod body 306 is also threadably coupled to second plug 298.

Referring generally to FIGS. 1A, 1B, and 1C and particularly to, e.g., FIGS. 16-18, linear actuator 138 further comprises first actuator pressure input 324, configured to communicate pneumatic pressure to move piston 294 in first direction into extended position, and second actuator pressure input 326, configured to communicate pneumatic pressure to move piston 294 in second direction, opposite first direction, into retracted position. The preceding subject matter of this paragraph characterizes example 52 of the present disclosure, wherein example 52 also includes the subject matter according to any one of examples 49 to 51, above.

First actuator pressure input 324 and second actuator pressure input 326 enable double-action of linear actuator 138 and delivery of the pneumatic pressure driving force for movement of piston 294 relative to barrel 292.

In some examples, apparatus 100 also includes pressure tubes (not illustrated) to facilitate communication of pressure to and from linear actuator 138. In one example, the pressure tubes communicates pressure to and from first actuator pressure input 324 and second actuator pressure input 326 to facilitate pressurization of internal cylinder 372 of barrel 292 and application of pneumatic pressure to piston 294 to control operation of linear actuator 138, such as to move first plug 296 relative to valve 140 to control flow of extrudable substance 102 from valve 140 to nozzle 152. In various examples, first actuator pressure input 324 and second actuator pressure input 326 are pneumatic fittings.

Selective pneumatic operation of first actuator pressure input 324 and second actuator pressure input 326 of linear actuator 138 enables precise application of pneumatic pressure to piston 294 to precisely control the flow of extrudable substance 102 out of valve 140 and into nozzle 152. Additionally, selective pneumatic operation of first actuator pressure input 324 and second actuator pressure input 326 facilitates the use of automated pneumatic controls to control the pneumatic operation of first actuator pressure input 324 and second actuator pressure input 326.

Referring generally to FIGS. 1A, 1B, and 1C and particularly to, e.g., FIGS. 16 and 17, apparatus 100 further comprises first position sensor 328, configured to detect when piston 294 is in extended position, and second position sensor 330, configured to detect when piston 294 is in retracted position. Apparatus 100 also comprises positioning element 332, located on piston 294. Positioning element 332 is configured to actuate first position sensor 328 when piston 294 is in extended position and is configured to actuate second position sensor 330 when piston 294 is in retracted position. The preceding subject matter of this paragraph characterizes example 53 of the present disclosure, wherein example 53 also includes the subject matter according to any one of examples 49 to 52, above.

First position sensor 328 and second position sensor 330 enable detection of whether first plug 296 is in the open position or the closed position based on the position of piston 294. Positioning element 332 enables actuation of first position sensor 328 when piston 294 is in the extended position to indicate valve 140 is open. Positioning element 332 also enables actuation of second position sensor 330 when piston 294 is in the retracted position to indicate valve 140 is closed.

Referring generally to FIGS. 1A, 1B, and 1C and particularly to, e.g., FIGS. 7 and 18, positioning element 332 comprises magnet 312, coupled to piston 294. First position sensor 328 comprises first magnetic sensor 334, proximate one end of barrel 292. Second position sensor 330 comprises second magnetic sensor 336, proximate another end of barrel 292. The preceding subject matter of this paragraph characterizes example 54 of the present disclosure, wherein example 54 also includes the subject matter according to example 53, above.

Magnet 312 enables non-contact actuation of first magnetic sensor 334 and second magnetic sensor 336 in response to movement of piston 294 relative to barrel 292.

Referring generally to FIGS. 1A, 1B, and 1C and particularly to, e.g., FIGS. 7 and 18, piston 294 comprises first annular piston portion 308, coupled to actuator rod 146, and second annular piston portion 310, coupled to actuator rod 146 and spaced away from first annular piston portion 308.

Magnet 312 is an annular magnet, coupled to actuator rod 146 between first annular piston portion 308 and second annular piston portion 310. The preceding subject matter of this paragraph characterizes example 55 of the present disclosure, wherein example 55 also includes the subject matter according to example 54, above.

Magnet 312 being an annular magnet enables positioning of first magnetic sensor 334 and second magnetic sensor 336 at any location around an exterior of barrel 292 relative to piston 294.

Referring generally to FIGS. 1A, 1B, and 1C and particularly to, e.g., FIGS. 17 and 19, second valve-body portion 262 further comprises first twist-lock interface 346, configured to releasably lock barrel 292 of linear actuator 138 to valve 140. The preceding subject matter of this paragraph characterizes example 56 of the present disclosure, wherein example 56 also includes the subject matter according to any one of examples 49 to 55, above.

First twist-lock interface 346 enables simple, easy, and effective coupling of linear actuator 138 to valve 140. First twist-lock interface 346 facilitates releasable locking of linear actuator 138 to valve 140 with actuator rod 146 extending into valve chamber 274 via twisting of linear actuator 138 relative to second valve-body portion 262 of valve 140.

In various examples, linear actuator 138 includes one or more twist-lock retainers 416 coupled to barrel 292 and extending parallel with first axis 118. In one example, linear actuator 138 includes an opposing pair of twist-lock retainers 416. First twist-lock interface 346 of valve 140 includes one or more twist-lock clamps 418. In one example, first twist-lock interface 346 includes an opposing pair of twist-lock clamps 418. Twist-lock clamps 418 are cross-sectionally complementary to twist-lock retainers 416 and are configured to receive and retain twist-lock retainers 416 upon insertion of twist-lock retainers 416 into twist-lock clamps 418 and a twisting action of linear actuator 138 relative to valve 140. In an example, each one of twist-lock retainers 416 includes a shaft projecting outward from barrel 292 of linear actuator 138 and a disk-like head located an end of the shaft, such as a shoulder bolt. First twist-lock interface 346 ensures linear actuator 138 is securely coupled to valve 140 with actuator rod 146 positioned within valve chamber 274.

Referring generally to FIGS. 1A, 1B, and 1C and particularly to, e.g., FIGS. 7, 17, and 18, apparatus 100 further comprises temperature sensor 316, configured to be in communication with extrudable substance 102 within valve chamber 274 of valve 140 when extrudable substance 102 is introduced within valve chamber 274. The preceding subject matter of this paragraph characterizes example 57 of the present disclosure, wherein example 57 also includes the subject matter according to any one of examples 49 to 56, above.

Temperature sensor 316 enables detection of a temperature of extrudable substance 102 within valve chamber 274 of valve 140. In some examples, the temperature of extrudable substance 102 in valve, detected by temperature sensor 316, is used to control the rate at which extrudable substance 102 flows from cartridge 124 to valve 140. Additionally, in some examples, the temperature of extrudable substance 102 in valve 140, detected by temperature sensor 316, is used to control linear actuator 138 to regulate the rate at which extrudable substance 102 flows from valve 140 to nozzle 152.

Referring generally to FIGS. 1A, 1B, and 1C and particularly to, e.g., FIGS. 7 and 19, actuator rod 146 of linear actuator 138 further comprises rod passage 302, extending at least partially through interior of actuator rod 146. Temperature sensor 316 extends through rod passage 302 into valve chamber 274. The preceding subject matter of this paragraph characterizes example 58 of the present disclosure, wherein example 58 also includes the subject matter according to example 57, above.

Rod passage 302 enables temperature sensor 316 to pass valve chamber 274, through actuator rod 146, and exit from an end of linear actuator 138 and through sleeve first end 120 of sleeve 110. Rod passage 302 extends through first rod body 304, coupling 300, second plug 298, and second rod body 306. Temperature sensor 316 exits through an opening formed in second rod body 306. In an example, temperature sensor 316 is coupled to an exterior of second rod body 306 within valve chamber 274 and in communication with extrudable substance 102 within valve chamber 274. Temperature sensor 316 includes control lines (e.g., communication cables or wires) electrically coupled with an electronic controller. Such control lines extend through the opening in second rod body 306 and pass through rod passage 302 of actuator rod 146. Actuator rod 146 being the multi-component assembly enables routing of temperature sensor 316 through actuator rod 146.

Referring generally to FIGS. 1A, 1B, and 1C, apparatus 100 further comprises temperature-signal conditioner 318, electrically coupled to temperature sensor 316. The preceding subject matter of this paragraph characterizes example 59 of the present disclosure, wherein example 59 also includes the subject matter according to example 57 or 58, above.

Temperature-signal conditioner 318 enables communication of temperature-related information from temperature sensor 316 to an electronic controller in a format usable by the electronic controller. In an example, temperature-signal conditioner 318 provides data format conversion functionality on-board apparatus 100, rather than at the electronic controller.

Referring generally to FIGS. 1A, 1B, and 1C and particularly to, e.g., FIGS. 4, 5, 17, 19, and 20, apparatus 100 further comprises pressure sensor 340, configured to be in communication with extrudable substance 102 within valve chamber 274 of valve 140 when extrudable substance 102 is introduced within valve chamber 274. The preceding subject matter of this paragraph characterizes example 60 of the present disclosure, wherein example 60 also includes the subject matter according to example 59, above.

Pressure sensor 340 enables detection of pressure of extrudable substance 102 in valve chamber 274 of valve 140. In some examples, the pressure of extrudable substance 102 in valve 140, detected by pressure sensor 340, is used to control the rate at which extrudable substance 102 flows from cartridge 124 to valve 140. Additionally, in some examples, the pressure of extrudable substance 102 in valve 140, detected by pressure sensor 340, is used to control linear actuator 138 to regulate the rate at which extrudable substance 102 flows from valve 140 to nozzle 152. Further, pressure sensor 340 is configured to be removably coupled to valve 140.

In an example, valve 140 includes pressure sensor port 392. Pressure sensor port 392 is in communication with valve chamber 274. In an example, pressure sensor port 392 is located in second valve-body portion 262 and extends from an exterior of valve 140 into valve chamber 274. Pressure sensor 340 is at least partially located within pressure sensor port 392 such that pressure sensor 340 is in communication with extrudable substance 102 within valve chamber 274 of valve 140 when extrudable substance 102 is introduced within valve chamber 274.

Referring generally to FIGS. 1A, 1B, and 1C and particularly to, e.g., FIGS. 17 and 20, apparatus 100 further comprises pressure-sensor housing 344, configured to house pressure sensor 340. Second valve-body portion 262 of valve 140 further comprises second twist-lock interface 348, configured to releasably lock pressure-sensor housing 344 to valve 140. The preceding subject matter of this paragraph characterizes example 61 of the present disclosure, wherein example 61 also includes the subject matter according to example 60, above.

Pressure-sensor housing 344 and second twist-lock interface 348 enable simple, easy, and effective coupling of pressure sensor 340 to valve 140 in communication with extrudable substance 102 within valve chamber 274. Pressure-sensor housing 344 facilitates pressure sensor 340 to be releasably locked to valve 140 such that pressure sensor 340 is in communication with valve chamber 274 and in contact with extrudable substance 102 located within valve chamber 274 of valve 140.

In various examples, pressure-sensor housing 344 includes one or more twist-lock retainers 394. In an example, pressure-sensor housing 344 includes an opposing pair of twist-lock retainers 394. Second twist-lock interface 348 of valve 140 includes receptacle 398 and one or more twist-lock grooves 396. Receptacle 398 is cross-sectionally complementary to pressure-sensor housing 344. Receptacle 398 opens into pressure sensor port 392 such that pressure sensor 340 extends into valve chamber 274 in communication with extrudable substance 102 when pressure-sensor housing 344 is inserted into receptacle 398. Twist-lock grooves 396 are configured to receive and retain twist-lock retainers 394 upon insertion of pressure-sensor housing 344 into receptacle 398 and a twisting action of pressure-sensor housing 344 relative to valve 140. In an example, each one of twist-lock retainers 394 includes a shaft projecting outward from pressure-sensor housing 344 and a disk-like head located an end of the shaft, such as a shoulder bolt. Pressure-sensor housing 344 and second twist-lock interface 348 ensure pressure sensor 340 is securely coupled to valve 140 in communication with valve chamber 274.

Referring generally to FIGS. 1A, 1B, and 1C, apparatus 100 further comprises pressure-signal conditioner 342, electrically coupled to pressure sensor 340. The preceding subject matter of this paragraph characterizes example 62 of the present disclosure, wherein example 62 also includes the subject matter according to example 60 or 61, above.

Pressure-signal conditioner 342 enables communication of pressure-related information from pressure sensor 340 to an electronic controller in a format usable by the electronic controller. In one example, pressure-signal conditioner 342 provides data format conversion functionality on-board apparatus 100, rather than at the electronic controller.

Referring generally to FIGS. 1A, 1B, and 1C, apparatus 100 further comprises pressure source 360 and controller 322, operatively coupled with pressure source 360 and with at least one of temperature sensor 316 or pressure sensor 340 to control, based on signals, obtained from at least one of temperature sensor 316 or pressure sensor 340, flow rate of extrudable substance 102 through valve 140. The preceding subject matter of this paragraph characterizes example 63 of the present disclosure, wherein example 63 also includes the subject matter according to example 62, above.

Use of at least one of temperature sensor 316 or pressure sensor 340 to control the flow rate of extrudable substance 102 through valve 140 enables precise and predictable flow of extrudable substance.

In various examples, pressure source 360 is operatively coupled to cap pressure input 246 of push-lock pressure cap 150 to communicate pressure to cartridge 124 and drive movement of annular plunger 148. Pressure source 360 is also operatively coupled to first actuator pressure input 324 and second actuator pressure input 326 of linear actuator 138 to communicate pressure to linear actuator 138 and drive movement of piston 294.

In various examples, controller 322 includes at least one electronic controller (e.g., a programmable processor) and at least one control valve that is pneumatically coupled to pressure source 360 and at least one of push-lock pressure cap 150 and linear actuator 138. Controller 322 is configured to control application of pneumatic pressure from pressure source 360 to at least one of cap pressure input 246 of push-lock pressure cap 150 and first actuator pressure input 324 and second actuator pressure input 326 of linear actuator 138. In various examples, the control valve is a two-way valve. In an example, the control valve is an electromechanically operated solenoid valve.

Referring generally to FIGS. 1A, 1B, and 1C, apparatus 100 further comprises input/output connector 358, communicatively coupling at least one of pressure-signal conditioner 342 or temperature-signal conditioner 318 with controller 322. The preceding subject matter of this paragraph characterizes example 64 of the present disclosure, wherein example 64 also includes the subject matter according to example 63, above.

Input/output connector 358 enables electrical communication between controller 322 and at least one of pressure-signal conditioner 342 or temperature-signal conditioner 318. Input/output connector 358 facilitates a convenient and reliable electrical connection between controller 322 and at least one of pressure-signal conditioner 342 or temperature-signal conditioner 318.

Referring generally to FIGS. 1A, 1B, and 1C and particularly to, e.g., FIGS. 19, 27, and 28, first valve-body portion 260 of valve 140 further comprises third twist-lock interface 350, configured to releasably lock nozzle 152 to valve 140. The preceding subject matter of this paragraph characterizes example 65 of the present disclosure, wherein example 65 also includes the subject matter according to any one of examples 47 to 64, above.

Third twist-lock interface 350 enables simple, easy, and effective coupling of nozzle 152 to valve 140. Third twist-lock interface 350 facilitates releasable locking of nozzle 152 to valve 140 via twisting of nozzle 152 relative to valve 140. In various examples, nozzle 152 includes twist-lock flange 420 and third twist-lock interface 350 of valve 140 includes twist-lock recess 422. Twist-lock recess 422 is configured to receive and retain twist-lock flange 420. Twist-lock flange 420 and twist-lock recess 422 are geometrically complementary to ensure a alignment and a precise fit between twist-lock flange 420 and twist-lock recess 422, which properly positions nozzle 152 in communication with valve outlet port 144 of valve 140 for a precise and reliable interlock between nozzle 152 and valve 140.

Referring generally to FIGS. 1A, 1B, and 1C and particularly to, e.g., FIGS. 28 and 29, nozzle 152 comprises nozzle inlet 352, coaxially aligned with valve outlet port 144, and nozzle outlet 354, offset relative to nozzle inlet 352. Nozzle 152 further comprises nozzle channel 356, extending between nozzle inlet 352 and nozzle outlet 354. The preceding subject matter of this paragraph characterizes example 66 of the present disclosure, wherein example 66 also includes the subject matter according to example 65, above.

Nozzle outlet 354 being laterally offset relative to nozzle inlet 352 and first axis 118 enables disposition of extrudable substance 102 at a location on surface 154 that is laterally offset relative to valve outlet port 144 and first axis 118.

Referring generally to FIGS. 1A, 1B, 1C, and 2-7 and particularly to, e.g., FIGS. 30A and 30B, method 1000 of depositing extrudable substance 102 onto surface 154, is disclosed. Method 1000 comprises, (block 1002) with cartridge 124 positioned inside sleeve 110 between inner tubular sleeve wall 114 and outer tubular sleeve wall 112, circumscribing inner tubular sleeve wall 114, and also positioned between push-lock pressure cap 150, hermetically coupled with cartridge 124, and valve 140, communicatively coupled with cartridge 124, linearly moving annular plunger 148, received between inner tubular cartridge wall 126 and outer tubular cartridge wall 128, circumscribing inner tubular cartridge wall 126, toward valve 140 along first axis 118 to urge extrudable substance 102 from cartridge 124, through valve 140, and out of nozzle 152 that is communicatively coupled with valve 140 and (block 1004) controlling flow of extrudable substance 102 from valve 140 to nozzle 152. The preceding subject matter of this paragraph characterizes example 67 of the present disclosure.

Method 1000 facilitates depositing extrudable substance 102, from cartridge 124, through nozzle 152, to surface 154 of a workpiece (not shown), for example, located in a confined space. The configuration of sleeve 110 and cartridge 124 facilitates a reduction in the size requirements for storage of extrudable substance 102 and enables linear actuator 138 and a portion of valve 140 to be located within sleeve 110. Push-lock pressure cap 150 enables pressurization of an internal volume within cartridge 124. Rotation of sleeve 110 controls an angular orientation of nozzle 152 relative to surface 154. Valve 140 being coupled directly to cartridge 124 facilitates a reduction of extrudable substance 102 that is wasted, for example, during replacement of cartridge 124 and a purging operation.

Referring generally to FIGS. 1A, 1B, 1C, and 2-7 and particularly to, e.g., FIGS. 30A and 30B, method 1000 further comprises, (block 1006) with sleeve 110 coupled to bracket 104, selectively rotating sleeve 110 relative to bracket 104 about first axis 118 to controllably position nozzle 152 relative to surface 154. The preceding subject matter of this paragraph characterizes example 68 of the present disclosure, wherein example 68 also includes the subject matter according to example 67, above.

Selectively rotating sleeve 110 relative to bracket 104 enables positioning of nozzle 152 relative to surface 154 for deposition of extrudable substance 102.

Referring generally to FIGS. 1A, 1B, 1C, 5, and 23 and particularly to, e.g., FIG. 30A and 30B, method 1000 further comprises (block 1008) detecting when sleeve 110 is in predetermined rotational orientation relative to bracket 104 by actuating proximity sensor 190, located proximate to sleeve 110, with homing element 186, located on sleeve 110. The preceding subject matter of this paragraph characterizes example 69 of the present disclosure, wherein example 69 also includes the subject matter according to example 68, above.

Detecting the rotational orientation of sleeve 110 relative to bracket 104 enables actuation of proximity sensor 190 when sleeve 110 is rotated to the predetermined rotational orientation relative to bracket 104 to indicate sleeve 110 is in the home position. Also enables use of an incremental, rather than an absolute, position encoder, which would be unable to determine the rotational orientation of sleeve 110 relative to bracket 104 in the case of a power interruption.

Referring generally to FIGS. 1A, 1B, 1C, and 2-5 and particularly to, e.g., FIGS. 30A and 30B, method 1000 further comprises, (block 1010) with bracket 104 coupled to robot interface 222 that is coupled to robot 116, selectively linearly moving bracket 104 relative to robot interface 222 along first axis 118. The preceding subject matter of this paragraph characterizes example 70 of the present disclosure, wherein example 70 also includes the subject matter according to example 68 or 69, above.

Linearly moving bracket 104 relative to robot interface 222 enables linear movement of bracket 104 relative to robot 116 and linear movement of nozzle 152 relative to surface 154.

Referring generally to FIGS. 1A, 1B, 1C, 6, and 7 and particularly to, e.g., FIGS. 30A and 30B, method 1000 further comprises (block 1012) releasably locking push-lock pressure cap 150 to sleeve 110. The preceding subject matter of this paragraph characterizes example 71 of the present disclosure, wherein example 71 also includes the subject matter according to any one of examples 67 to 70, above.

Releasably locking push-lock pressure cap 150 to sleeve 110 hermetically couples push-lock pressure cap 150 with cartridge 124 and facilitates use of pneumatic pressure to move annular plunger 148 along first axis 118 within cartridge 124 toward valve 140, which urges extrudable substance 102 from cartridge 124 into valve 140.

Referring generally to FIGS. 1A, 1B, 1C, 6, 7, and 11-13 and particularly to, e.g., FIGS. 30A and 30B, according to method 1000, (block 1012) releasably locking push-lock pressure cap 150 to sleeve 110 comprises (block 1014) moving spring-loaded latches 256 of push-lock pressure cap 150 relative to sleeve 110 into locked position, in which spring-loaded latches 256 are engaged with sleeve 110. The preceding subject matter of this paragraph characterizes example 72 of the present disclosure, wherein example 72 also includes the subject matter according to example 71, above.

Moving spring-loaded latches 256 of push-lock pressure cap 150 relative to sleeve 110 into locked position enables push-lock pressure cap 150 to be releasably locked to sleeve 110 and facilitates push-lock pressure cap 150 being sealed with cartridge 124.

Referring generally to FIGS. 1A, 1B, 1C, 6, and 7 and particularly to, e.g., FIGS. 30A and 30B, according to method 1000, (block 1014) moving spring-loaded latches 256 into locked position comprises (block 1016) pushing keeper 236 of each one of spring-loaded latches 256 into locking aperture 240 in sleeve 110 with latch spring 238, coupled to keeper 236. The preceding subject matter of this paragraph characterizes example 73 of the present disclosure, wherein example 73 also includes the subject matter according to example 72, above.

Pushing keeper 236 of each one of spring-loaded latches 256 into locking aperture 240 in sleeve 110 enables quick, easy, and effective locking of push-lock pressure cap 150 to sleeve 110. With cam 258 of push-lock pressure cap 150 rotated about first axis 118 into the first rotational orientation, spring-loaded latches 256 automatically return to the locked position.

Referring generally to FIGS. 1A, 1B, 1C, 6, and 7 and particularly to, e.g., FIGS. 30A and 30B, method 1000 further comprises (block 1018) unlocking push-lock pressure cap 150 from sleeve 110. The preceding subject matter of this paragraph characterizes example 74 of the present disclosure, wherein example 74 also includes the subject matter according to example 73, above.

Unlocking push-lock pressure cap 150 from sleeve 110 facilitates removal of push-lock pressure cap 150 from sleeve 110. Removal of push-lock pressure cap 150 from sleeve 110 facilitates removal of cartridge 124 from within sleeve 110.

Referring generally to FIGS. 1A, 1B, 1C, 6, 7, and 11-13 and particularly to, e.g., FIGS. 30A and 30B, according to method 1000, (block 1018) unlocking push-lock pressure cap 150 from sleeve 110 comprises (block 1020) moving spring-loaded latches 256 of push-lock pressure cap 150 relative to sleeve 110 into unlocked position, in which spring-loaded latches 256 are disengaged from sleeve 110. The preceding subject matter of this paragraph characterizes example 75 of the present disclosure, wherein example 75 also includes the subject matter according to example 74, above.

Moving spring-loaded latches 256 of push-lock pressure cap 150 relative to sleeve 110 into unlocked position enables unlocking of push-lock pressure cap 150 from sleeve 110 is a simple, single motion.

Referring generally to FIGS. 1A, 1B, 1C, 6, 7, and 11-13 and particularly to, e.g., FIGS. 30A and 30B, according to method 1000, (block 1020) moving spring-loaded latches 256 into unlocked position comprises (block 1022) pushing keeper 236 of each one of spring-loaded latches 256 out of locking aperture 240, formed in sleeve 110, by rotating cam 258 about first axis 118. The preceding subject matter of this paragraph characterizes example 76 of the present disclosure, wherein example 76 also includes the subject matter according to example 75, above.

Pushing keeper 236 of each one of spring-loaded latches 256 out of locking aperture 240 enables quick, easy, and effective unlocking of push-lock pressure cap 150 from sleeve 110. Rotating cam 258 about first axis 118 into the second rotational orientation moves spring-loaded latches 256 into the unlocked position.

Referring generally to FIGS. 1A, 1B, 1C, 7, and 8 and particularly to, e.g., FIGS. 30A and 30B, method 1000 further comprises, (block 1024) with push-lock pressure cap 150 removed from sleeve 110, at least partially ejecting cartridge 124 from sleeve 110 through annular sleeve end-opening 162 that separates inner tubular sleeve wall 114 and outer tubular sleeve wall 112. The preceding subject matter of this paragraph characterizes example 77 of the present disclosure, wherein example 77 also includes the subject matter according to example 76, above.

At least partially ejecting cartridge 124 from sleeve 110 facilitates removal of cartridge 124 from within sleeve 110. In an example, ejecting cartridge 124 from sleeve 110 through annular sleeve end-opening 162 is achieved by communicating pneumatic pressure to push cartridge 124 out of annular sleeve end-opening 162.

Referring generally to FIGS. 1A, 1B, 1C, 6, and 7 and particularly to, e.g., FIGS. 30A and 30B, method 1000 further comprises, (block 1026) with push-lock pressure cap 150 releasably locked to sleeve 110, controlling flow rate of extrudable substance 102 through valve 140. The preceding subject matter of this paragraph characterizes example 78 of the present disclosure, wherein example 78 also includes the subject matter according to any one of examples 71 to 77, above.

Pressure applied to annular plunger 148 enables annular plunger 148 to move along first axis 118 toward valve 140, which urges extrudable substance 102 from cartridge 124 and into valve 140. Control of the pneumatic pressure communicated to annular plunger 148 facilitates control the flow rate of extrudable substance 102 through valve 140.

Referring generally to FIGS. 1A, 1B, and 1C and particularly to, e.g., FIGS. 30A and 30B, according to method 1000, controlling flow rate of extrudable substance 102 through valve 140 is based, at least in part, on at least one of temperature or pressure of extrudable substance 102, located within valve 140. The preceding subject matter of this paragraph characterizes example 79 of the present disclosure, wherein example 79 also includes the subject matter according to example 78, above.

Controlling flow rate of extrudable substance 102 based on at least one of temperature or pressure of extrudable substance 102 enables precise and predictable flow of extrudable substance 102. Monitoring parameters of extrudable substance 102, such as at least one of temperature or pressure of extrudable substance 102 located within valve chamber 274 of valve 140, as extrudable substance 102 flows through valve 140 and out from nozzle 152, enables a consistent and/or desired amount of extrudable substance 102 to be deposited or applied onto surface 154. In an example, controller 322 is operatively coupled to at least one of pressure sensor 340 and/or temperature sensor 316 to process at least one of a pressure value and/or a temperature value of extrudable substance 102 within valve 140. Controller 322 controls the pneumatic pressure applied to annular plunger 148 and controls a position of first plug 296 relative to valve 140 based on the processed values to control the flow rate of extrudable substance 102 through valve 140.

Referring generally to FIGS. 1A, 1B, and 1C and particularly to, e.g., FIGS. 30A and 30B, method 1000 further comprises (block 1030) determining temperature of extrudable substance 102, flowing through valve 140. Method 1000 also comprises, (block 1032) based on temperature of extrudable substance 102, linearly moving annular plunger 148 along first axis 118 toward valve 140 to control flow rate of extrudable substance 102 through valve 140. The preceding subject matter of this paragraph characterizes example 80 of the present disclosure, wherein example 80 also includes the subject matter according to example 79, above.

Controlling flow rate of extrudable substance 102 based on temperature of extrudable substance 102 enables precise and predictable flow of extrudable substance 102. Monitoring temperature of extrudable substance 102 located within valve chamber 274 of valve 140, as extrudable substance 102 flows through valve 140 and out from nozzle 152, enables a consistent and/or desired amount of extrudable substance 102 to be deposited or applied onto surface 154.

Referring generally to FIGS. 1A, 1B, and 1C and particularly to, e.g., FIGS. 30A and 30B, method 1000 further comprises (block 1034) determining pressure of extrudable substance 102, flowing through valve 140. Method 1000 additionally comprises (block 1036), based on pressure of extrudable substance 102, linearly moving annular plunger 148 along first axis 118 toward valve 140 to control flow rate of extrudable substance 102 through valve 140. The preceding subject matter of this paragraph characterizes example 81 of the present disclosure, wherein example 81 also includes the subject matter according to example 79 or 80, above.

Controlling flow rate of extrudable substance 102 based on pressure of extrudable substance 102 enables precise and predictable flow of extrudable substance 102. Monitoring pressure of extrudable substance 102 located within valve chamber 274 of valve 140, as extrudable substance 102 flows through valve 140 and out from nozzle 152, enables a consistent and/or desired amount of extrudable substance 102 to be deposited or applied onto surface 154.

Referring generally to FIGS. 1A, 1B, 1C, 6, and 7 and particularly to, e.g., FIGS. 30A and 30B, according to method 1000, (block 1004) controlling flow of extrudable substance 102 from valve 140 to nozzle 152 comprises (block 1038) actuating linear actuator 138, coupled to valve 140, to move first plug 296 of linear actuator 138 into one of open position, in which first plug 296 is positioned beyond valve outlet port 144 of valve 140, or closed position, in which first plug 296 is positioned within valve outlet port 144. The preceding subject matter of this paragraph characterizes example 82 of the present disclosure, wherein example 82 also includes the subject matter according to any one of examples 67 to 81, above.

Actuation of linear actuator 138 enables precise control of the flow of extrudable substance 102 from valve 140 through nozzle 152. In an example, controller 322 is operatively coupled to linear actuator 138 and controls the position of first plug 296 relative to valve outlet port 144 of valve 140 to control the flow rate of extrudable substance 102 through valve 140.

Referring generally to FIGS. 1A, 1B, 1C, 6, 7, 16, and 18 and particularly to, e.g., FIGS. 30A and 30B, method 1000 further comprises (block 1040) detecting when piston 294 of linear actuator 138 is in extended position to indicate that first plug 296 is in open position and (block 1042) detecting when piston 294 of linear actuator 138 is in retracted position to indicate that first plug 296 is in closed position. The preceding subject matter of this paragraph characterizes example 83 of the present disclosure, wherein example 83 also includes the subject matter according to example 82, above.

Detecting when piston 294 is in the extended and retracted positions enables precise control of flow of extrudable substance 102 from valve 140 through nozzle 152 by controlling the relative position of first plug 296 between the open and closed positions. Moving first plug 296 to the open position at which first plug 296 does not sealingly engage valve outlet port 144 enables flow of extrudable substance 102 out of valve outlet port 144 and into nozzle 152. Moving first plug 296 into the closed position at which first plug 296 sealingly engages valve outlet port 144, prevents flow of extrudable substance 102 out of valve outlet port 144 and into nozzle 152.

Referring generally to FIGS. 1A, 1B, 1C, 7, and 8 and particularly to, e.g., FIGS. 30A and 30B, according to method 1000, (block 1044) moving first plug 296 from open position to closed position draws extrudable substance 102, flowing out of valve outlet port 144, back into valve 140. The preceding subject matter of this paragraph characterizes example 84 of the present disclosure, wherein example 84 also includes the subject matter according to example 82 or 83, above.

Movement of first plug 296 from the open position to the closed position pulls extrudable substance 102 back into valve 140 to prevent excess amounts of extrudable substance 102 from passing through valve outlet port 144 and into nozzle 152 during linear movement of first plug 296.

Referring generally to FIGS. 1A, 1B, 1C, and 4-7 and particularly to, e.g., FIGS. 30A and 30B, method 1000 further comprises (block 1046) releasably locking valve 140 to valve-locking assembly 218, which is coupled to sleeve 110, so that valve inlet port 142 of first valve-body portion 260 of valve 140 is communicatively coupled with cartridge outlet port 134 of cartridge 124 and second valve-body portion 262 of valve 140 is positioned within inner tubular sleeve wall 114. The preceding subject matter of this paragraph characterizes example 85 of the present disclosure, wherein example 85 also includes the subject matter according to any one of examples 67 to 84, above.

Positioning second valve-body portion 262 of valve 140 within inner tubular sleeve wall 114 of sleeve 110, when valve 140 is locked to valve-locking assembly 218 and valve inlet port 142 is sealingly engaged with cartridge outlet port 134, facilitates a reduction in the overall size of apparatus 100.

Referring generally to FIGS. 1A, 1B, 1C, 4-7, 21, and 22 and particularly to, e.g., FIGS. 30A and 30B, according to method 1000, (block 1046) releasably locking valve 140 to valve-locking assembly 218 further comprises (block 1048) inserting valve 140 within annular valve interface 314 of valve-locking assembly 218 and (block 1050) rotating twist-ring 248 of valve-locking assembly 218 about first axis 118 relative to annular valve interface 314. The preceding subject matter of this paragraph characterizes example 86 of the present disclosure, wherein example 86 also includes the subject matter according to example 85, above.

Rotating twist-ring 248 about first axis 118 relative to annular valve interface 314 from first rotational orientation, in which twist-ring 248 is disengaged from valve 140, to second rotational orientation, in which twist-ring 248 is engaged with valve 140, enables simple and effective interlocking of valve 140 to valve-locking assembly 218.

Examples of the present disclosure may be described in the context of aircraft manufacturing and service method 1100 as shown in FIG. 31 and aircraft 1102 as shown in FIG. 32. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 32, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of depositing an extrudable substance onto a surface, the method comprising steps of:
   with a cartridge positioned inside a sleeve between an inner tubular sleeve wall and an outer tubular sleeve wall, circumscribing the inner tubular sleeve wall, and also positioned between a push-lock pressure cap, hermetically coupled with the cartridge, and a valve, communicatively coupled with the cartridge, linearly moving an annular plunger, received between an inner tubular cartridge wall and an outer tubular cartridge wall, circumscribing the inner tubular cartridge wall, toward the valve along a first axis to urge the extrudable substance from the cartridge, through the valve, and out of a nozzle that is communicatively coupled with the valve; and
   controlling flow of the extrudable substance from the valve to the nozzle.

2. The method according to claim 1, further comprising, with the sleeve coupled to a bracket, selectively rotating the sleeve relative to the bracket about the first axis to controllably position the nozzle relative to the surface.

3. The method according to claim 2, further comprising detecting when the sleeve is in a predetermined rotational orientation relative to the bracket by actuating a proximity sensor, located proximate to the sleeve, with a homing element, located on the sleeve.

4. The method according to claim 2, further comprising, with the bracket coupled to a robot interface that is coupled to a robot, selectively linearly moving the bracket relative to the robot interface along the first axis.

5. The method according to claim 1, further comprising a step of releasably locking the push-lock pressure cap to the sleeve.

6. The method according to claim 5, wherein the step of releasably locking the push-lock pressure cap to the sleeve comprises a step of moving spring-loaded latches of the push-lock pressure cap relative to the sleeve into a locked position, in which the spring-loaded latches are engaged with the sleeve.

7. The method according to claim 6, wherein the step of moving the spring-loaded latches into the locked position comprises pushing a keeper of each one of the spring-loaded latches into a locking aperture in the sleeve with a latch spring, coupled to the keeper.

8. The method according to claim 7, further comprising a step of unlocking the push-lock pressure cap from the sleeve.

9. The method according to claim 8, wherein the step of unlocking the push-lock pressure cap from the sleeve comprises a step of moving the spring-loaded latches of the push-lock pressure cap relative to the sleeve into an unlocked position, in which the spring-loaded latches are disengaged from the sleeve.

10. The method according to claim 9, wherein the step of moving the spring-loaded latches into the unlocked position comprises pushing the keeper of each one of the spring-loaded latches out of the locking aperture, formed in the sleeve, by rotating a cam about the first axis.

11. The method according to claim 10, further comprising, with the push-lock pressure cap removed from the sleeve, at least partially ejecting the cartridge from the sleeve through an annular sleeve end-opening that separates the inner tubular sleeve wall and the outer tubular sleeve wall.

12. The method according to claim 5, further comprising, with the push-lock pressure cap releasably locked to the sleeve, controlling a flow rate of the extrudable substance through the valve.

13. The method according to claim 12, wherein controlling the flow rate of the extrudable substance through the valve is based, at least in part, on at least one of a temperature or a pressure of the extrudable substance, located within the valve.

14. The method according to claim 13, further comprising:
   determining the temperature of the extrudable substance, flowing through the valve; and
   based on the temperature of the extrudable substance, linearly moving the annular plunger along the first axis toward the valve to control the flow rate of the extrudable substance through the valve.

15. The method according to claim 13, further comprising:
   determining the pressure of the extrudable substance, flowing through the valve; and
   based on the pressure of the extrudable substance, linearly moving the annular plunger along the first axis toward the valve to control the flow rate of the extrudable substance through the valve.

16. The method according to claim 1, wherein the step of controlling the flow of the extrudable substance from the valve to the nozzle comprises actuating a linear actuator, coupled to the valve, to move a first plug of the linear actuator into one of an open position, in which the first plug is positioned beyond a valve outlet port of the valve, or a closed position, in which the first plug is positioned within the valve outlet port.

17. The method according to claim 16, further comprising:
   detecting when a piston of the linear actuator is in an extended position to indicate that the first plug is in the open position; and
   detecting when the piston of the linear actuator is in a retracted position to indicate that the first plug is in the closed position.

18. The method according to claim 16, wherein moving the first plug from the open position to the closed position draws the extrudable substance, flowing out of the valve outlet port, back into the valve.

19. The method according to claim 1, further comprising a step of releasably locking the valve to a valve-locking assembly, which is coupled to the sleeve, so that a valve inlet port of a first valve-body portion of the valve is communicatively coupled with a cartridge outlet port of the cartridge and a second valve-body portion of the valve is positioned within the inner tubular sleeve wall.

20. The method according to claim 19, wherein the step of releasably locking the valve to the valve-locking assembly further comprises:
   inserting the valve within an annular valve interface of the valve-locking assembly; and
   rotating a twist-ring of the valve-locking assembly about the first axis relative to the annular valve interface.

* * * * *

UNITED STATES PATENT AND TRADEMARK OFFICE
CERTIFICATE OF CORRECTION

PATENT NO. : 11,279,073 B2
APPLICATION NO. : 16/999279
DATED : March 22, 2022
INVENTOR(S) : Pringle-Iv et al.

It is certified that error appears in the above-identified patent and that said Letters Patent is hereby corrected as shown below:

On the Title Page

Item (12), should read: Pringle-Iv et al.

Item (72), please correct: John W. Pringle, IV to John W. Pringle-Iv

Signed and Sealed this
Twentieth Day of December, 2022

Katherine Kelly Vidal
*Director of the United States Patent and Trademark Office*